(12) United States Patent
Yang et al.

(10) Patent No.: US 11,790,230 B2
(45) Date of Patent: *Oct. 17, 2023

(54) DISTANCE TO OBSTACLE DETECTION IN AUTONOMOUS MACHINE APPLICATIONS

(71) Applicant: NVIDIA Corporation, Santa Clara, CA (US)

(72) Inventors: Yilin Yang, Santa Clara, CA (US); Bala Siva Sashank Jujjavarapu, Sunnyvale, CA (US); Pekka Janis, Uusimaa (FI); Zhaoting Ye, Santa Clara, CA (US); Sangmin Oh, San Jose, CA (US); Minwoo Park, Saratoga, CA (US); Daniel Herrera Castro, Uusimaa (FI); Tommi Koivisto, Uusimaa (FI); David Nister, Bellevue, WA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/723,195

(22) Filed: Apr. 18, 2022

(65) Prior Publication Data
US 2022/0253706 A1 Aug. 11, 2022

Related U.S. Application Data

(63) Continuation of application No. 17/449,310, filed on Sep. 29, 2021, which is a continuation of application
(Continued)

(51) Int. Cl.
*G06K 9/00* (2022.01)
*G06N 3/08* (2023.01)
(Continued)

(52) U.S. Cl.
CPC ............... *G06N 3/08* (2013.01); *B60W 30/14* (2013.01); *B60W 60/0011* (2020.02);
(Continued)

(58) Field of Classification Search
CPC .... G06N 3/08; B60W 60/0011; B60W 30/14; G06K 9/00791; G06K 9/6259; G06T 7/0051
See application file for complete search history.

(56) References Cited

U.S. PATENT DOCUMENTS 7,409,295 B2   8/2008 Paradie
8,204,542 B2   6/2012 Liao et al.
(Continued)

FOREIGN PATENT DOCUMENTS

DE    10215221920 A1    5/2017
DE    102015226762 A1   6/2017
(Continued)

OTHER PUBLICATIONS

ISO 26262, "Road vehicle—Functional safety," International standard for functional safety of electronic system, https://en.wikipedia.org/wiki/ISO_26262, accessed on Sep. 13, 2021, 8 pgs.
(Continued)

*Primary Examiner* — Fayyaz Alam
(74) *Attorney, Agent, or Firm* — Taylor English Duma L.L.P.

(57) ABSTRACT

In various examples, a deep neural network (DNN) is trained to accurately predict, in deployment, distances to objects and obstacles using image data alone. The DNN may be trained with ground truth data that is generated and encoded using sensor data from any number of depth predicting sensors, such as, without limitation, RADAR sensors, LIDAR sensors, and/or SONAR sensors. Camera adaptation algorithms may be used in various embodiments to adapt the DNN for
(Continued)

use with image data generated by cameras with varying parameters—such as varying fields of view. In some examples, a post-processing safety bounds operation may be executed on the predictions of the DNN to ensure that the predictions fall within a safety-permissible range.

20 Claims, 23 Drawing Sheets

Related U.S. Application Data

No. 16/813,306, filed on Mar. 9, 2020, now Pat. No. 11,170,299, which is a continuation-in-part of application No. 16/728,595, filed on Dec. 27, 2019, now Pat. No. 11,308,338.

(60) Provisional application No. 62/786,188, filed on Dec. 28, 2018.

(51) Int. Cl.
*B60W 30/14* (2006.01)
*B60W 60/00* (2020.01)
*G06V 20/56* (2022.01)
*G06F 18/214* (2023.01)
*G06V 10/762* (2022.01)

(52) U.S. Cl.
CPC ........ *G06F 18/2155* (2023.01); *G06V 10/763* (2022.01); *G06V 20/56* (2022.01)

(56) References Cited

U.S. PATENT DOCUMENTS

| | | | |
|---|---|---|---|
| 9,373,057 | B1 | 6/2016 | Erhan et al. |
| 9,701,307 | B1 | 7/2017 | Newman et al. |
| 9,710,714 | B2 | 7/2017 | Chen et al. |
| 9,742,869 | B2 | 8/2017 | Bolotin et al. |
| 10,007,269 | B1 | 6/2018 | Gray |
| 10,108,867 | B1 | 10/2018 | Vallespi-Gonzalez et al. |
| 10,133,274 | B2 | 11/2018 | Shashua et al. |
| 10,134,278 | B1 | 11/2018 | Konrardy et al. |
| 10,157,331 | B1 | 12/2018 | Tang et al. |
| 10,282,995 | B2 | 5/2019 | Heinla et al. |
| 10,289,469 | B2 | 5/2019 | Fortino et al. |
| 10,372,136 | B2 | 8/2019 | Yang et al. |
| 10,380,886 | B2 | 8/2019 | Ran et al. |
| 10,489,972 | B2 | 11/2019 | Atsmon |
| 10,580,158 | B1 | 3/2020 | Mousavian et al. |
| 10,625,748 | B1 | 4/2020 | Dong et al. |
| 10,635,110 | B2 | 8/2020 | Shashua et al. |
| 10,730,517 | B2 | 8/2020 | Park et al. |
| 10,739,778 | B2 | 8/2020 | Winkler et al. |
| 10,740,954 | B2 | 8/2020 | Liu |
| 10,776,985 | B2 | 9/2020 | Liu et al. |
| 10,829,116 | B2 | 11/2020 | Iagnemma et al. |
| 10,829,793 | B2 | 11/2020 | Arikawa et al. |
| 10,885,698 | B2 | 1/2021 | Muthler et al. |
| 10,942,030 | B2 | 3/2021 | Haque et al. |
| 11,042,163 | B2 | 6/2021 | Chen et al. |
| 11,704,890 | B2 | 7/2023 | Yang et al. |
| 2004/0016870 | A1 | 1/2004 | Pawlicki et al. |
| 2004/0252864 | A1* | 12/2004 | Chang ................ G06K 9/00805 |
| | | | 382/104 |
| 2005/0196034 | A1 | 9/2005 | Hattori et al. |
| 2007/0154068 | A1 | 7/2007 | Stein et al. |
| 2007/0182528 | A1 | 8/2007 | Breed et al. |
| 2008/0266396 | A1 | 10/2008 | Stein |
| 2009/0088941 | A1 | 4/2009 | Tsuchiya et al. |
| 2009/0256840 | A1 | 10/2009 | Varadhan et al. |
| 2010/0045448 | A1 | 2/2010 | Kakinami |
| 2010/0149193 | A1 | 6/2010 | Yu |
| 2010/0322476 | A1 | 12/2010 | Kanhere et al. |
| 2013/0106837 | A1* | 5/2013 | Mukherjee ........... H04N 13/128 |
| | | | 345/419 |
| 2013/0121551 | A1 | 5/2013 | Poulsen et al. |
| 2014/0104424 | A1 | 4/2014 | Zhang et al. |
| 2015/0054824 | A1 | 2/2015 | Jiang |
| 2015/0067672 | A1 | 3/2015 | Mitra et al. |
| 2015/0278578 | A1 | 10/2015 | Otsuka et al. |
| 2015/0346716 | A1 | 12/2015 | Scharfe et al. |
| 2016/0166333 | A1 | 6/2016 | Wang et al. |
| 2016/0247290 | A1 | 8/2016 | Liu et al. |
| 2016/0321074 | A1 | 11/2016 | Hung et al. |
| 2017/0010108 | A1 | 1/2017 | Shashua |
| 2017/0061625 | A1 | 3/2017 | Estrada et al. |
| 2017/0061632 | A1 | 3/2017 | Lindner et al. |
| 2017/0090478 | A1 | 3/2017 | Blayvas et al. |
| 2017/0116781 | A1 | 4/2017 | Babahajiani et al. |
| 2017/0124717 | A1* | 5/2017 | Baruch .................... G06T 7/194 |
| 2017/0220876 | A1 | 8/2017 | Gao et al. |
| 2017/0236013 | A1 | 8/2017 | Clayton et al. |
| 2017/0259801 | A1 | 9/2017 | Abou-Nasr et al. |
| 2017/0344808 | A1 | 11/2017 | El-Khamy et al. |
| 2017/0371340 | A1 | 12/2017 | Cohen et al. |
| 2017/0371346 | A1 | 12/2017 | Mei et al. |
| 2018/0089833 | A1 | 3/2018 | Lewis et al. |
| 2018/0136332 | A1* | 5/2018 | Barfield, Jr. .............. G06T 7/70 |
| 2018/0158244 | A1 | 6/2018 | Ybanez Zepeda et al. |
| 2018/0188059 | A1 | 7/2018 | Wheeler et al. |
| 2018/0203959 | A1 | 7/2018 | Refsnaes et al. |
| 2018/0218214 | A1 | 8/2018 | Pestun et al. |
| 2018/0232663 | A1 | 8/2018 | Ross et al. |
| 2018/0267558 | A1 | 9/2018 | Tiwari et al. |
| 2018/0276278 | A1 | 9/2018 | Cagan et al. |
| 2018/0300590 | A1 | 10/2018 | Briggs et al. |
| 2018/0304468 | A1 | 10/2018 | Holz |
| 2018/0348374 | A1 | 12/2018 | Laddha et al. |
| 2018/0349746 | A1 | 12/2018 | Vellespi-Gonzalez |
| 2018/0370540 | A1 | 12/2018 | Yousuf et al. |
| 2018/0373980 | A1* | 12/2018 | Huval ................ G06K 9/00805 |
| 2019/0016285 | A1 | 1/2019 | Freienstein et al. |
| 2019/0066328 | A1 | 2/2019 | Kwant et al. |
| 2019/0071101 | A1 | 3/2019 | Emura et al. |
| 2019/0094981 | A1 | 3/2019 | Bradski et al. |
| 2019/0101399 | A1 | 4/2019 | Sunil Kumar et al. |
| 2019/0102646 | A1 | 4/2019 | Redmon et al. |
| 2019/0102668 | A1 | 4/2019 | Yao et al. |
| 2019/0129831 | A1 | 5/2019 | Goldberg |
| 2019/0147600 | A1 | 5/2019 | Karasev et al. |
| 2019/0147610 | A1 | 5/2019 | Frossard et al. |
| 2019/0171912 | A1 | 6/2019 | Vellespi-Gonzalez et al. |
| 2019/0179979 | A1 | 6/2019 | Melick |
| 2019/0213481 | A1 | 7/2019 | Godard et al. |
| 2019/0235515 | A1 | 8/2019 | Shirvani et al. |
| 2019/0243371 | A1 | 8/2019 | Nister et al. |
| 2019/0250622 | A1 | 8/2019 | Nister et al. |
| 2019/0251442 | A1 | 8/2019 | Koivisto et al. |
| 2019/0287257 | A1 | 9/2019 | Shishalov et al. |
| 2019/0295282 | A1 | 9/2019 | Smolyanskiy et al. |
| 2019/0302761 | A1 | 10/2019 | Huang et al. |
| 2020/0013176 | A1 | 1/2020 | Kang et al. |
| 2020/0143205 | A1 | 5/2020 | Yao et al. |
| 2020/0160559 | A1 | 5/2020 | Urtasun et al. |
| 2020/0175311 | A1 | 6/2020 | Xu et al. |
| 2020/0257306 | A1* | 8/2020 | Nisenzon ............ G06K 9/00791 |
| 2021/0025696 | A1 | 1/2021 | Goto et al. |
| 2021/0089794 | A1 | 3/2021 | Chen et al. |
| 2021/0286923 | A1 | 9/2021 | Kristensen et al. |
| 2022/0253706 | A1 | 8/2022 | Yang et al. |

FOREIGN PATENT DOCUMENTS

| | | | |
|---|---|---|---|
| EP | 1930863 | A2 | 6/2008 |
| EP | 1930868 | A1 | 6/2008 |
| EP | 2384009 | A2 | 11/2011 |
| KR | 20120009590 | A | 2/2012 |
| WO | 2012011713 | A2 | 1/2012 |
| WO | 2016183074 | A1 | 11/2016 |
| WO | 2017177128 | A1 | 10/2017 |

(56) References Cited

FOREIGN PATENT DOCUMENTS

| WO | 2017220705 A1 | 12/2017 |
|---|---|---|
| WO | 2018002910 A1 | 1/2018 |
| WO | 2018102717 A1 | 6/2018 |

OTHER PUBLICATIONS

Final Office Action dated Dec. 17, 2021 in U.S. Appl. No. 16/355,328, 17 pgs.

Asvadi, A., et al., "DepthCN: Vehicle Detection Using 3D-LIDAR and ConvNet", International Conference on Intelligent Transportation Systems (ITSC), IEEE, pp. 1-6 (Oct. 16, 2017), XP033330533.

Tateno, K., et al., "CNN-SLAM: Real-time dense monocular SLAM with learned depth prediction", Arxiv.Org, Cornell University Library, pp. 6243-6252 (Apr. 11, 2017).

Notice of Allowance dated Aug. 19, 2021 in U.S. Appl. No. 16/277,895, 10 pgs.

Szegedy, C., et al., "Going Deeper with Convolutions", https://arxiv.org/abs/1409.4842; Sep. 17, 2014, 12 pgs.

"Distance Based Ambient Occlusion Filter for Denoising Ambient Occlusions", U.S. Appl. No. 62/644,601, filed Mar. 19, 2018.

"Euler spiral", Wikipedia, Retrieved from Internet URL : https://en.wikipedia.org/wiki/Euler_spiral, accessed on Feb. 21, 2019, pp. 10.

"F1 score", Wikipedia, Retrieved from Internet URL : https://en.wikipedia.org/wiki/F-score, accessed on Feb. 21, 2019, pp. 3.

"Polynomial curve fitting", Retrieved from Internet URL : https://www.mathworks.com/help/matlab/ref/polyfit.html, accessed on Feb. 21, 2019, pp. 13.

"Taxonomy and Definitions for Terms Related to Driving Automation Systems for On-Road Motor Vehicles", Society of Automotive Engineers (SAE), Standard No. J3016-201609, pp. 30 (Sep. 30, 2016).

"Taxonomy and Definitions for Terms Related to Driving Automation Systems for On-Road Motor Vehicles", Society of Automotive Engineers (SAE), Standard No. J3016-201806, pp. 35 (Jun. 15, 2018).

What is polyline?, Webopedia Definition, Retrieved from Internet URL : https://www.webopedia.com/TERM/P/polyline.html, accessed on Feb. 21, 2019, pp. 4.

Bach, M., et al., "Multi-camera traffic light recognition using a classifying Labeled Multi-Bernoulli filter", IEEE Intelligent Vehicles Symposium (IV), pp. 1045-1051 (Jun. 2017).

Bidlack, C., et al., "Visual Robot Navigation using Flat Earth Obstacle Projection", Proceedings Of The IEEE International Conference On Robotics And Automation, pp. 3374-3381 (1994).

Bojarski, M., et al.,"End To End Learning For Self-Driving Cars", arXiv: 1604.07316v1 [cs.CV], XP055570062, Retrieved from the Internet URL:https://nvidia.com/content/tegra/automotive/images/2016/solutions/pdf/end-to-end-dl-using-px.pdf, pp. 1-9 (Apr. 25, 2016).

Chilamkurthy, S., "A 2017 Guide to Semantic Segmentation with Deep Learning", Qure.ai Blog, Retrieved from ntemet URL : http://blog.qure.ai/notes/semantic-segmentation-deep-learning-review, accessed on Feb. 21, 2019, pp. 16 (Jul. 5, 2017).

Deshpande, A., "A Beginner's Guide to Understanding Convolutional Neural Networks", accessed at: https://adeshpande3.github.io/A-Beginner's-Guide-To-Understanding-Convolutional-Neural-Networks/, Accessed on Feb. 21, 2019, pp. 1-13.

Garnett, N., et al., "Real-Time Category-Based and General Obstacle Detection for Autonomous Driving", IEEE International Conference on Computer Vision Workshops, pp. 198-205 (2017).

Godard, C., et al., "Unsupervised Monocular Depth Estimation with Left-Right Consistency", IEEE Computer Society Conference on Computer Vision and Pattern Recognition, pp. 270-279 (2017).

He, L., et al., "Learning Depth from Single Images with Deep Neural Network Embedding Focal Length", Cornell University Library, pp. 1-14 (Mar. 27, 2018).

Huval, B. et al., "An Empirical Evaluation of Deep Learning on Highway Driving", Apr. 17, 2015, 7 pages. Available at: https://arxiv.org/pdf/1504.01716.pdf.

Ioffe, S., and Szegedy, C., "Batch Normalization: Accelerating Deep Network Training by Reducing Internal Covariate Shift", arXiv:1502.03167v3 [cs.LG], pp. 1-12 (Mar. 2, 2015), Available at: https://arxiv.org/abs/1502.03167.

Jayaraman, A., et al., "Creating 3D Virtual Driving Environments for Simulation-Aided Development of Autonomous Driving and Active Safety", SAE Technical Paper, pp. 1-6 (2017).

Kendall, A., et al., "End-to-end Learning of Geometry and Context for Deep Stereo Regression", Cornell University Library, pp. 66-75 (2017).

Kim, W., S., et al., "Depth Map Coding with Distortion Estimation of Rendered View", Proceedings of Spie, vol. 7543, pp. 75430B1-75430B10, (2010).

Kingma, D. P., and Ba, J. L., "Adam: A Method for Stochastic Optimization", published as a conference paper at CLR 2015, arXiv:1412.6980v9 [cs.LG], pp. 1-15 (Jan. 30, 2017).

Liu, H., et al., "Neural Person Search Machines", IEEE International Conference on Computer Vision (ICCV), pp. 493-501 (2017).

Neven, D., et al., "Towards end-to-end lane detection: an instance segmentation approach", In 2018 IEEE intelligent vehicles symposium (IV), pp. 7 (2018).

Pang, J., et al., "Cascade Residual Learning: A Two-Stage Convolutional Neural Network for Stereo Matching", IEEE International Conference on Computer Vision Workshops, pp. 887-895 (2017).

Rothe, R., et al., "Non-maximum Suppression for Object Detection by Passing Messages Between Windows", ETH Library, pp. 1-17 (2015).

Stein, G. P., et al., "Vision-Based ACC With A Single Camera: Bounds On Range And Range Rate Accuracy", Proceedings Of IEEE Intelligent Vehicle Symposium, pp. 1-6 (2003).

Suorsa, R., E., and Sridhar, B., "A Parallel Implementation of a Multisensor Feature-Based Range-Estimation Method", IEEE Transactions On Robotics And Automation, pp. 1-34 (1993).

Tao, A., "Detectnet: Deep neural network for object detection in digits", NVIDIA Developer Blog, Retrieved from Internet URL: https://devblogs.nvidia.com/detectnet-deep-neural-network-object-detection-digits/, accessed on Jul. 22, 2019, pp. 9 (2016).

Virgo, M., "Lane Detection with Deep Learning (Part 1)", Accessed on Feb. 22, 2019 at: https://towardsdatascience.com/lane-detection-with-deep-learning-part-1-9e096f3320b7, pp. 1-10 (May 9, 2017).

Weber, M., et al., "DeepTLR: A single deep convolutional network for detection and classification of traffic lights", IEEE Intelligent Vehicles Symposium (IV), pp. 8 (Jun. 2016).

Zhong, Y., et al., "Self-Supervised Learning for Stereo Matching with Self-Improving Ability", Cornell University Library, pp. 1-13 (2017).

"Conservative Control for Zone Driving of Autonomous Vehicles Using Safe Time of Arrival", U.S. Appl. No. 62/628,831, filed Feb. 9, 2018.

"Convolutional Neural Networks to Detect Drivable Freespace for Autonomous Vehicles", U.S. Appl. No. 62/643,665, filed Mar. 15, 2018..

"Deep Neural Network for Estimating Depth from Stereo Using Semi-Supervised Learning", U.S. Appl. No. 62/646,148, filed Mar. 21, 2018.

"Energy Based Reflection Filter for Denoising Ray-Traced Glossy Reflections", U.S. Appl. No. 32/644,386, filed Mar. 17, 2018.

"Geometric Shadow Filter for Denoising Ray-Traced Shadows", U.S. Appl. No. 62/644,385, filed Mar. 17, 2018.

"Methodology of Using a Single Controller (ECU) For a Fault-Tolerant/Fail-Operational Self-Driving System", U.S. Appl. No. 62/524,283, filed Jun. 23, 2017.

"Methods for Accurate Real-time Lane and Road Boundary Detection for Autonomous Driving", U.S. Appl. No. 62/636,142, filed Feb. 27, 2018.

"Methods for accurate real-time object detection and for determining confidence of object detection suitable for D autonomous vehicles", U.S. Appl. No. 62/631,781, filed Feb. 18, 2018.

"Network Injection Rate Limiting", U.S. Appl. No. 62/648,326, filed Mar. 26, 2018.

(56) References Cited

OTHER PUBLICATIONS

"Network Synchronization Using Posted Operation Tracking For Flush Semantics", U.S. Appl. No. 62/648,333, filed Mar. 26, 2018.
"Pruning Convolutional Neural Networks for Autonomous Vehicles and Robotics", U.S. Appl. No. 62/630,445, filed Feb. 14, 2018.
"System and Method for Autonomous Shuttles, Robo-Taxis, Ride-Sharing and On-Demand Vehicles", U.S. Appl. No. 62/635,503, filed Feb. 26, 2018.
"System and Method for Safe Operation of Autonomous Vehicles", U.S. Appl. No. 62/625,351, filed Feb. 2, 2018.
"System and Method for Sharing Camera Data Between Primary and Backup Controllers in Autonomous Vehicle Systems", U.S. Appl. No. 62/629,822, filed Feb. 13, 2018.
"System and Methods for Advanced AI-Assisted Vehicles", U.S. Appl. No. 62/648,358, filed Mar. 26, 2018.
"Systems and Methods for Safe and Reliable Autonomous Vehicles", U.S. Appl. No. 62/584,549, filed Nov. 10, 2017.
"Video Prediction Using Spatially Displaced Convolution", U.S. Appl. No. 62/646,309, filed Mar. 21, 2018.
"System and method for controlling autonomous vehicles", U.S. Appl. No. 62/614,466, filed Jan. 1, 2018.
Adaptive Occlusion Sampling of Rectangular Area Lights with Voxel Cone Tracing, U.S. Appl. No. 32/644,806, filed Mar. 19, 2018.
"Video Prediction Using Spatially Displaced Convolution", U.S. Appl. No. 62/647,545, filed Mar. 23, 2018.
Non-Final Office Action for U.S. Appl. No. 17/522,624, filed Nov. 9, 2021, dated Feb. 2, 2023, 19 pgs.
Notice of Allowance for U.S. Appl. No. 17/522,624, filed Nov. 9, 2021, dated Mar. 1, 2023, 38 pgs.
Non-Final Office Action for U.S. Appl. No. 17/449,310, filed Sep. 29, 2021, dated Mar. 2, 2023, 30 pgs.
"What are deconvolutional layers?", Data Science Stack Exchange, Retrieved from Internet URL: https://datascience.stackexchange.com/questions/6107/what%E2%80%90are%E2%80%90deconvolutional%E280%90layers, accessed on Feb. 21, 2019, 21 pgs.
Dipietro, R., "A Friendly Introduction to Cross-Entropy Loss," Version 0.1, Retrieved from Internet URL: https://rdipietro.github.io/friendly-intro-to-cross-entropy-loss/, accessed Feb. 21, 2019, 10 pgs. (May 2, 2016).
Foley, D., and Danskin, J., "Ultra-Performance Pascal GPU and NVLink Interconnect", IEEE Computer Society, IEEE Micro, vol. 37, No. 2, pp. 1-11 (2017).
Xie, S., and Tu, Z., "Holistically-Nested Edge Detection", Computer Vision Foundation, pp. 1395-1403 (2015).
Du, L., and Du, Y., "Hardware Accelerator Design for Machine Learning," Machine Learning—Advanced Techniques and Emerging Applications, Retrieved from Internet URL: https://www.intechopen.com/chapters/58659, pp. 1-14.
Notice of Allowance dated Dec. 14, 2021 in U.S. Appl. No. 16/728,595, 8 pages.
Final Office Action for U.S. Appl. No. 16/186,473, filed Nov. 9, 2018, dated Dec. 29, 2021, 22 pgs.
Notice of Allowance for U.S. Appl. No. 16/728,598, filed Jul. 16, 2021, dated Jul. 16, 2021, 9 pgs.
Notice of Allowance for U.S. Appl. No. 16/813,306, filed Mar. 9, 2020, dated Oct. 7, 2021, 9 pgs.
Long, et al.; "Fully convolutional networks for semantic segmentation", CVPR, Nov. 2015, 10 pgs.
Alvarez, et al.; "Road scene segmentation from a single image", In Proceedings of the 12th European Conference on Computer Vision—vol. Part VII, ECCV'12, pp. 376-389, Berlin, Heidelberg, 2012.
Brust, et al.; "Convolutional Patch networks with spatial prior for road detection and urban scene understanding", In International Conference on Computer Vision Theory and Applications (VISAPP), 2015.
Mohan, Rahul; "Deep deconvolutional networks for scene parsing", CoRR, abs/1411.4101,2014.
Oliveira, et al.; "Efficient Deep Models for Monocular Road Segmentation", IEEE/RSJ International Conference on Intelligent Robots and Systems (IROS 2016).
Teichmann, et al.; "Multinet: Real-time joint semantic reasoning for autonomous driving", arXiv preprint arXiv:1612.07695, 2016.
Wang, et al.; "Embedding Structured Contour and Location Prior in Siamesed Fully Convolutional Networks for Road Detection", in IEEE Transactions on Intelligent Transportation Systems, vol. 19, No. 1, pp. 230-241, Jan. 2018.
Mendes, et al.; "Exploiting fully convolutional neural networks for fast road detection", Proc. IEEE Int. Conf. Robot. Auto. (ICRA), pp. 3174-3179, May 2016.
"Neural Networks", https://www.tensorflow.org/api_guides/python/nn#conv2d_transpose.
Han, et al.; "Learning both Weights and Connections for Efficient Neural Networks", https://arxiv.org/abs/1506.02626.
Molchanov, et al.; "Pruning Convolutional Neural Networks for Resource Efficient Inference", https://arxiv.org/abs/1611.06440.
Elfes; "Sonar-based real-world mapping and navigation", Journal of Robotics and Automation, 1987.
Thrun, et al.; "Probabilistic Robotics: Intelligent Robotics and Autonomous Agents" The MIT Press, 2005.
Badino, et al.; "Free space computation using stochastic occupancy grids and dynamic programming", In ICCV Workshop on Dynamical Vision, 2007.
Franke, et al.; "Fast stereo based object detection for stop and go traffic", In IV, 1996.
Badino, et al.; "The stixel world—a compact medium level representation of the 3d-world", in DAGM, 2009.
Hirschmuller, "Stereo processsing by semiglobal matching and mutual information", PAMI, 2008.
Benenson; "Stixels estimation without depth map computation", In ICCV, 2011.
Yao, et al.; "Estimating drivable collision-free space from monocular video", in Applications of Computer Vision, 2015, pp. 420-427.
Levi, et al.; "Stixelnet: A deep convolutional network for obstacle detection and road segmentation", 26th British Machine Vision Conference (BMVC) 2015.
"Reliability Enhancement Systems and Methods" U.S. Appl. No. 15/338,247, filed Oct. 28, 2016.
"Programmable Vision Accelerator", U.S. Appl. No. 15/144,703, filed Apr. 28, 2016.
"Method Of Using A Signle Controller (ECU) For A Fault-Tolerant/Fail-Operational Self-Driving System" U.S. Appl. No. 15/881,426, filed Jan. 26, 2018.
He et al., "Deep Residual Learning for Image Recognition", https://arxiv.org/abs/1512.03385; Dec. 10, 2015, 12 pages.
Kwon, Junghyun; Notice of Allowance for U.S. Appl. No. 17/449,310, filed Sep. 29, 2021, dated May 15, 2023, 13 pgs.

* cited by examiner

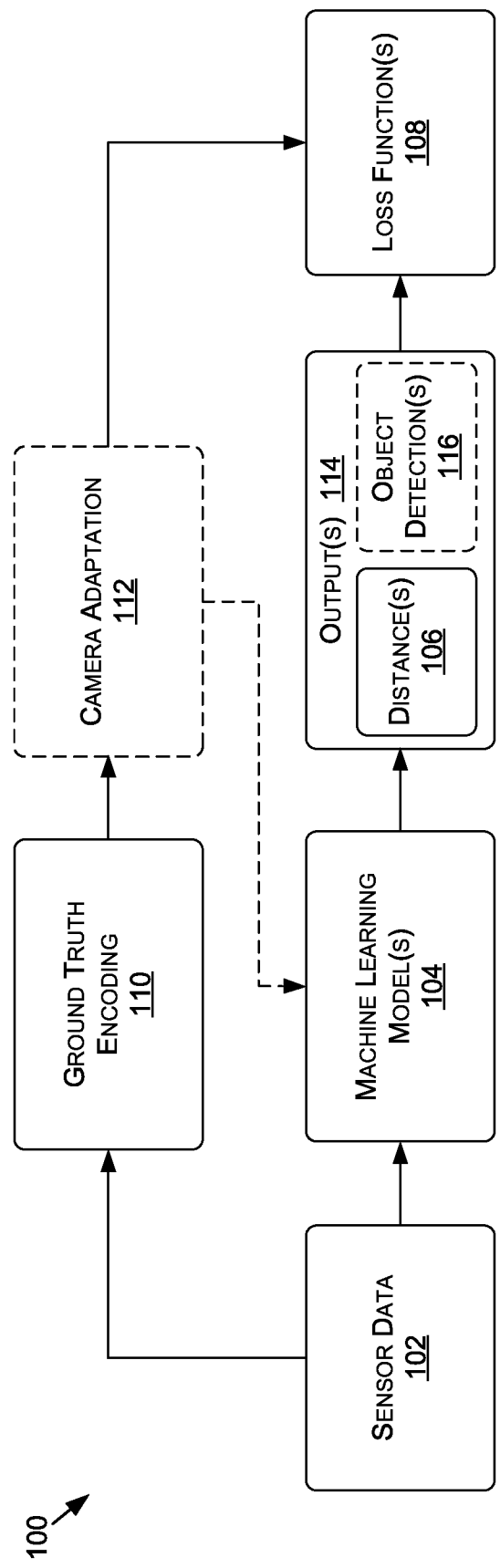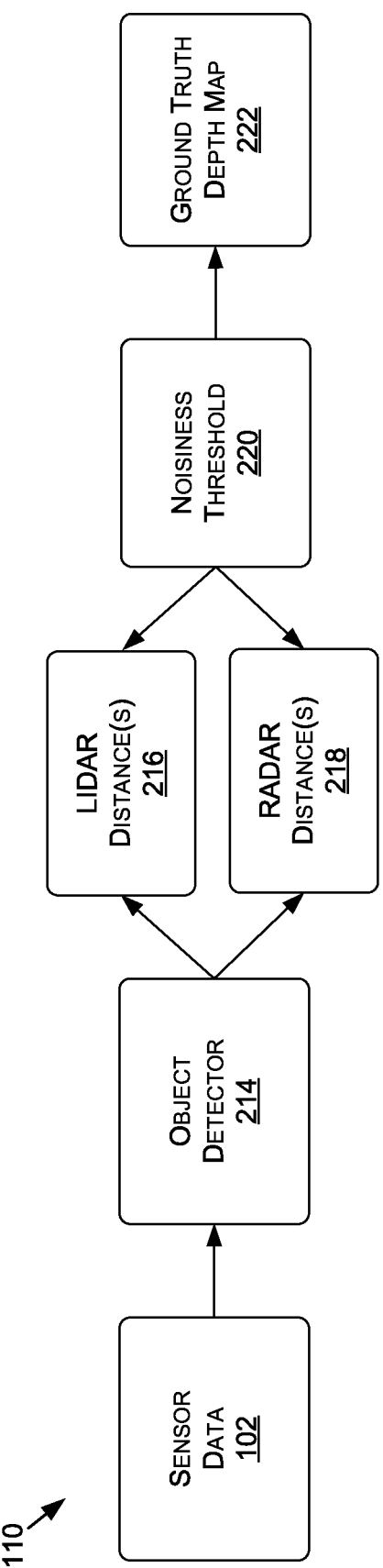

DISTANCE TO OBSTACLE DETECTION IN AUTONOMOUS MACHINE APPLICATIONS

CROSS-REFERENCE TO RELATED APPLICATIONS

This application is a continuation of U.S. patent application Ser. No. 17/449,310, filed on Sep. 29, 2021, which itself is a continuation of U.S. patent application Ser. No. 16/813,306, filed on Mar. 9, 2020, now issued as U.S. Pat. No. 11,170,229, which itself is a continuation in part of U.S. application Ser. No. 16/728,595, filed on Dec. 27, 2019, and claims the benefit of U.S. Provisional Application No. 62/786,188, filed on Dec. 28, 2018. The contents of each of which are hereby incorporated by reference in their entirety.

BACKGROUND

The ability to correctly detect the distance between a vehicle—such as an autonomous or semi-autonomous vehicle—and objects or obstacles in the environment is critical to safe operation of the vehicle. For example, accurate distance to obstacle estimates—based on sensor data—is at the core of both longitudinal control tasks, such as automatic cruise control (ACC) and automated emergency braking (AEB), and lateral control tasks, such as safety checks for lane changes as well as safe lane change execution.

Conventional approaches to computing distance to objects or obstacles in an environment of a vehicle have relied on an assumption that a ground plane, or the Earth, is flat. Based on this assumption, three-dimensional (3D) information may be modeled using two-dimensional (2D) information sources—such as a 2D image. For example, because the ground plane is assumed to be flat, conventional systems further assume that the bottom of a two-dimensional bounding box corresponding to a detected object is located on the ground plane. As such, once an object is detected, and based on this flat ground assumption, simple geometry is used to calculate the distance of the given object or obstacle from vehicle.

However, these conventional approaches suffer when the actual road surfaces defining the actual ground plane are curved or otherwise not flat. For example, when applying the assumption that the ground plane is flat when in fact it is not, a curve in a driving surface causes inaccurate predictions—e.g., over- or under-estimated—with respect to distances to objects or obstacles in the environment. In either scenario, inaccurate distance estimates have a direct negative consequence on various operations of the vehicle, thereby potentially compromising the safety, performance, and reliability of both lateral and longitudinal control or warning related driving features. As an example, an under-estimated distance may result in failure to engage ACC and, even more critically, failure to engage AEB features to prevent a potential collision. Conversely, an over-estimated distance may result in failure of ACC or AEB features being activated when not needed, thereby causing potential discomfort or harm to passengers, while also lowering confidence of the passengers with respect to the ability of the vehicle to perform safely.

Another drawback of conventional systems is the reliance on unity between cameras used during training and cameras used in deployment. For example, because a deep neural network (DNN) may learn from the scale of the objects and the surrounding environment, a limitation arises when the image data used during deployment is generated by a camera having different parameters than a camera used in training. For example, a scale of objects in the training image data may appear differently than the scale of objects in the deployed image data, thereby resulting in inaccurate predictions of the DNN with respect to distances to objects or obstacles. These inaccurate predictions may lead to similar issues as described above with respect to the accuracy and effectiveness of various driving tasks of the vehicle.

SUMMARY

Embodiments of the present disclosure relate to distance to obstacle computation in autonomous machine applications. Systems and methods are disclosed that accurately and robustly predict distances to objects or obstacles in an environment using a deep neural network (DNN) trained with sensor data—such as LIDAR data, RADAR data, SONAR data, image data, and/or the like. For example, by using sensor data other than only image data for training the DNN, the predictions of the DNN are accurate and reliable even for driving surfaces that are curved or otherwise not flat.

In contrast to conventional systems, such as those described above, a DNN may be trained—using one or more depth sensors, such as LIDAR sensors, RADAR sensors, SONAR sensors, and/or the like to predict distances to objects or obstacles in the environment using image data generated by one or more cameras of a vehicle. As such, by leveraging depth sensors for ground truth generation during training, the DNN may accurately predict—in deployment—distances to objects or obstacles in the environment using image data alone. Particularly, relying on RADAR data to aid in ground truth generation may be helpful for training the DNN to estimate objects at greater distances, such as over fifty meters from the vehicle. In addition, because embodiments are not limited to a flat ground estimation—a drawback of conventional systems—the DNN may be able to robustly predict distances regardless of the topology of the driving surface.

The ground truth data encoding pipeline may use sensor data from depth sensor(s) to—automatically, without manual annotation, in embodiments—encode ground truth data corresponding to training image data in order to train the DNN to make accurate predictions from image data alone. As a result, training bottlenecks that result from manual labeling may be removed, and the training period may be reduced. In addition, in some embodiments, a camera adaptation algorithm may be used to overcome the variance in intrinsic characteristics across camera models, thereby allowing the DNN to perform accurately, irrespective of the camera model.

In some embodiments, as a result of potential noise in predictions of the DNN, a safety bounds computation may be performed during post-processing to ensure that the computed distance falls within a safety-permissible range of values. For example, the shape of the driving surface and/or data corresponding to a bounding shape of an object or obstacle may be leveraged to determine an upper distance bound and/or a lower distance bound. As such, when a prediction of the DNN is outside of the safety-permissible range, the distance values may be clamped to the upper distance bound or the lower distance bound.

BRIEF DESCRIPTION OF THE DRAWINGS

The present systems and methods for distance to Obstacle detection in autonomous machine applications are described in detail below with reference to the attached drawing figures, wherein:

FIG. 1 is a data flow diagram for a process of training a machine learning model(s) to predict distances to objects and/or obstacles in an environment, in accordance with some embodiments of the present disclosure;

FIG. 2 is a data flow diagram for ground truth data encoding using sensor data, in accordance with some embodiments of the present disclosure;

DETAILED DESCRIPTION

Figure 3A:
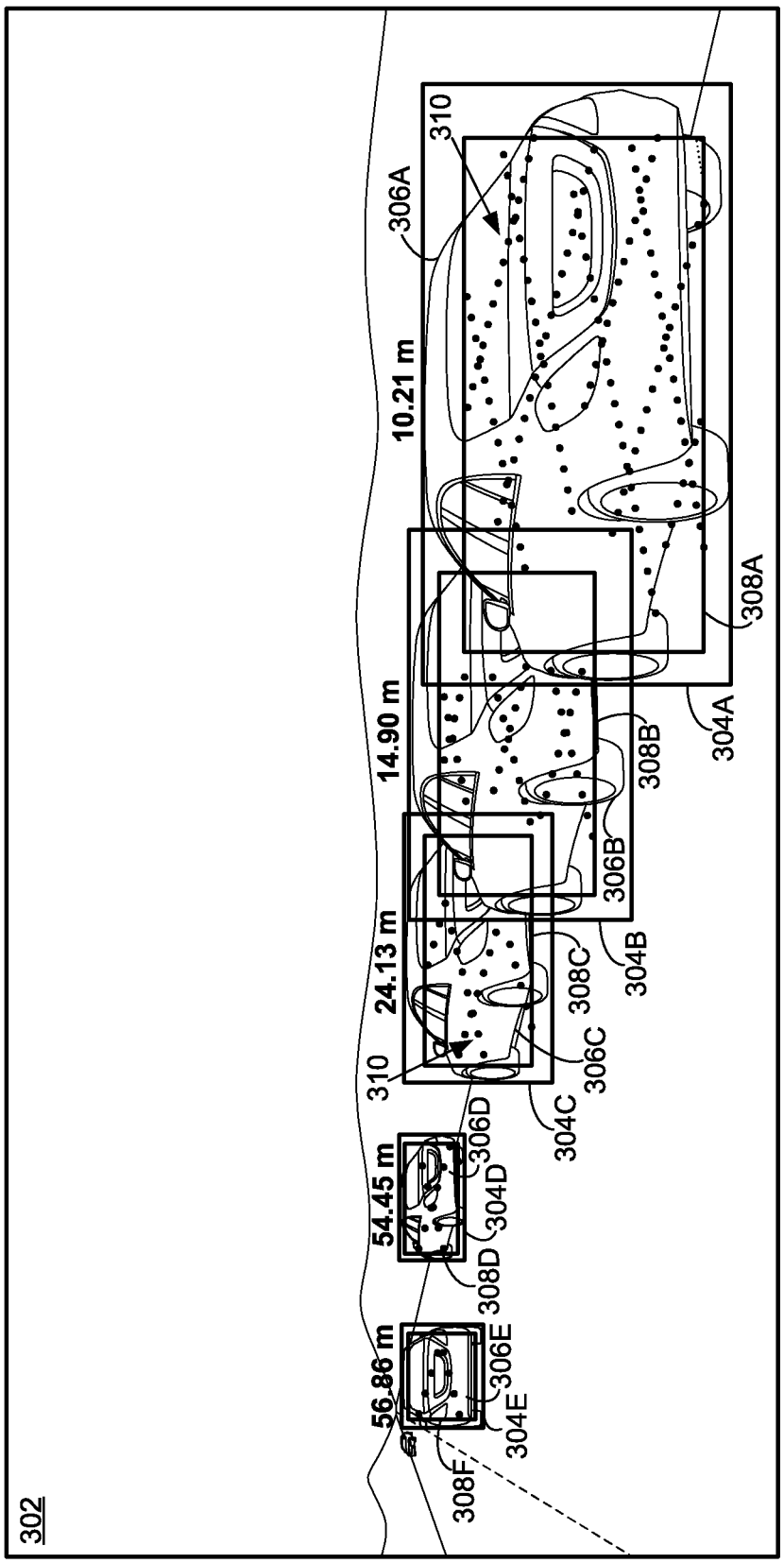
FIG. 3A is a visualization of ground truth data generated by a LIDAR sensor(s), in accordance with some embodiments of the present disclosure.

Systems and methods are disclosed related to distance to obstacle detection in autonomous machine applications. Although the present disclosure may be described with respect to an example autonomous vehicle 1400 (alternatively referred to herein as "vehicle 1400", "ego-vehicle 1400", or "autonomous vehicle 1400," an example of which is described with respect to FIGS. 14A-14D this is not intended to be limiting. For example, the systems and methods described herein may be used by, without limitation, non-autonomous vehicles, semi-autonomous vehicles (e.g., in one or more adaptive driver assistance systems (ADAS)), robots, warehouse vehicles, off-road vehicles, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to autonomous driving or ADAS systems, this is not intended to be limiting. For example, the systems and methods described herein may be used in simulation environment (e.g., to test accuracy of machine learning models during simulation), in robotics, aerial systems, boating systems, and/or other technology areas, such as for perception, world model management, path planning, obstacle avoidance, and/or other processes.

Training a Machine Learning Model(s) for Distance Predictions

Now referring to FIG. 1, FIG. 1 is a data flow diagram for a process 100 of training a machine learning model(s) to predict distances to objects and/or obstacles in an environment, in accordance with some embodiments of the present disclosure. The process 100 may include generating and/or receiving sensor data 102 from one or more sensors of the vehicle 1400. In deployment, the sensor data 102 may be used by the vehicle 1400, and within the process 100, to predict depths and/or distances to one or more objects or obstacles such as other vehicles, pedestrians, static objects, etc.—in the environment. For example, the distances predicted may represent a value in a "z" direction, which may be referred to as a depth direction. The sensor data 102 may include, without limitation, sensor data 102 from any of the sensors of the vehicle 1400 (and/or other vehicles or objects, such as robotic devices, VR systems, AR systems, etc., in some examples). For example, and with reference to FIGS. 14A-14C, the sensor data 102 may include the data generated by, without limitation, global navigation satellite systems (GNSS) sensor(s) 1458 (e.g., Global Positioning System sensor(s)), RADAR sensor(s) 1460, ultrasonic sensor(s) 1462, LIDAR sensor(s) 1464, inertial measurement unit (IMU) sensor(s) 1466 (e.g., accelerometer(s), gyroscope(s), magnetic compass(es), magnetometer(s), etc.), microphone(s) 1496, stereo camera(s) 1468, wide-view camera(s) 1470 (e.g., fisheye cameras), infrared camera(s) 1472, surround camera(s) 1474 (e.g., 360 degree cameras), long-range and/or mid-range camera(s) 1498, speed sensor(s) 1444 (e.g., for measuring the speed of the vehicle 1400), and/or other sensor types. Although reference is primarily made to the sensor data 102 corresponding to LIDAR data, RADAR data, and image data, this is not intended to be limiting, and the sensor data 102 may alternatively or additionally be generated by any of the sensors of the vehicle 1400, another vehicle, and/or another system (e.g., a virtual vehicle in a simulated environment).

In some examples, the sensor data 102 may include the sensor data generated by one or more forward-facing sensors, side-view sensors, and/or rear-view sensors. This sensor data 102 may be useful for identifying, detecting, classifying, and/or tracking movement of objects around the vehicle 1400 within the environment. In embodiments, any number of sensors may be used to incorporate multiple fields of view (e.g., the fields of view of the long-range cameras 1498, the forward-facing stereo camera 1468, and/or the forward facing wide-view camera 1470 of FIG. 14B) and/or sensory fields (e.g., of a LIDAR sensor 1464, a RADAR sensor 1460, etc.).

In some embodiments, a machine learning model(s) 104 may be trained to predict distance(s) 106 and/or object detection(s) 116 using image data alone. For example, the process 100 may be used to train the machine learning model(s) 104 to predict the distance(s) 106—or a depth map that may be converted to distances—of one or more objects and/or obstacles in the environment using images alone as input data. In addition, in some embodiments, the machine learning model(s) 104 may be trained to intrinsically compute the object detection(s) 116 (however, in some embodiments, the object detection(s) may be computed by an object detector—such as an object detection algorithm, a computer vision algorithm, a neural network, etc.). In order to more effectively train the machine learning model(s) 104, however, additional data from the sensor data 102—such as LIDAR data, RADAR data, SONAR data, and/or the like—may be used to generate ground truth data corresponding to the images (e.g., via ground truth encoding 110). In return, the ground truth data may be used to increase the accuracy of the machine learning model(s) 104 at predicting the distances) 106 and/or the object detection(s) 116 by leveraging the additional accuracy of this supplemental sensor data 102 (e.g., LIDAR data, RADAR data, SONAR data, etc.).

With respect to the inputs to the machine learning model(s) 104, the sensor data 102 may include image data representing an image(s) and/or image data representing a video (e.g., snapshots of video). Where the sensor data 102 includes image data, any type of image data format may be used, such as, for example and without limitation, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC), or other type of imaging sensor, and/or other formats. In addition, in some examples, the sensor data 102 may be used within the process 100 without any pre-processing (e.g., in a raw or captured format), while in other examples, the sensor data 102 may undergo pre-processing (e.g., noise balancing, demosaicing, scaling, cropping, augmentation, white balancing, tone curve adjustment, etc., such as using a sensor data pre-processor (not shown). As used herein, the sensor data 102 may reference unprocessed sensor data, pre-processed sensor data, or a combination thereof.

As a non-limiting embodiment, to generate the ground truth data for training the machine learning model(s) 104, ground truth encoding 110 may be performed according to the process for ground truth encoding 110 of FIG. 2. For example, the sensor data 102—such as image data representative of one or more images may be used by an object detector 214 to detect objects and/or obstacles represented by the image data. For example, persons, animals, vehicles, signs, poles, traffic lights, buildings, flying vessels, boats, and/or other types of objects and/or obstacles may be detected by the object detector 214. An output of the object detector 214 may be locations of bounding shapes (e.g., bounding boxes, rectangles, squares, circles, polygons, etc.) corresponding to the objects or obstacles represented by the image data. Once the bounding shape locations and dimensions are known with respect to a particular image, additional sensor data 102—such as LIDAR data and/or RADAR data, as non-limiting examples—may be used to determine distances to the objects or obstacles corresponding to the respective bounding shapes. As such, where a distance to an object or obstacle may be difficult to ascertain accurately using image data alone—or another two-dimensional representation—this additional sensor data 102 may be used to increase the accuracy of the predictions with respect to the distances to objects or obstacles within the images.

In some embodiments, the ground truth encoding 110 may occur automatically without manual and/or human labeling or annotations. For example, because conversions from world space outputs of one or more LIDAR sensors, RADAR sensors, SONAR sensors, etc. to image space outputs of one or more cameras may be known, and because the locations and dimensions of bounding shapes within the image space may be known, the distances (e.g., LIDAR distances 216, RADAR distances 218, etc.) may be correlated automatically with the objects and/or obstacles within the images. As an example, where a distance(s) to one or more objects in world space is determined to correspond to a region of image space associated with a bounding shape of an object, the distance(s) may be associated with the object for the purposes of ground truth encoding 110. In some examples, a single distance value may be correlated to each object while in other examples the distances corresponding to an object may vary based on varying distance outputs of LIDAR sensors, RADAR sensors, SONAR sensors, and/or the like.

In some embodiments, LIDAR distance(s) 216 determined from LIDAR data generated by one or more LIDAR sensor(s) 1464 may be used for ground truth encoding 110 of distances. For example, and with respect to FIG. 3A, bounding shapes 304A-304E corresponding respectively to objects 306A-306E may be generated by the object detector 214 and associated with an image 302. In addition, LIDAR data—represented by LIDAR points 310 in the visualization of FIG. 3A—may be associated with the image 302. For example, as described herein, conversions between world space locations and corresponding image space locations of LIDAR data may be known, or determined, using intrinsic and/or extrinsic parameters—e.g., after calibration—of the LIDAR sensor(s) 1465 and/or the camera(s) that generated the image 302. As such, because this relationship between world space and image space is known, and because the LIDAR data and the image data may have been captured substantially simultaneously, the LIDAR data distance predictions may be associated with the various objects 306—or their corresponding bounding shapes 304—in the image 302.

Although the LIDAR points are only illustrated within the bounding shapes 304, this is not intended to be limiting and is for illustrative purposes only. In some examples, the LIDAR points may be generated to correspond to the entire image 302, or to correspond to additional or alternative portions of the image 302 than the visualization of FIG. 3A illustrates.

In some embodiments, a cropped bounding shape 308 may be generated for each object 306 that is equal to or lesser in size than the bounding shape 304 corresponding to the object. For example, because the bounding shapes 304 output by an object detector (e.g., an object detection neural network, a computer vision algorithm, or another object detection algorithm) may include additional portions of the environment that are not part of the object 306 or obstacle. As such, and in an effort to increase accuracy of the reconciliation of the depth values from the LIDAR data with pixels of the image 302 that correspond to the object 306 or obstacle, the cropped bounding shapes 308 may be created within the bounding shapes 304.

In some examples, the dimensions of the cropped bounding shapes 308 may be determined based on a distance of the object 306 from a reference location (e.g., from the ego-vehicle, from the camera, from the LIDAR sensor, etc.), such that as an object moves further away from a reference location, the amount of cropping changes. For example, the amount, percentage (e.g., percentage of the bounding shape 304), or ratio (ratio of the size of the cropped bounding shape 308 with respect to the bounding shape 304, or vice versa) of cropping may decrease as the distance of the object 306 increases, or vice versa. In such examples, there may be a calculated change in the amount, percentage, or ratio of cropping according to distance (e.g., using one or more equations, curves, relationships, functions, etc.), or there may be zones, where particular distance zones correspond to a certain amount, percentage, or ratio of cropping. For instance, at a first range of distances from 0-10 meters, the crop may be 50%, at 10-20 meters, the crop may be 40%, at 20-40 meters, the crop may be 35%, and so on.

In some embodiments, the dimensions of the cropped bounding shapes 308 may be determined differently for different sides or edges of the cropped bounding shapes 308. For example, a bottom crop of the bounding shape 304 to generate a corresponding cropped bounding shape 308 may be a different amount, percentage, or ratio than a top crop, a left side crop, and/or a right side crop, a top crop of the bounding shape 304 to generate a corresponding cropped bounding shape 308 may be a different amount, percentage, or ratio than a bottom crop, a left side crop, and/or a right side crop, and so on. For example, a bottom crop may be a set amount, percentage, or ratio for each cropped bounding shape 308 while the top crop may change based on some factor or variable—such as distance from the reference location, type of object, etc. or vice versa. As a non-limiting example, the bottom crop may always be 10%, while the top crop may be in a range between 10% and 20%, where a value within the range is determined based on some function of distance of the object 306 from a reference location.

In at least one embodiment, the LIDAR points 310 used to determine the distance of an object 306 may be the LIDAR points 310 that correspond to the cropped bounding shape 308. As a result, in such embodiments, the likelihood that the depths or distances determined to correspond to the object 306 actually correspond to the object 306 is increased. In other embodiments, the LIDAR points 310 used to determine the distance to an object may be the LIDAR points 310 that correspond to the bounding shapes 304 (and the cropped bounding shapes 304 may not be used, or generated, in such embodiments). The distance that is associated with each object 306 (e.g., 10.21 meters (m) for the object 306A, 14.90 m for the object 306B, 24.13 in for the object 306C, 54.45 in for the object 306D, and 58.86 m for the object 306E) may be determined using one or more of the LIDAR points 310 associated with the corresponding bounding shape 304 and/or cropped bounding shape 308. For example, distances associated with each of the LIDAR points 310 within the bounding shape 304 and/or the bounding shape 308 may be averaged to generate the final distance value. As another example, a LIDAR point 310 closest to a centroid of the bounding shape 304 and/or the cropped bounding shape 308 may be used to determine the final distance value. In a further example, a group or subset of the LIDAR points 310 such as a subset within a region near a centroid of the bounding shape 304 and/or the cropped bounding shape 308—may be used to determine the final distance value for an object 306 (e.g., by averaging, weighting, and/or otherwise using the distance values associated with each of the group or subset of the LIDAR points 310 to compute the final distance value).

In addition, in some embodiments, to help reduce noise in the LIDAR points 310 projected into the image space, a filtering algorithm may be applied to remove or filter out noisy LIDAR points 310. For example, and without limitation, a random sample consensus (RANSAC) algorithm may be applied to the camera-to-LIDAR data point associations to cluster and filter out the noisy LIDAR points 310. As a result of using a filtering algorithm, such as RANSAC, the surviving LIDAR points 310 that are within a given bounding shape 304 and/or cropped bounding shape 308 may be interpreted to be a common distance away from the camera or other reference location.

In some embodiments, RADAR distance(s) 218 determined from RADAR data generated by one or more RADAR sensor(s) 1460 may be used for ground truth encoding 110 of distances. For example, and with respect to FIG. 3B, bounding shapes 304A-304E corresponding respectively to objects 306A-306E may be generated by the object detector 214 and associated with an image 302. In addition, RADAR data represented by RADAR points 312 in the visualization of FIG. 3B—may be associated with the image 302. For example, as described herein, conversions between world space locations and corresponding image space locations of RADAR data may be known, or determined, using intrinsic and/or extrinsic parameters—e.g., after calibration—of the RADAR sensor(s) 1460 and/or the camera(s) that generated the image 302. In some embodiments, RADAR target clustering and tracking may be used to determine the associations between RADAR points 312 and objects 306—or bounding shapes 304 corresponding thereto. As such, because this relationship between world space and image space is known, and because the RADAR data and the image data may have been captured substantially simultaneously, the RADAR data distance predictions may be associated with the various objects 306—or their corresponding bounding shapes 304—in the image 302.

Although the RADAR points 312 are only illustrated within the bounding shapes 304, this is not intended to be limiting and is for illustrative purposes only. In some examples, the RADAR points may be generated to correspond to the entire image 302, or to correspond to additional or alternative portions of the image 302 than the visualization of FIG. 313 illustrates.

In some embodiments, similar to the description herein with respect to the FIG. 3A, a cropped bounding shape 308 (not illustrated in FIG. 3B) may be generated for each object 306 that is equal to or lesser in size than the bounding shape 304 corresponding to the object. In such embodiments, and in an effort to increase accuracy of the reconciliation of the depth values from the RADAR data with pixels of the image 302 that correspond to the object 306 or obstacle, the cropped bounding shapes 308 may be created within the bounding shapes 304. As such, in at least one embodiment, the RADAR points 312 used to determine the distance of an object 306 may be the RADAR points 312 that correspond to the cropped bounding shape 308.

Figure 3B:
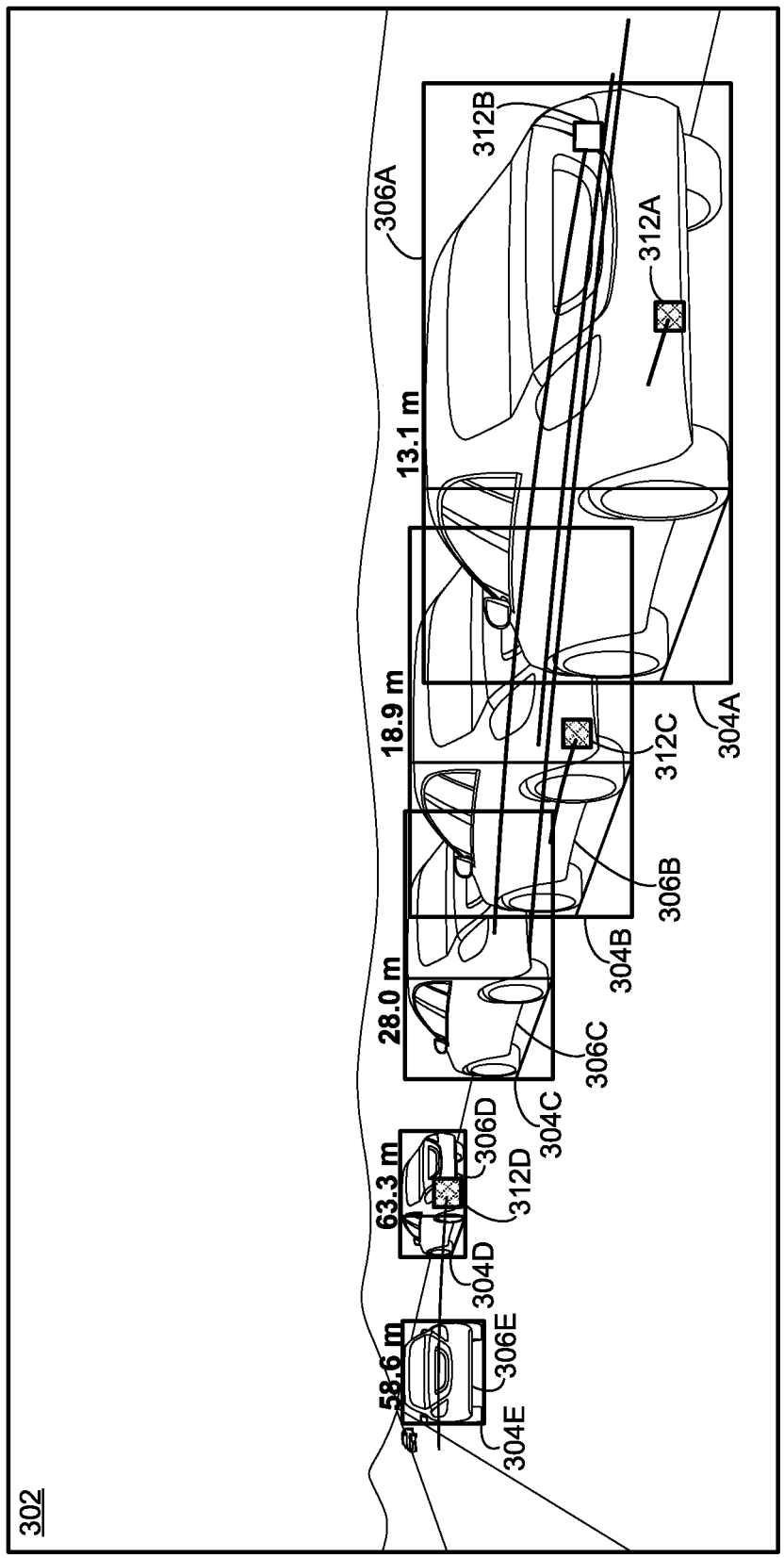
FIG. 3B is a visualization of ground truth data generated by a RADAR sensor(s), in accordance with some embodiments of the present disclosure.

The distance that is associated with each object 306 (e.g., 13.1 m for the object 306A, 18.9 m for the object 306B, 28.0 m for the object 306C, 63.3 m for the object 306D, and 58.6 m for the object 306E) may be determined using one or more of the RADAR points 312 associated with the corresponding bounding shape 304 and/or cropped bounding shape 308. For example, distances associated with each of the RADAR points 312 within the bounding shape 304 (e.g., the RADAR points 312A and 312B in FIG. 3B) and/or the bounding shape 308 may be averaged to generate the final distance value. As another example, a single RADAR point 312 may be selected for use in computing the final distance value. For example, as illustrated in FIG. 3B, the RADAR point 312A may be used for the object 306A (as indicated by the cross-hatching) while the RADAR point 3128 may not be used. For example, a confidence may be associated with the camera-to-RADAR points such that a higher confidence point may be selected (e.g., the RADAR point 312A may be selected over the RADAR point 312B). The confidence may be determined using any calculation, such as, without limitation, a distance to a centroid of the bounding shape 304 and/or the cropped bounding shape 308.

Once the final distance values have been determined for each object 306 using the LIDAR data and/or the RADAR data (and/or SONAR data, ultrasonic data, etc.), a determination may be made as to which of the final distance values should be used for each object 306 may be made. For example, for each object 306, a determination as to whether the LIDAR distance(s) 216, the RADAR distance(s) 218, and/or a combination thereof should be used for generating a ground truth depth map 222 may be made. Where a distance for a particular object 306 has only been computed from one depth sensor modality (e.g., RADAR or LIDAR), the distance associated with the object 306 may be the distance from the one depth sensor modality. Where two or more modalities have computed distances for a particular object 306, a noisiness threshold 220 may be used to determine which modality(ies) to use for the distance values. In some non-limiting embodiments, the noisiness threshold 220 may be optimized as a hyper-parameter. Although any number of depth sensor modalities may be used, in examples using RADAR and LIDAR, a single modality may be selected over the other where both have corresponding depth values for an object. For example, LIDAR distance(s) 216 may be selected over RADAR distance(s) 218, or vice versa. In other examples, one modality may be selected below a threshold distance and another may be selected beyond the threshold distance. In such examples, the LIDAR distance(s) 216 may be used at closer distances (e.g., within 40 meters of the camera or other reference location), and RADAR distance(s) 218 may be used at further distances (e.g., further than 40 meters from the camera or other reference location). Using a threshold distance in this way may leverage the accuracy of various depth sensor modalities over varying distance ranges. In at least one embodiment, the LIDAR distance(s) 216 and the RADAR distance(s) 218, where both are computed for an object 306, may be averaged or weighted to compute a single combined distance value. For example, the two distances may be averaged with equal weight, or one modality may be weighted greater than the other. Where weighting is used, the determination of the weight for each modality may be constant (e.g., 60% for LIDAR and 40% for RADAR) or may vary depending on some factor, such as distance (e.g., within 50 meters of the camera or other reference location, LIDAR is weighted 70% and RADAR is weighted 30%, while beyond 50 meters of the camera or other reference location, LIDAR is weighted 40% and RADAR is weighted 60%). As such, the determination of which distance value should be the final distance value for a particular object 306 may be made using one or more depth sensor modalities and may depend on a variety of factors (e.g., availability of data from various depth sensor modalities, distance of an object from the reference location, noisiness of the data, etc.).

In some examples, the LIDAR distance(s) 216 and/or the RADAR distance(s) 218 may be further enhanced by applying a time-domain state estimator—based on a motion model—on object tracks. Using this approach, noisy readings from LIDAR and/or RADAR may be filtered out. A state estimator may further model covariance of the state, which may represent a measure of uncertainty on the ground truth depth value. Such a measure may be utilized in training and evaluation of the machine learning model(s) 104, for instance, by down-weighting loss for high uncertainty samples.

Once a final distance value(s) has been selected for an object 306, one or more pixels of the image 302 may be encoded with the final depth value(s) to generate the ground truth depth map 222. In some non-limiting embodiments, to determine the one or lore pixels to be encoded for the object 306, each of the pixels associated with the bounding shape 304 and/or the cropped bounding shape 308 may be encoded with the final distance value(s). However, in such examples, where two or more bounding shapes 304 and/or cropped bounding shapes 308 at least partially overlap (e.g., one bounding shape 304 occludes another), using each of the pixels of the bounding shape 304 and/or the cropped bounding shape 308 may result in one or more of the objects 306 not being represented sufficiently in the ground truth depth map 222. As such, in some embodiments, a shape—such as a circle or ellipse—may be generated for each object. The shape, in some examples, may be centered at a centroid of the bounding shape 304 and/or the cropped bounding shape 308. By generating a circle or ellipse, the potential for occlusion leading to lack of representation of an object 306 in the ground truth depth map 222 may be reduced, thereby increasing the likelihood that each of the objects 306 are represented in the ground truth depth map 222. As a result, the ground truth depth map 222 may represent the ground truth distance(s) encoded onto an image—e.g., a depth map image. The ground truth depth map 222—or depth map image—may then be used as ground truth for training the machine learning model(s) 104 to predict distances to objects using images generated by one or more cameras. As such, the machine learning model(s) 104 may be trained to predict—in deployment—a depth map corresponding to the objects and/or obstacles depicted in images captured by the vehicle 1400 (and/or another vehicle type, a robot, a simulated vehicle, a water vessel, an aircraft, a drone, etc.).

Ground truth encoding 110 with respect to the predictions of the object detection(s) 116 may include labeling, or annotating, the sensor data 102 (e.g., images, depth maps, point clouds, etc.) with bounding shapes and/or corresponding class labels (e.g., vehicle, pedestrian, building, airplane, watercraft, street sign, etc.). As such, the ground truth annotations or labels may be compared, using loss function(s) 108, to the predictions of the object detections) 116 by the machine learning model(s) 104 to update and optimize the machine learning model(s) 104 for predicting locations of objects and/or obstacles.

With respect to automatically (e.g., for encoding the ground truth depth map 222) and/or manually generating ground truth annotations, the annotations for the training images may be generated within a drawing program (e.g., an annotation program), a computer aided design (CAD) program, a labeling program, another type of program suitable for generating the annotations, and/or may be hand drawn, in some examples. In any example, the annotations may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines the location of the labels), and/or a combination thereof (e.g., human formulates one or more rules or labeling conventions, machine generates annotations). In some examples, the LIDAR data, RADAR data, image data, and/or other sensor data 102 that is used as input to the machine learning model(s) 104 and/or used to generate the ground truth data may be generated in a virtual or simulated environment. For example, with respect to a virtual vehicle (e.g., a car, a truck, a water vessel, a construction vehicle, an aircraft, a drone, etc.), the virtual vehicle may include virtual sensors (e.g., virtual cameras, virtual LIDAR, virtual RADAR, virtual SONAR, etc.) that capture simulated or virtual data of the virtual or simulated environment. As such, in some embodiments, in addition to or alternatively from real-world data being used as inputs to the machine learning model(s) 104 and/or for ground truth generation, simulated or virtual sensor data may be used and thus included in the sensor data 102.

Referring again to FIG. 1, camera adaptation 112 may be performed in some embodiments in an effort to make the machine learning model(s) 104 invariant to underlying camera intrinsic characteristics. For example, to account for the underlying challenge of similar objects that are a same distance from a reference location—e.g., a camera—appearing differently depending on camera parameters (e.g., field of view), a camera adaptation algorithm may be used to enable camera intrinsic invariance. Were the variance in camera intrinsic parameters not accounted for, the performance of the machine learning model(s) 104 may be degraded for distance to object or obstacle estimation solutions.

In some embodiments, camera adaptation 112 may include applying a scaling factor to camera-based image labels. As a non-limiting example, if a camera with a 60 degree field of view is used as a reference camera, a multiplier of 2× may be applied to labels of images of exactly the same scene produced by a camera with a 120 degree field of view, because the objects produced by this camera will look half the size compared to those generated by the reference camera. Similarly, as another non-limiting example, if the same reference camera is used, a multiplier of negative 2× may be applied to labels of images of exactly the same scene produced by a camera with a 30 degree field of view, because the objects produced by this camera will look twice the size compared to those generated by the reference camera.

Figure 4:
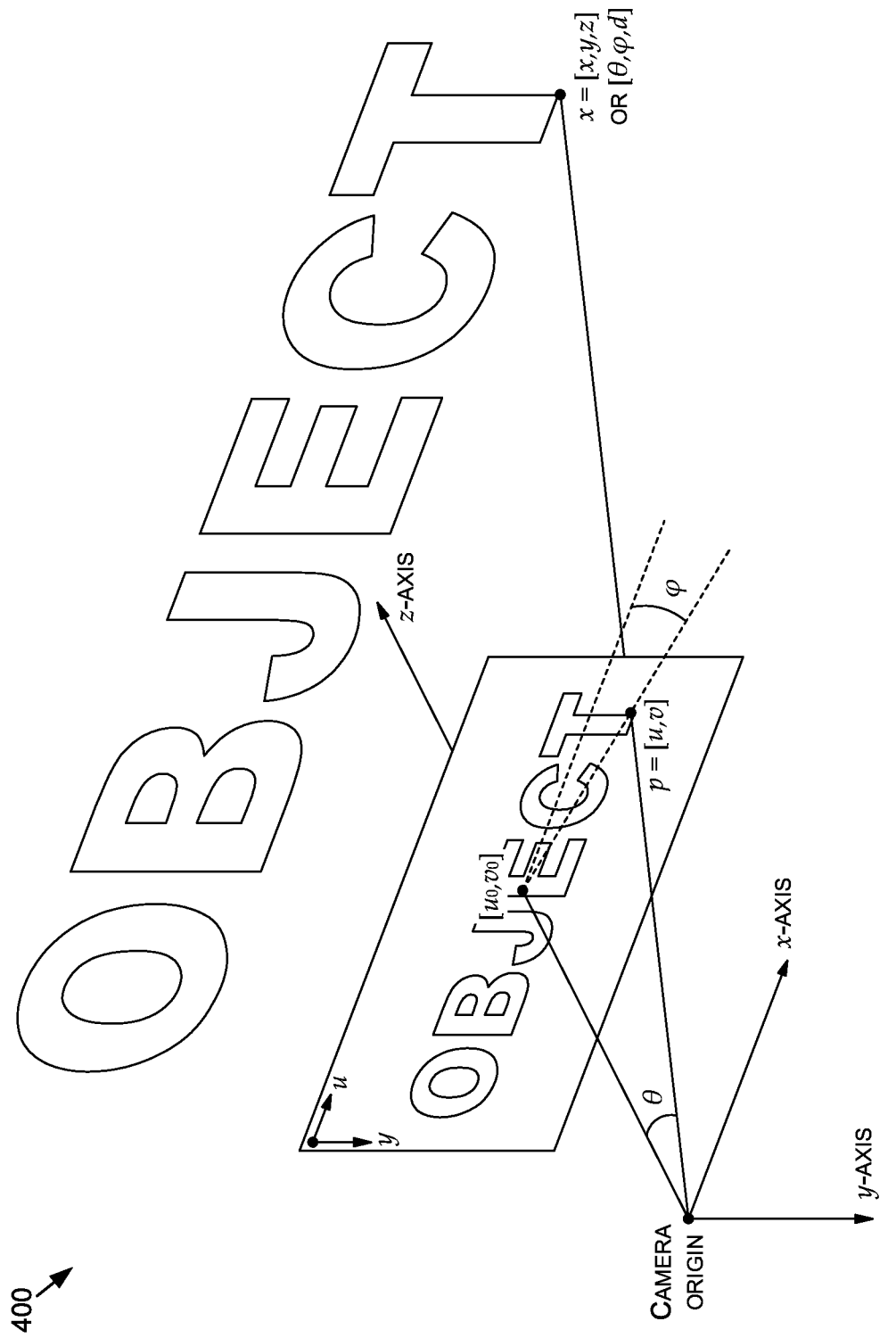
FIG. 4 is an illustration of various calculations used in a camera adaptation algorithm, in accordance with some embodiments of the present disclosure.

In at least on embodiment, camera adaptation 112 includes generating scaling and distortion maps as an extra input to the machine learning model(s) 104. This may allow the camera model information to be available as an input—as indicated by the dashed line arrow from camera adaptation 112 to the machine learning model(s) 104 in FIG. 1—for learning. For example, with reference to FIG. 4, 4 is an illustration 400 of various calculations used in a camera adaptation algorithm, in accordance with some embodiments of the present disclosure. With respect to the illustration 400, (e.g., the x-axis), y (e.g., the y-axis), and z (e.g., the z-axis) represent 3D coordinates of locations in the camera coordinate system, while u (e.g., the u-axis) and v (e.g., the v-axis) represent 2D coordinates in the camera image plane. A position, p, denotes a 2-vector [u, v] as a position in the image plane. A principal point, at $u_o$, $v_o$, represents where the z-axis intersects the image plane. θ, ϕ, d represent another 3D location (x, y, z) where d is the depth (e.g., a position along the z-axis), θ is the angle between the z-axis and the vector [x, y, z] (or polar angle), and ϕ is the azimuthal angle (or roll angle). In some instances, d may be represented by a radial distance, r, such as where the coordinate system is a spherical coordinate system.

As such, the illustration 400 of FIG. 4 represents the coordinate conventions that allow modeling of a camera as a function of C (a function that models or represents the camera) that maps 3D rays (θ, ϕ) (e.g., cast in the direction of objects and/or features) to 2D locations on the image plane (u, v). If an object or feature lies at a 3D direction (θ, ϕ), its image on the camera sensor will be located at pixel (u, v)=C(θ, ϕ), where C is a function that represents or models the camera. As a result, a 2-vector (3D direction) is taken as input to generate a 2-vector (2D position on sensor). Similarly, because C is invertible, the inverse [θ, ϕ]=$C^{-1}$(u, v) exists.

Partial derivatives of C may be used to compute a local magnification factor, m, as represented by equation (1), below:

$$m(u, v) = norm\left\{\frac{d}{du}C_\theta^{-1}(u, v), \frac{d}{du}C_\phi^{-1}(u, v), \frac{d}{dv}C_\theta^{-1}(u, v), \frac{d}{du}C_\phi^{-1}(u, v)\right\} \quad (1)$$

where the inverse function, $C^{-1}$, is split into two functions, as represented by equations (2) and (3), below:

$$\theta = C_\theta^{-1}(u,v) \quad (2)$$

$$\varnothing = C_\theta^{-1}(u,v) \quad (3)$$

In some embodiments, the initial layers of the machine learning model(s) 104 tasked with feature extraction, object detection (in embodiments where this feature is internal to the tasks of the machine learning model(s) 104), and/or other tasks, may be scale-invariant and work well even without camera adaptation 112. As a result, the camera information determined using camera adaptation 112 may be injected deeper into the network (e.g., at one or more layers further into the architecture of the machine learning model(s), after the feature extraction, object detection, and/or other layers), there the feature map sizes may be considerably smaller than at earlier layers. The input feature map of these deeper layers (e.g., convolutional layers) may be augmented with m(u, v) to enable the layers tasked with depth regression to learn to adjust to the camera model.

Ultimately, a single feature map, (m, v), may be generated and supplied to the machine learning model(s) 104 as an extra cue for resolving the dependency of how objects look through different cameras. This may enable a single machine learning model(s) 104 to predict distances reliably from images obtained with different cameras having different camera parameters, such as different fields of view. During training, multiple cameras may then be used with spatial augmentation (zoom) applied to learn a robust depth regressor. Spatial augmentation transforms not only the images, but also the camera model function, C, or its inverse. During inference, as described in more detail herein, the camera model may be used to compute the fixed (e.g., in deployment, the camera used may be constant) magnification feature map, m(u, v), which may then be concatenated with the input feature maps generated by one or more layers (e.g., convolutions layers) of the machine learning model(s) 104.

Figure 5A:
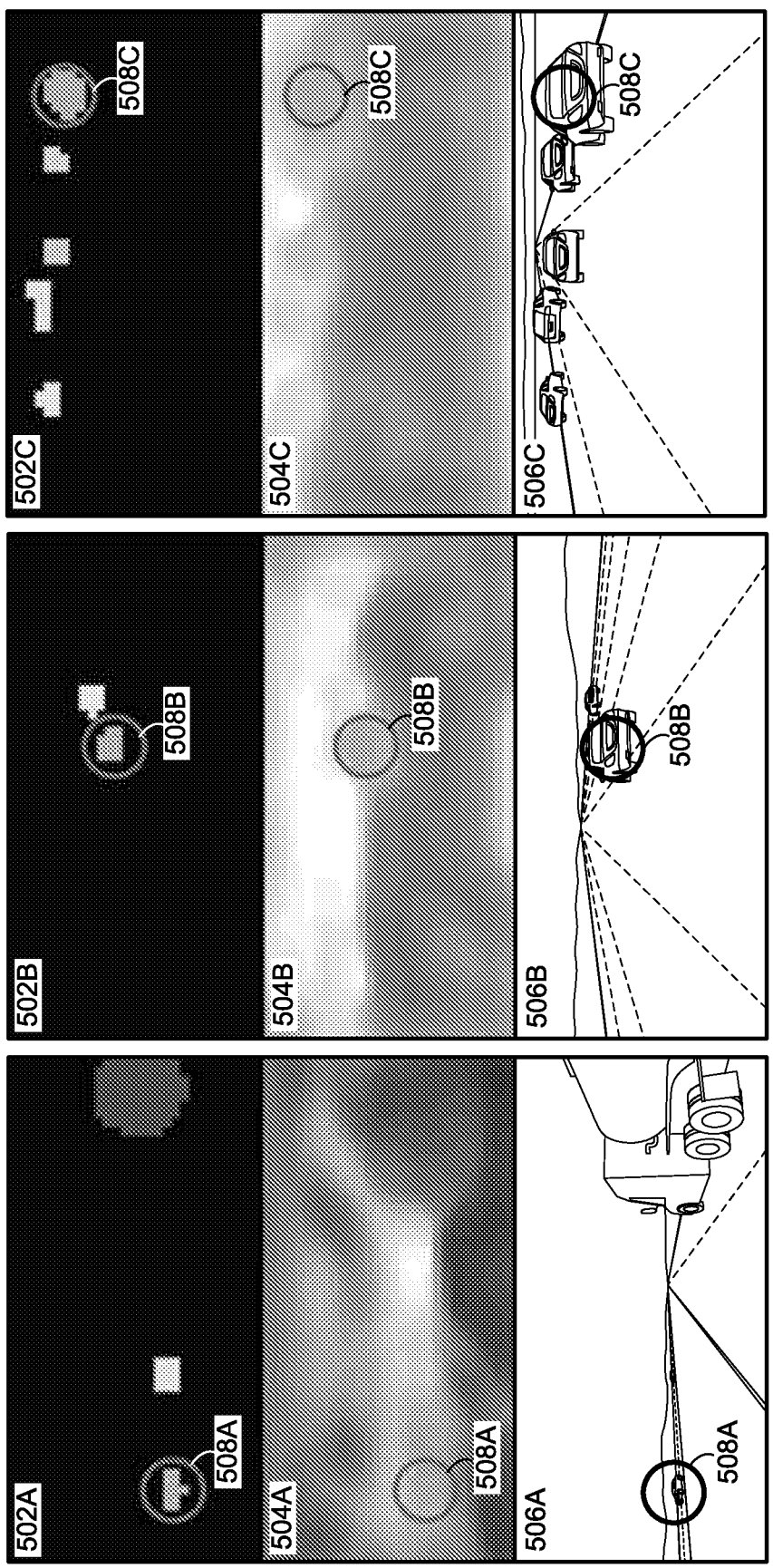
FIG. 5A includes visualizations of ground truth masks and depth map predictions of a machine learning model(s) based on varying sensor parameters, in accordance with some embodiments of the present disclosure.
Figure 5B:
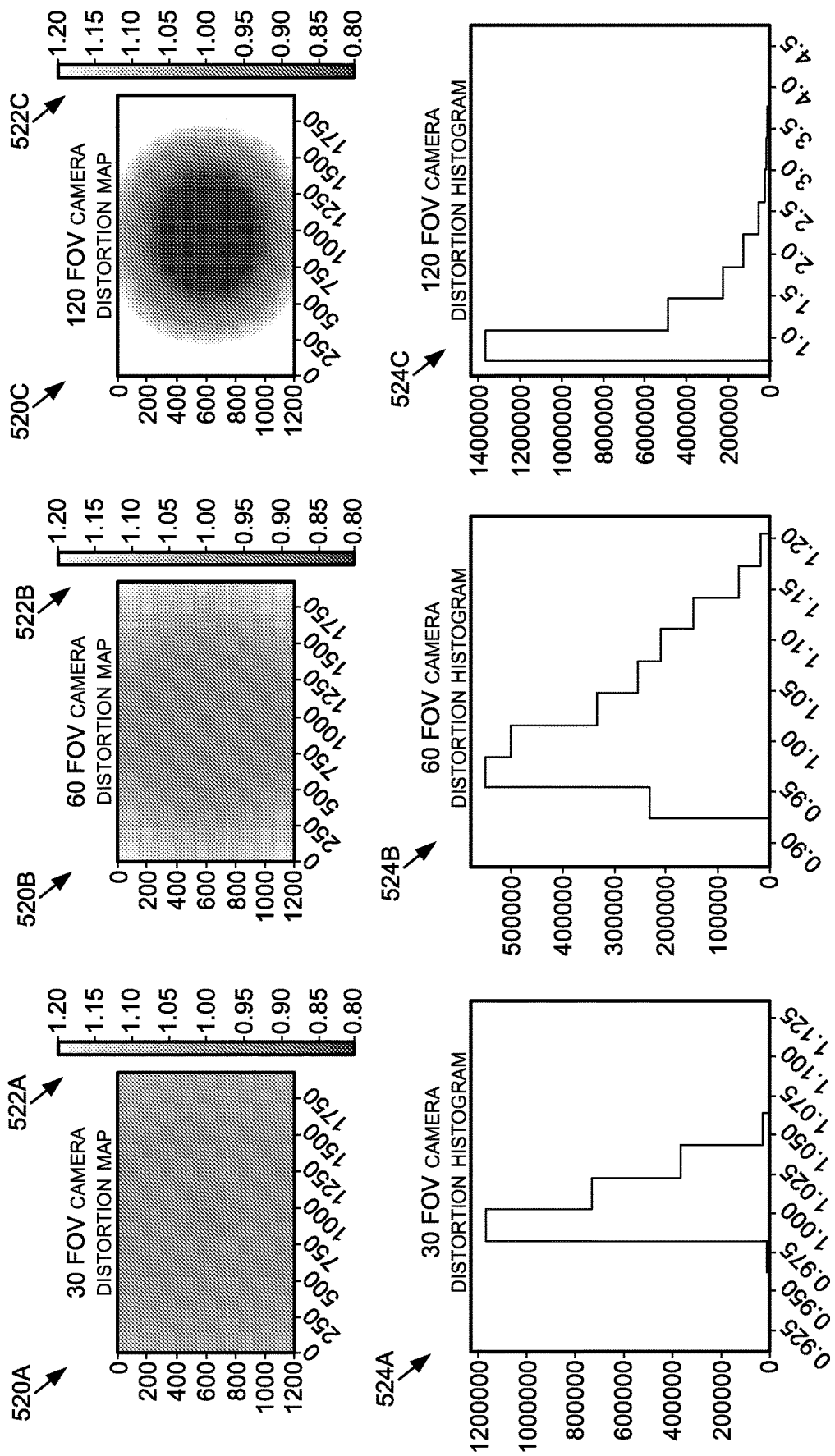
FIG. 5B includes illustrations of distortion maps and histograms for sensors having varying parameters, in accordance with some embodiments of the present disclosure.

The ground truth encoding 110 with camera adaptation 112 is illustrated, as non-limiting examples, in FIGS. 5A and 5B. For example, FIG. 5A includes visualizations of ground truth masks and depth map predictions of a machine learning model(s) based on varying sensor parameters, in accordance with some embodiments of the present disclosure. Ground truth depth maps 502A, 502B, and 502C are example visualization of the ground truth depth maps 222 of FIG. 2, and correspond respectively to images 506A, 506B, and 506C. As an example, the image 506A may have been captured using a 120 degree field of view camera, the image 506B may have been captured using a 60 degree field of view camera, and the image 506C may have been captured using a 30 degree field of view camera. Predicted depth maps 504A, 504B, and 504C correspond to the predictions of the machine learning model(s) 104, respectively, with respect to the images 506A, 506B, and 506C. Objects 508A, 508B, and 508C are all at approximately the same absolute distance from the reference location (e.g., the camera, one or more other sensors, a reference location on the vehicle 1400, etc.), but appear differently in size or dimension in the images 506A, 506B, and 506C due to the different fields of view. However, as illustrated by the circles in each of the predicted depth maps 504, the objects 508 are all correctly predicted to be approximately the same absolute distance from the reference location. Random zoom augmentation may also be applied to the images 506 and, because the camera model may be adapted based on the augmentation, the predicted depth maps 504 will still correctly identify the objects 508.

Although not highlighted or identified with circles in FIG. 5A for clarity purposes, each of the other objects in the images 506 are also represented in the ground truth depth maps 502 as well as the predicted depth maps 504.

As examples of scaling and distortion maps, FIG. 5B includes illustrations of distortion maps and histograms for sensors having varying parameters, in accordance with some embodiments of the present disclosure. For example, distortion map 520A may represent a distortion map for a camera having a 30 degree field of view, distortion map 520B may represent a distortion map for a camera having a 60 degree field of view, and distortion map 520C may represent a distortion map for a camera having a 120 degree field of view. Associated therewith are scaling maps 522A, 522B, and 522C, respectively, that correspond to the amount of scaling of the depth or distance values through the field of view of the camera (e.g., as represented in image space). For example, with respect to the distortion map 520A, the scaling factors from the scaling map 522A are all less than 1.0, to account for the increased size of the objects with respect to a reference camera. As another example, with respect to the distortion map 520C, the scaling factors from the scaling map 522C include values greater than 1.0 to account for the seemingly smaller size of the objects as captured with a camera having a 120 degree field of view, especially at around the outer portions of the field of view. Histograms 542A, 524B, and 524C corresponding to the distortion maps 520A, 520B, and 520C, respectively, illustrate the scale changes corresponding to the distortion maps 520.

Referring again to FIG. 1, the machine learning model(s) 104 may use as input one or more images (or other data representations) represented by the sensor data 102 to generate the distance(s) 106 (e.g., represented as a depth map in image space) and/or object detections (e.g., locations of bounding shapes corresponding to objects and/or obstacles depicted in the sensor data 102)) as output. In a non-limiting example, the machine learning model(s) 104 may take as input an image(s) represented by the pre-processed sensor data and/or the sensor data 102, and may use the sensor data to regress on the distances(s) 106 corresponding to objects or obstacles depicted in the image.

In some non-limiting embodiments, the machine learning model(s) 104 may further be trained to intrinsically predict the locations of bounding shapes as the object detection(s) 116 (in other embodiments, an external object detection algorithm or network may be used to generate the bounding shapes). In some such examples, the machine learning model(s) 104 may be trained to regress on a centroid of a bounding shape(s) corresponding to each object, as well as four bounding shape edge locations (e.g., four pixel distances to the edges of the bounding shape(s) from the centroid). The machine learning model(s) 104, when predicting the bounding shapes, may thus output a first channel corresponding to a mask channel that includes confidences for pixels, where higher confidences (e.g., of 1) indicate a centroid of a bounding shape. In addition to the mask channel, additional channels (e.g., four additional channels) may be output by the machine learning model(s) 104 that correspond to the distances to edges of the bounding shape (e.g., a distance upward along a column of pixels from the centroid, a distance downward along the column of pixels from the centroid, a distance to the right along a row of pixels from the centroid, and a distance to the left along a row of pixels from the centroid). In other embodiments, the machine learning model(s) 104 may output other representations of the bounding shape locations, such as a location of bounding shape edges in an image and dimensions of the edges, locations of vertices of bounding shapes in an image, and/or other output representations.

In examples where the machine learning model(s) 104 is trained to predict the bounding shapes, the ground truth encoding 110 may further include encoding the locations of the bounding shapes generated by an object detector (e.g., the object detector 214) as ground truth data. In some embodiments, a class of object or obstacle may also be encoded as ground truth and associated with each bounding shape. For example, where an object is a vehicle, a classification of vehicle, vehicle type, vehicle color, vehicle make, vehicle model, vehicle year, and/or other information may be associated with the bounding shape corresponding to the vehicle.

Although examples are described herein with respect to using neural networks, and specifically convolutional neural networks, as the machine learning model(s) 104 (e.g., as described in more detail herein with respect to FIG. 7), this is not intended to be limiting. For example, and without limitation, the machine learning model(s) 104 described herein may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In some embodiments, the machine learning model(s) 104 may include a convolutional layer structure, including layers such as those described herein. For example, the machine learning model(s) 104 may include a full architecture formulated for the task of generating the output(s) 114. In other examples, an existing or generated machine learning model(s) 104 designed for object detection may be used, and additional layers—e.g., convolutional layers, such as those described herein—may be inserted into the existing model (e.g., as a head). For example, feature extractor layers may be used to generate feature maps corresponding to the sensor data 102 that is provided as input to the machine learning model(s) 104. The feature maps may then be applied to a first stream of layers, or a first head, of the machine learning model(s) 104 tasked with object detection (e.g., computing the object detection(s) 116) and/or may be applied to a second stream of layers, or a second head, of the machine learning model(s) 104 tasked with distance estimation (e.g., computing the distance(s) 106). As such, where the machine learning model(s) 104 is designed to generate both the distance(s) 106 and the object detection(s) 116, the machine learning model(s) 104 may include at least two streams of layers (or two heads) at some point within the architecture of the machine learning model(s) 104.

The machine learning model(s) 104 may use sensor data 102 (and/or pre-processed sensor data) as an input. The sensor data 102 may include images representing image data generated by one or more cameras (e.g., one or more of the cameras described herein with respect to FIGS. 14A-14C). For example, the sensor data 102 may include image data representative of a field of view of the camera(s). More specifically, the sensor data 102 may include individual images generated by the camera(s), where image data representative of one or more of the individual images may be input into the machine learning model(s) 104 at each iteration.

The sensor data 102 may be input as a single image, or may be input using hatching, such as mini-batching. For example, two or more images may be used as inputs together (e.g., at the same time). The two or more images may be from two or more sensors (e.g., two or more cameras) that captured the images at the same time.

The sensor data 102 and/or pre-processed sensor data may be input into a feature extractor layer(s) of the machine learning model(s), and then, in embodiments where object detection is intrinsic to the machine learning model(s) 104, the output of the feature extractor layers may be provided as input to object detection layers of the machine learning model(s) 104. Additional layers—e.g., after the feature extractor layers and/or the object detection layers—of the machine learning model(s) 104 may regress on the distances 106 corresponding to object or obstacles depicted in the sensor data 102.

One or more of the layers may include an input layer. The input layer may hold values associated with the sensor data 102 and/or pre-processed sensor data. For example, when the sensor data 102 is an image(s), the input layer may hold values representative of the raw pixel values of the image(s) as a volume (e.g., a width, W, a height, and color channels, C (e.g., RGB), such as 32×32×3), and/or a batch size, B (e.g., where batching is used)

One or more layers of the machine learning model(s) 104 may include convolutional layers. The convolutional layers may compute the output of neurons that are connected to local regions in an input layer (e.g., the input layer), each neuron computing a dot product between their weights and a small region they are connected to in the input volume. A result of a convolutional layer may be another volume, with one of the dimensions based on the number of filters applied (e.g., the width, the height, and the number of filters, such as 32×32×12, if 12 were the number of filters).

One or more of the layers may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers may include a pooling layer. The pooling layer may perform a down-sampling operation along the spatial dimensions (e.g., the height and the width), which may result in a smaller volume than the input of the pooling layer (e.g., 16×16×12 from the 32×32×12 input volume). In some examples, the machine learning model(s) 104 may not include any pooling layers. In such examples, strided convolution layers may be used in place of pooling layers. In some examples, the feature extractor layer(s) 126 may include alternating convolutional layers and pooling layers.

One or more of the layers may include a fully connected layer. Each neuron in the fully connected layer(s) may be connected to each of the neurons in the previous volume. The fully connected layer may compute class scores, and the resulting volume may be 1×1× number of classes. In some example, no fully connected layers may be used by the machine learning model(s) 104 as a whole, in an effort to increase processing times and reduce computing resource requirements. In such examples, where no fully connected layers are used, the machine learning model(s) 104 may be referred to as a fully convolutional network.

One or more of the layers may, in some examples, include deconvolutional layer(s). However, the use of the term deconvolutional may be misleading and is not intended to be limiting. For example, the deconvolutional layer(s) may alternatively be referred to as transposed convolutional layers or fractionally strided convolutional layers. The deconvolutional layer(s) may be used to perform up-sampling on the output of a prior layer. For example, the deconvolutional layer(s) may be used to up-sample to a spatial resolution that is equal to the spatial resolution of the input images (e.g., the sensor data 102) to the machine learning model(s) 104, or used to up-sample to the input spatial resolution of a next layer.

Although input layers, convolutional layers, pooling layers, ReLU layers, deconvolutional layers, and fully connected layers are discussed herein with respect to the machine learning model(s) 104, this is not intended to be limiting. For example, additional or alternative layers may be used, such as normalization layers, SoftMax layers, and/or other layer types.

Different orders and numbers of the layers of the machine learning model(s) 104 may be used depending on the embodiment. In addition, some of the layers may include parameters (e.g., weights and/or biases), while others may not, such as the ReLU layers and pooling layers, for example. In some examples, the parameters may be learned by the machine learning model(s) 104 during training. Further, some of the layers may include additional hyper-parameters (e.g., learning rate, stride, epochs, kernel size, number of filters, type of pooling for pooling layers, etc.)—such as the convolutional layer(s), the deconvolutional layer(s), and the pooling layer(s)—while other layers may not, such as the ReLU layer(s). Various activation functions may be used, including but not, limited to, ReLU, leaky ReLU, sigmoid, hyperbolic tangent (tan h), exponential linear unit (ELU), etc. The parameters, hyper-parameters, and/or activation functions are not to be limited and may differ depending on the embodiment.

During training, the sensor data 102—e.g., image data representative of images captured by one or more cameras having one or more camera parameters—may be applied to the machine learning model(s) 104. In some non-limiting embodiments, as described herein, the scaling and/or distortion maps may be applied to the machine learning model(s) 104 as another input, as indicated the dashed line from camera adaptation 112 to the machine learning model(s) 104. The machine learning model(s) 104 may predict the distance(s) 106 and/or the object detection(s) 116 (e.g., in embodiments where the machine learning model(s) 104 are trained to predict bounding shapes corresponding to objects or obstacles). The predictions may be compared against the ground truth that is generated during ground truth encoding 110, an example of which is explained herein at least with reference to FIG. 2. In some examples, the ground truth data may be augmented by camera adaptation 112, as described herein, while in other embodiments camera adaptation 112 may not be executed on the ground truth data (as indicated by the dashed lines). A loss function(s) 108 may be used to compare the ground truth to the output(s) 114 of the machine learning model(s) 104.

For example, the machine learning model(s) 104 may be trained with the training images using multiple iterations until the value of a loss function(s) 108 of the machine learning model(s) 104 is below a threshold loss value (e.g., acceptable loss). The loss function(s) 108 may be used to measure error in the predictions of the machine learning model(s) 104 using ground truth data. In some non-limiting examples, a cross entropy loss function (e.g., binary cross entropy), an L1 loss function, a mean square error loss function, a quadratic loss function, an L2 loss function, a mean absolute error loss function, a mean bias loss function, a hinge loss function, and/or a negative log loss function may be used.

Figure 6:
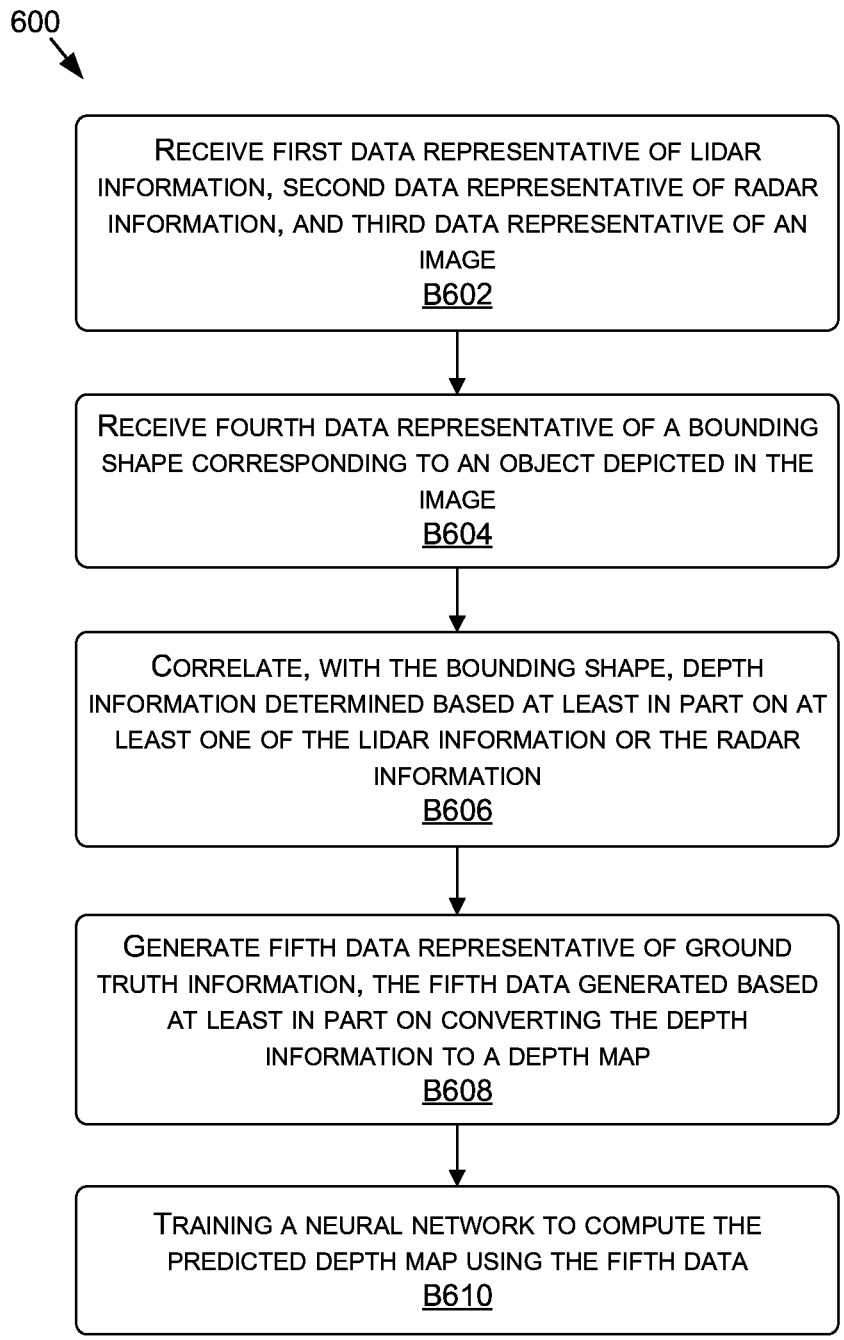
FIG. 6 is a flow diagram showing a method for training a machine learning model(s) to predict distances to objects and/or obstacles in an environment, in accordance with some embodiments of the present disclosure.

Now referring to FIG. 6, each block of method 600, described herein, comprises a computing process that may be performed using any combination of hardware, firmware, and/or software. For instance, various functions may be carried out by a processor executing instructions stored in memory. The method 600 may also be embodied as computer-usable instructions stored on computer storage media. The method 600 may be provided by a standalone application, a service or hosted service (standalone or in combination with another hosted service), or a plug-in to another product, to name a few. In addition, method 600 is described, by way of example, with respect to the process 100 of FIG. 1. However, this method 600 may additionally or alternatively be executed by any one system, or any combination of systems, including, but not limited to, those described herein.

FIG. 6 is a flow diagram showing a method 600 for training a machine learning model(s) to predict distances to objects and/or obstacles in an environment, in accordance with some embodiments of the present disclosure. The method 600, at block B602, includes receiving first data representative of LIDAR information, second data representative of RADAR information, and third data representative of an image. For example, the sensor data 102 may be received (and/or generated), where the sensor data 102 may include RADAR data, LIDAR data, SONAR data, image data representative of an image(s), and/or other sensor data types.

The method 600, at block B604, includes receiving fourth data representative of a bounding shape corresponding to an object depicted in the image. For example, with reference to FIG. 2, the object detector 214 may generate data corresponding to locations of objects as denoted by bounding shapes corresponding to the image.

The method 600, at block B606, includes correlating, with the bounding shape, depth information determined based at least in part on one or both of the LIDAR information or the RADAR information. For example, the depth information from the LIDAR data, RADAR data, and/or other sensor data types may be correlated with (e.g., automatically, in embodiments) the bounding shapes corresponding to objects or obstacles depicted in the image.

The method 600, at block B608, includes generating fifth data representative of ground truth information, the fifth data generated based at least in part on converting the depth information to a depth map. For example, the depth information corresponding to the bounding shapes may be used to generate the ground truth depth map 222 (FIG. 2).

The method 600, at block B610, includes training a neural network to compute the predicted depth map using the fifth data. For example, the machine learning model(s) 104 may be trained, using the ground truth depth map 222 as ground truth, to generate the distance(s) 106 corresponding to objects and/or obstacles depicted in images.

Machine Learning Model(s) for Predicting Distances

Figure 7:
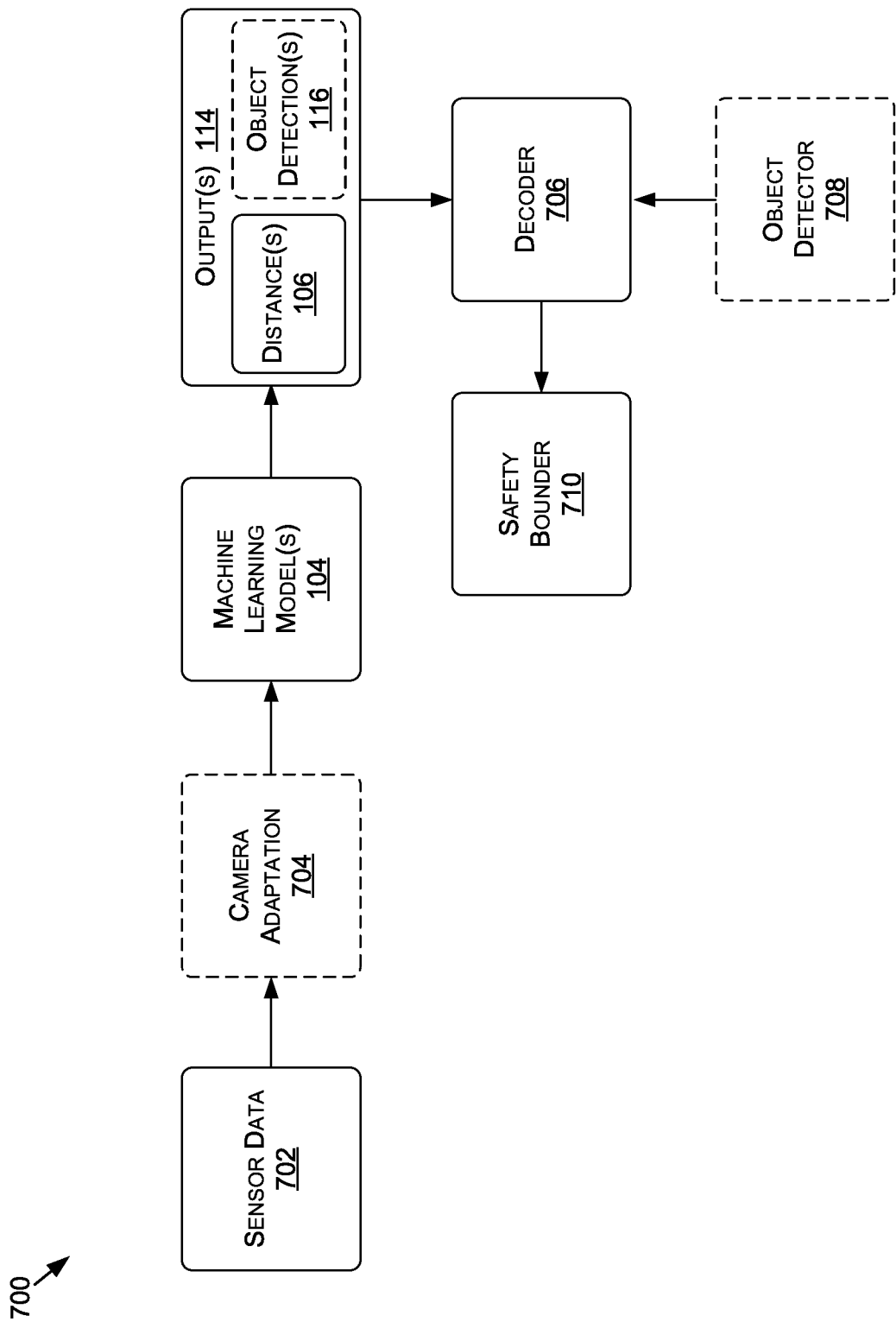
FIG. 7 is a data flow diagram for a process of predicting distances to objects and/or obstacles in an environment using a machine learning model(s), in accordance with some embodiments of the present disclosure.

Now referring to FIG. 7, FIG. 7 is a data flow diagram for a process 700 of predicting distances to objects and/or obstacles in an environment using a machine learning model(s), in accordance with some embodiments of the present disclosure. The sensor data 702 may include similar sensor data to that described herein at least with respect to FIGS. 1 and 2. However, in some embodiments, the sensor data 702 applied to the machine learning model(s) 104 in deployment may be image data only. For example, using the process 100 of FIG. 1 the machine learning model(s) 104 may be trained to accurately predict the distance(s) 106 and/or the object detection(s) 116 using image data alone. In such embodiments, the image data may be generated by one or more cameras (e.g., a single monocular camera, in embodiments, such as a wide view camera 1470 of FIG. 14B, multiple camera(s), etc.).

The sensor data 102 may undergo camera adaptation 704, in embodiments. For example, similar to camera adaptation 112 of FIG. 1, at inference, the camera model may be used to compute a fixed magnification feature map, m(u, v), that may be used by the machine learning model(s) 104. For example, in some embodiments, scaling and/or distortion maps (such as those illustrated as examples in FIG. 5B) may be applied to the machine learning model(s) 104 as an additional input. However, because the same camera(s) may be used in a deployment instance (e.g., for the vehicle 1400, the same camera(s) may be used to generate the image data), the scaling and/or distortion maps may be fixed, or the same, throughout deployment. As such, in some non-limiting embodiments, the fixed magnification feature map may be concatenated to convolutional layer input feature maps.

The sensor data 702 and/or scaling and/or distortion maps generated from camera adaptation 704 may be applied to the machine learning model(s) 104. The machine learning model(s) 104 (described in more detail herein with respect to FIG. 1) may use the sensor data 702 and/or the scaling and/or distortion maps to generate the output(s) 114. The output(s) 114 may include the distances) 106 and/or the object detection(s) 116.

The distance(s) 106 may be computed as depth or distance values corresponding to pixels of the image. For example, for at least pixels of the image corresponding to objects or obstacles, depth values may be computed to generate a depth map corresponding to distances to objects or obstacles depicted in the image. As described herein, the depth values may correspond to a z-direction, which may be interpreted as a distance from the reference location (e.g., from the camera) to an object or obstacle at least partially represented by a given pixel.

The object detection(s) 116, as described herein, may be intrinsic to the machine learning model(s) 104 and/or may be computed by an object detector separate from the machine learning model(s) 104. Where the machine learning model(s) 104 is trained to generate the object detection(s) 116, the machine learning model(s) 104 may output data corresponding to locations of bounding shapes for objects or obstacles depicted in images. In a non-limiting embodiments, the machine learning model(s) 104 may include multiple output channels corresponding to the object detection(s) 116. For example, an output may correspond to a mask channel having values indicating confidences for pixels that correspond to centroids of bounding shapes. Each pixel—or at least pixels having high confidences (e.g., 1, yes, etc.) for a centroid—may also include a number (e.g., 4) output channels corresponding to locations of, or pixel distances to, edges of the bounding shape corresponding to the centroid. For example, a first channel may include a pixel distance to a top edge along a column of pixels including the predicted or regressed centroid, a second channel may include a pixel distance to a right edge along a row of pixels including the predicted or regressed centroid, a third channel may include a pixel distance to a left edge along a row of pixels including the predicted or regressed centroid, and a fourth channel may include a pixel distance to a bottom edge along a column of pixels including the predicted or regressed centroid. As such, this information may be used to generate one or more bounding shapes for detected objects or obstacles in each image. In other embodiments, the machine learning model(s) 104 may output the bounding shape predictions as locations of vertices of the bounding shapes, or locations of a centroid and dimensions of the bounding shapes, etc.

In embodiments where the object detections are not predicted intrinsically by the machine learning model(s) 104, the object detections may be generated or computed by an object detector 708 (e.g., similar to the object detector 214 of FIG. 2). In such examples, the locations of the bounding shapes corresponding to objects may be computed similarly to the description herein for bounding shapes, such as locations of vertices, locations of a centroid and distances to edges, pixel locations for each pixel within a bounding shape, or each pixel along edges of the bounding shapes, etc.

A decoder 706 may use the output(s) 114 and/or the outputs of the object detector 708 to determine a correlation between the depth values from the distance(s) 106 (e.g., from the predicted depth map) and the bounding shape(s) corresponding to the objects. For example, where a single bounding shape is computed for an object, the distance values corresponding to pixels of the image within the bounding shape of the object may be used by the decoder 706 to determine the distance to the object. In some examples, where the distance values vary over the pixels of the bounding shape, the distance values may be averaged, weighted, and/or a single distance value may be selected for the object. In non-limiting embodiments, each bounding shape proposal may be associated with a single pixel in the depth map (e.g., representing the distance(s) 106). The single pixel may be a central pixel (e.g., the centroid pixel), or may be another pixel, such as a pixel with the highest confidence of being associated with the object.

In some examples, using the machine learning model(s) 104 or the object detector 708 for the object detections, there may be multiple object detections—e.g., bounding shapes—generated for a single object. Each object detection for the object may be associated with a different pixel(s) from the depth map, thereby leading to multiple potential locations of the object and potentially varying distance values for the object. To consolidate the multiple object detection proposals into a single object detection prediction per physical object instance, the proposals may be clustered—e.g., using density-based spatial clustering of applications with noise (DBSCAN) algorithm—into a single cluster of predictions per physical object instance. The final single object detections per physical object instance may be obtained by forming averages of the individual bounding shapes and distance predictions within each cluster. As a result, a single bounding shape may be determined for each object that is detected, and a single depth value may be associated with the bounding shape for the object.

In some embodiments, each of the pixels within the final bounding shape may be associated with the depth value, and the locations of the pixels in world-space may be determined such that the vehicle 1400 is able to use this distance information in world-space to perform one or more operations. The one or more operations may include updating a world model, performing path planning, determining one or more controls for navigating the vehicle 1400 according to the path, updating safety procedure information to ensure safety maneuvers are available to the vehicle 1400 without collision, and/or for other operations.

Figure 8A:
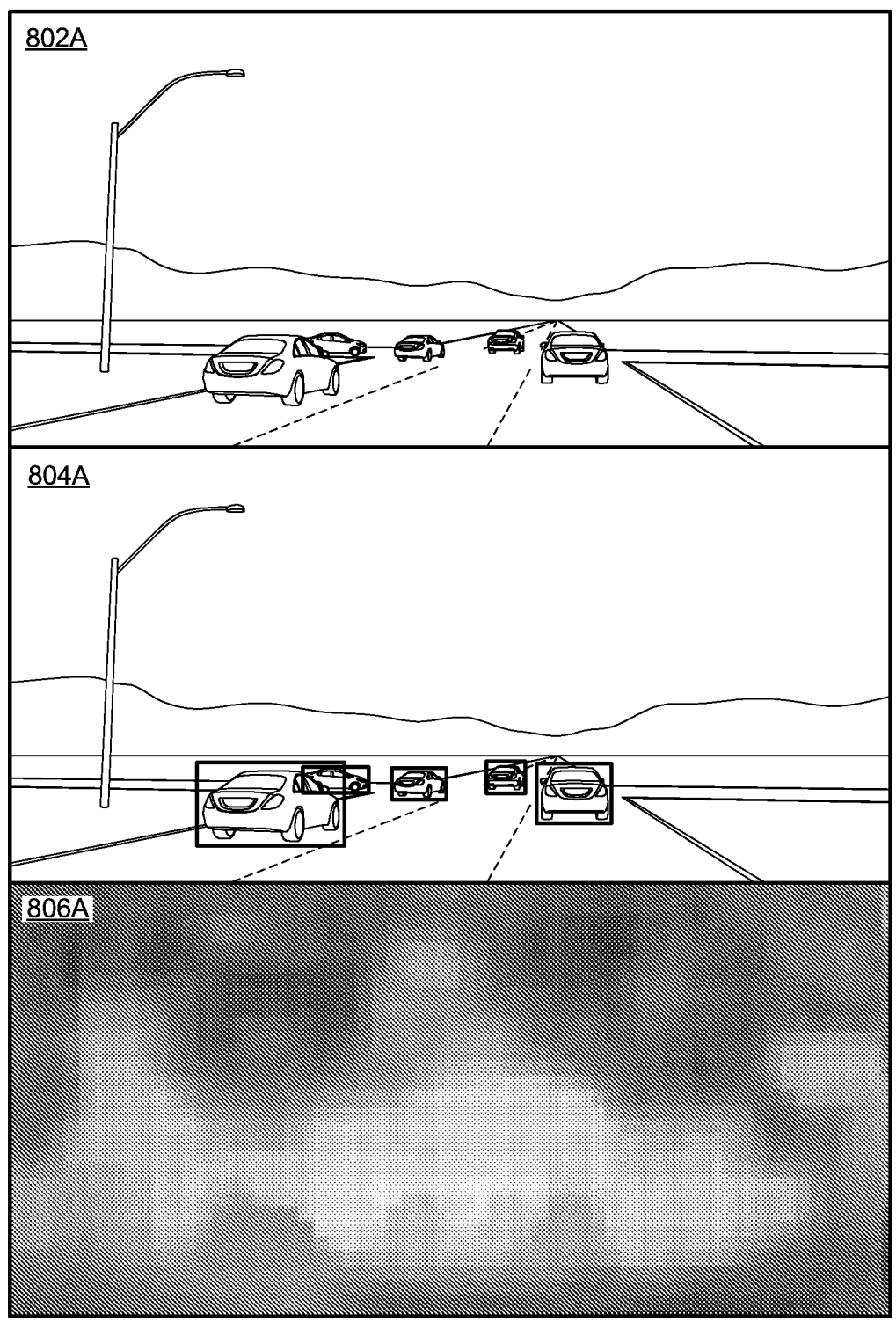
FIGS. 8A-8B are visualizations of object detections and depth predictions based on outputs of a machine learning model(s), in accordance with some embodiments of the present disclosure.
Figure 8B:
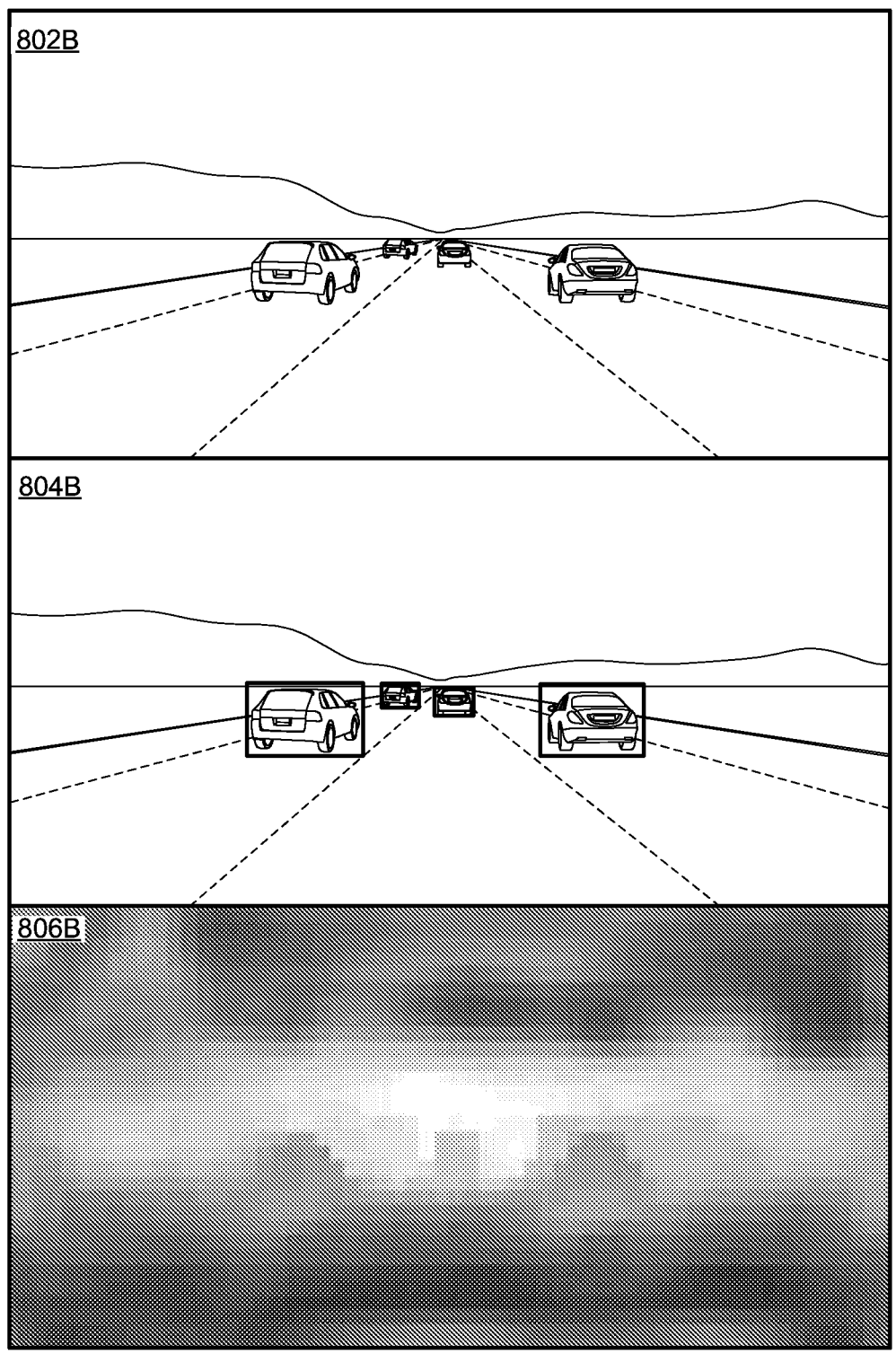

FIGS. 8A-8B are visualizations of object detections and depth predictions based on outputs of a machine learning model(s), in accordance with some embodiments of the present disclosure. For example, FIGS. 8A-8B include images 802A and 802B, which may be representations of image data (e.g., the sensor data 702) that is applied to the machine learning model(s) 104. Visualizations 804A and 804B, corresponding to the images 802A and 802B, respectively, represent bounding shapes corresponding to objects (e.g., vehicles) in the images 802A and 802B that are detected by the machine learning model(s) 104 and/or the object detector 708. Depth maps 806A and 806B, corresponding to the images 802A and 802B, respectively, represent the distance(s) 106 predicted by the machine learning model(s) 104. As such, the decoder 706 may correlate the locations of bounding shapes within the visualizations 804A and 804B to the distance values represented in the depth maps 806A and 806B, respectively. The result for the vehicle 1400 may be distances from the vehicle 1400 (or a reference location thereof, such as the camera, or another location of the vehicle 1400) to each of the objects having associated bounding shapes.

In some embodiments, due to noise and/or entropy in the training of the machine learning model(s) 104, the machine learning model(s) 104 may occasionally output incorrect distance values at inference or deployment time. For example, where a small bounding shape of a detected far away object overlaps with a larger bounding shape of a detected close-range object, the distance to both objects may be incorrectly predicted to be the same. As such, in some embodiments, a post-processing algorithm(s) may be applied by a safety bounder 710 to ensure that the machine learning model(s) 104 computed distance(s) 106 fall within a safety-permissible range of values. The safety permissible band in which the distance(s) 106 should lie in—e.g., the minimum and maximum distance estimate values that are accepted as safety-permissible—may be obtained from visual cues in the sensor data 702. For example, useful cues may be the road shape and/or bounding shapes corresponding to objects or obstacles as predicted by the machine learning model(s) 104 and/or the object detector 708). Further description of the safety bounds computations are described herein at least with respect to FIGS. 10A-13.

Figure 9:
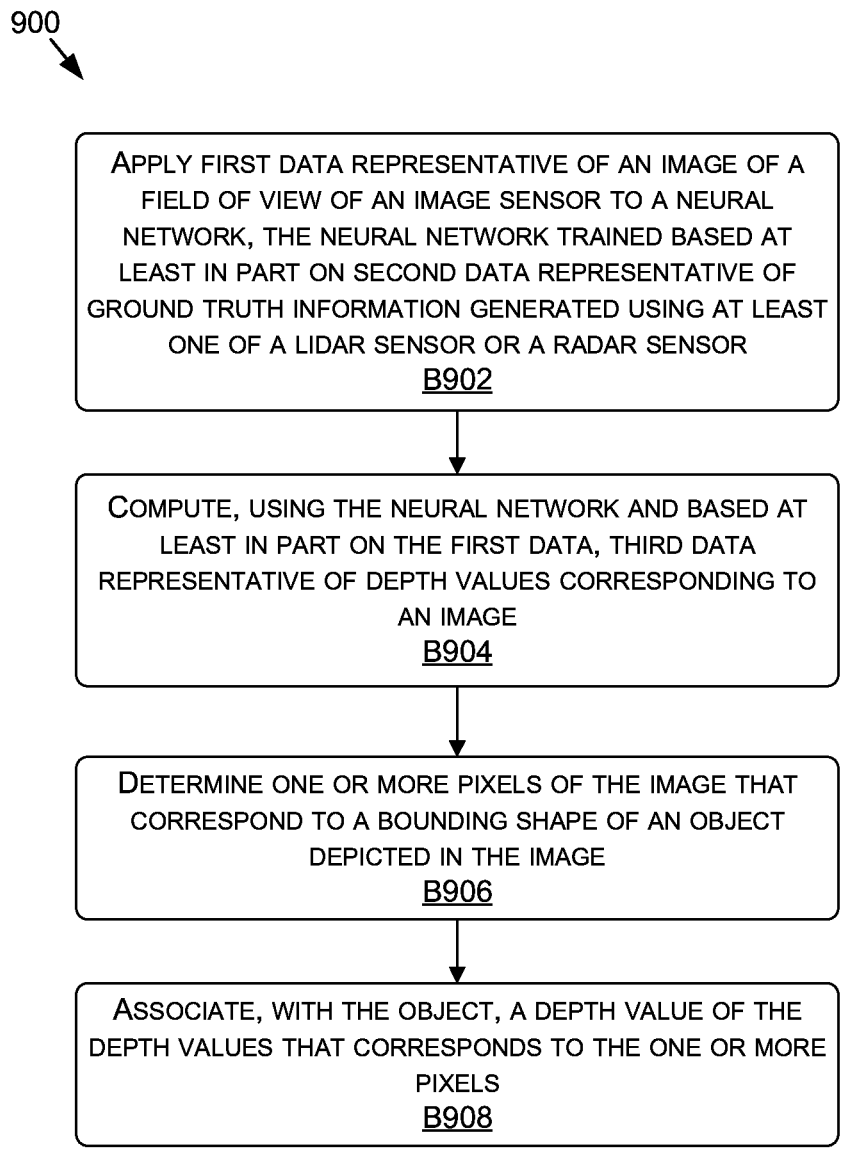
FIG. 9 is a flow diagram showing a method for predicting distances to objects and/or obstacles in an environment using a machine learning model(s), in accordance with some embodiments of the present disclosure.

Now referring to FIG. 9, each block of method 900, described herein, comprises a computing process that may be performed using any combination of hardware, firmware, and/or software. For instance, various functions may be carried out by a processor executing instructions stored in memory. The method 900 may also be embodied as computer-usable instructions stored on computer storage media. The method 900 may be provided by a standalone application, a service or hosted service (standalone or in combination with another hosted service), or a plug-in to another product, to name a few. In addition, method 900 is described, by way of example, with respect to the process 700 of FIG. 7. However, this method 900 may additionally or alternatively be executed by any one system, or any combination of systems, including, but not limited to, those described herein.

FIG. 9 is a flow diagram showing a method 900 for predicting distances to objects and/or obstacles in an environment using a machine learning model(s), in accordance with some embodiments of the present disclosure. The method 900, at block B902, includes applying first data representative of an image of a field of view of an image sensor to a neural network, the neural network trained based at least in part on second data representative of ground truth information generated using at least one of a LIDAR sensor or a RADAR sensor. For example, the sensor data 702 (and/or data representing the scaling and/or distortion map from camera adaptation 704) may be applied to the machine learning model(s) 104. As described herein, the machine learning model(s) 104 may be trained using ground truth generated—automatically, without human labeling or annotation, in embodiments—using LIDAR sensors and/or RADAR sensors.

The method 900, at block B904, includes computing, using the neural network and based at least in part on the first data, third data representative of depth values corresponding to an image. For example, the machine learning model(s) 104 may compute the distance(s) 106 (or a depth map representative thereof).

The method 900, at block B906, includes determining one or more pixels of the image that corresponding to a bounding shape of an object depicted in the image. For example, the decoder 706 may determine a correlation between a bounding shape(s) predicted by the machine learning model(s) 104 and/or the object detector 708—and a depth value(s) from the distance(s) 106 predicted by the machine learning model(s) 104.

The method 900, at block B908, includes associating, with the object, a depth value of the depth values that corresponds to the one or more pixels. For example, for each object having an associated bounding shape, a distance(s) 106 may be assigned to the object.

Safety Bounds Computation for Clamping Distance Values

Given the accuracy of object detection methods (e.g., via a machine learning model(s) 104, via an object detector 708, etc.), tight bounding shapes around objects or obstacles in images may be generated with good accuracy. As such, based on camera calibration parameters, it is possible to compute the path a light ray takes through 3D, world-space, in order to create a pixel in a target location in image space. A target location may include a location corresponding to a bounding shape, such as a location within a bounding shape, a location along an edge of a bounding shape, or, in some embodiments, a bottom midpoint of a bounding shape (e.g., a point on a bottom, lower edge of a bounding shape). Assuming that the bottom midpoint of the bounding shape is on a ground plane (or a driving surface, with respect to a vehicle or driving environment), the light ray may intersect the ground at this point. If road curvature or grade is known, the radial distance may be computed directly. However, accurately predicting road curvature, especially using image data, presents a challenge.

As such, in some embodiments, even when lacking the direct information of the actual road curvature or grade, a maximum upwards rising curvature and a maximum downwards rising curvature may be assumed for a driving surface—such as by using regulations on road grade as a guide. The curvatures may be viewed as the extreme boundary walls for the actual road curvature, such that these curvatures may be referred to as safety boundaries. As such, an intersection of the light ray traced from a camera through these maximum curvature points gives the minimum and maximum limits that the distance(s) 106 may fall within in order to be considered safety-permissible. In order to compute a minimum road curvature and a maximum road curvature, a light ray trajectory may be intersected with road curvature trajectories (e.g., as estimated by closed-form equations, which in one embodiment, may be approximated as linear (illustrated in FIGS. 10B and 10D), and are bounded by automotive regulations for road grade limits). As a result, the distance(s) 106 from the machine learning model(s) 104 may be clamped to be safety-permissible by ensuring that the distance(s) 106 fall within the value range determined by the minimum and maximum values. For example, where a distance 106 is less than the minimum, the distance 106 may be updated or clamped to be the minimum, and where a distance 106 is greater than the maximum, the distance 106 may be updated or clamped to be the maximum. In 3D world-space, in some embodiments, the physical boundaries governed by road curvature may be shaped like bowls.

Figure 10A:
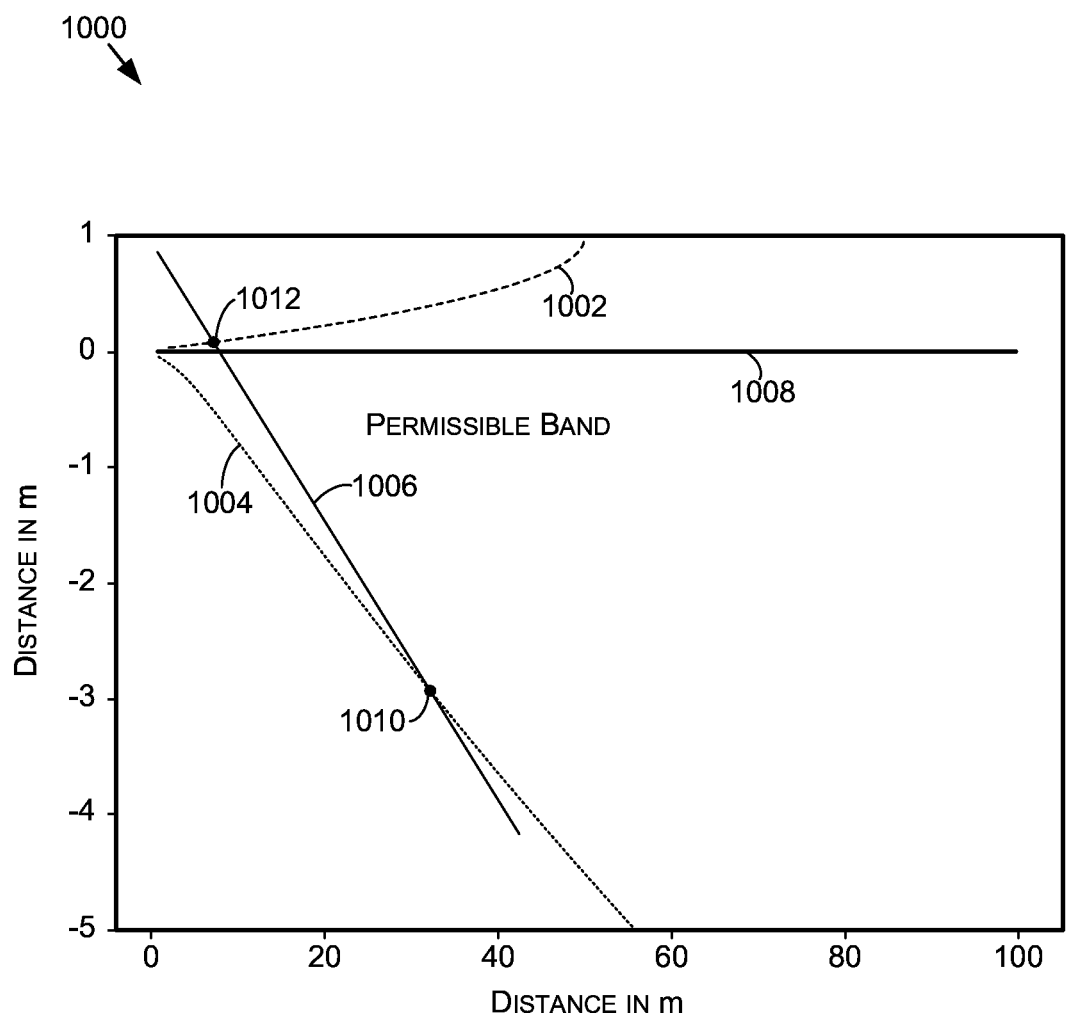
FIG. 10A is a chart illustrating a calculation of safety bounds for clamping distance predictions of a machine learning model(s), in accordance with some embodiments of the present disclosure.

As an example, and with respect to FIG. 10A, FIG. 10A is a chart 1000 illustrating a calculation of safety bounds for clamping distance predictions of a machine learning model(s), in accordance with some embodiments of the present disclosure. The chart 1000 includes an upward curve 1002 representing the determined maximum upward curvature, a downward curve 1004 representing the determined maximum downward curvature, and a ground plane 1008. The upward curvature and the downward curvature help to define the safety-permissible band for determining a maximum value 1012 (e.g., maximum distance value) and a minimum value 1012 (e.g., minimum distance value). A ray 1006 may be projected from a camera through a point—e.g., a bottom center point—corresponding to a bounding shape of an object, which may be estimated to be on the ground plane 1008. As the ray 1006 projects into world-space, the ray 1006 intersects the upward curve 1002 to define the minimum value 1012 and intersects the downward curve 1004 to define the maximum value 1010.

Figure 10B:
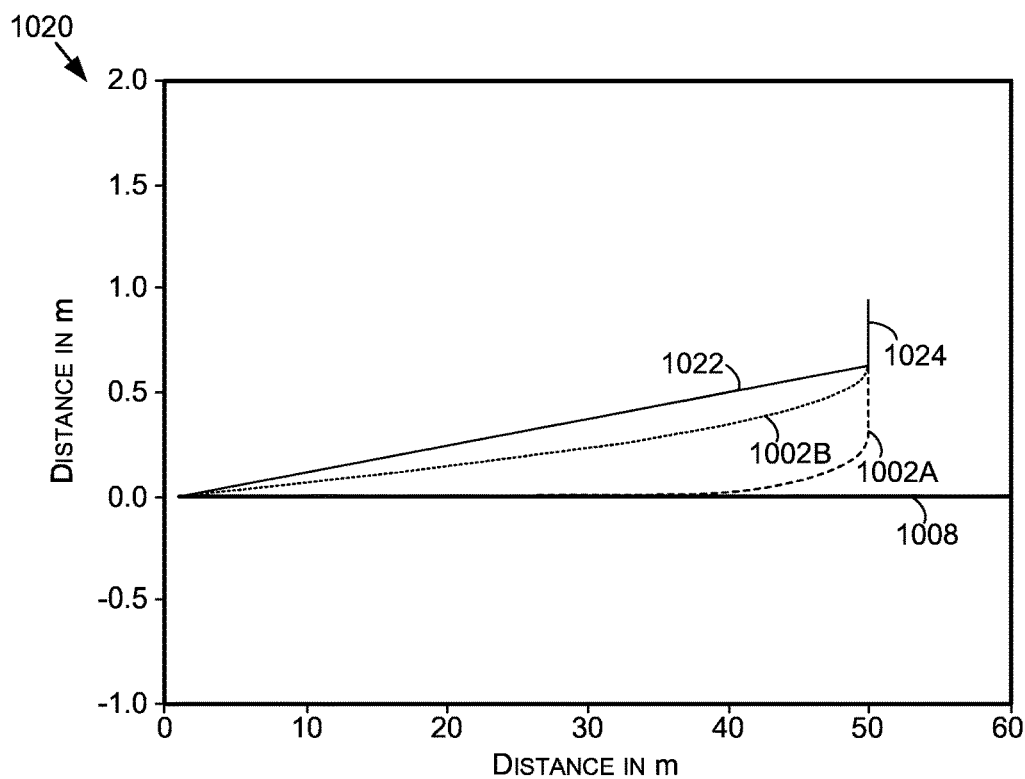
FIG. 10B is a chart illustrating a maximum upward contour for safety bounds computations, in accordance with some embodiments of the present disclosure.

Now referring to FIG. 10B, FIG. 10B is a chart 1020 illustrating a maximum upward contour for safety bounds computations, in accordance with some embodiments of the present disclosure. For example, the chart 1020 includes examples of generating or defining the upward curve 1002 of FIG. 10A that is used for defining the minimum value 1012. In some embodiments, as described herein, it may be more practical to have a smoothly rising wall, or upward curve 1002, that is limited after a threshold. This may be a result of distances becoming increasingly stretched closer to the horizon. It is, however, important to tune the parameters of the upward curve 1002 carefully because, if the upward curve 1002 curves upwards too much, the minimum value 1012 gives more freedom for uncertainties. The minimum value 1012 should also not be so tight as to reject accurate measurement at near distances. In some examples, for every smoothly rising upward curve 1002, a linear curve 1022 may be constructed by joining ends of the smooth upward curve 1002. In some non-limiting embodiments, this simple linear curve 1022 may be used as the upward curve 1002 for the safety boundary that defines the minimum value 1012. In FIG. 10B, several potential selections for the upward curve 1002 are illustrated. Upward curve 1002A represents the upward curve 1002 with less slope than upward curve 1002B. Vertical wall 1024 may represent the extreme upward curve for parameter setting.

Figure 10C:
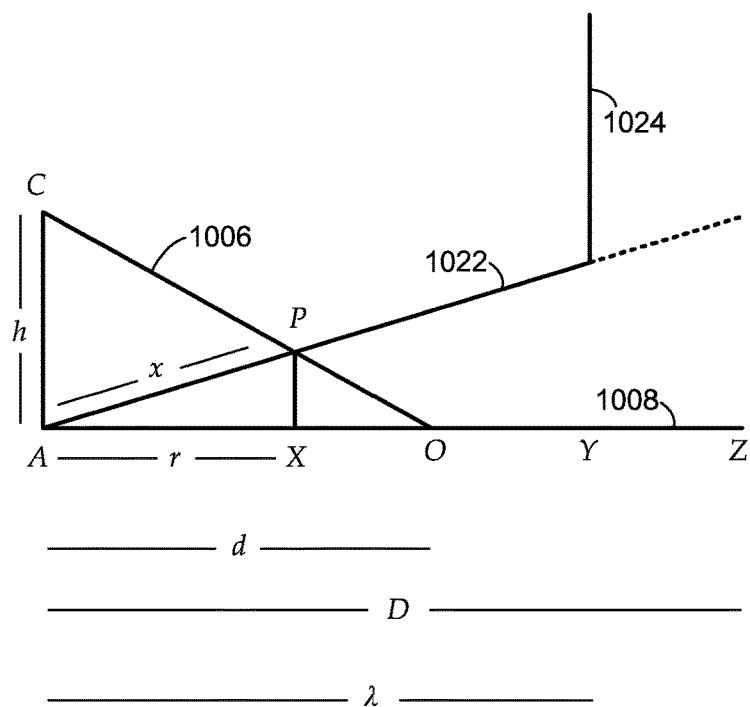
FIG. 10C is an illustration of calculating an upper safety bounds, in accordance with some embodiments of the present disclosure.

Now referring to FIG. 10C, FIG. 10C is an illustration of calculating an upper safety bounds, in accordance with some embodiments of the present disclosure. In at least one embodiment, as described herein, the linear curve 1022 may be determined by connecting ends of the upward curve 1002 (e.g., 1002A or 1002B), and may be used as the upward curve 1002 for the purposes of computing the minimum value 1012. For example, in such embodiments, there may be two parameters that govern the structure of the linear curve 1022—an angle of inclination, $\vartheta$, and a radial distance cap, $\lambda$. The angle of inclination, $\vartheta$, may be written as a function of boundary parameters, D, to simplify the equations. Let, h, be the height of the camera (e.g., from a center point, or other reference location on the camera) to the ground plane 1008. The wall may be assumed to rise linearly with an angle of $\vartheta$, where the angle of inclination, $\vartheta$, is given by equation (4), below:

$$\tan(\theta) = \frac{h}{d} \quad (4)$$

As such, the inclination of the linear curve 1022 may be changed by varying D. The ray 1006 from the camera may intersect the ground plane 1008 at a point, O, which may be at the radial distance, d, from the radial axis. The same ray may intersect the wall at a point, P, and to find the radial distance to the point, P, equations (5)-(9), below, may be used. The value for d may be obtained by using a flat ground assumption to compute the radial distance. Here, the triangle formed by PAO=$\vartheta$, and the triangle formed by POA=$\vartheta$1.

$$\tan(\theta_1) = \frac{h}{D} \quad (5)$$

The following equations (6)-(7) may be observed by applying the sine rule to the triangle PAO:

$$x = d \frac{\sin(\theta_1)}{\sin(\theta_1 + \theta)} \quad (6)$$

$$r = x\cos(\theta) = \frac{d}{1 + \frac{\tan(\theta)}{\tan(\theta_1)}} \quad (7)$$

Since $\lambda$ is the maximum radial distance cap, $$r = \frac{d}{1 + \frac{d}{D}}, \text{ if } d < \frac{\lambda}{1 - \frac{\lambda}{D}} \quad (8)$$

$$r = \lambda, \text{ otherwise} \quad (9)$$

Figure 10D:
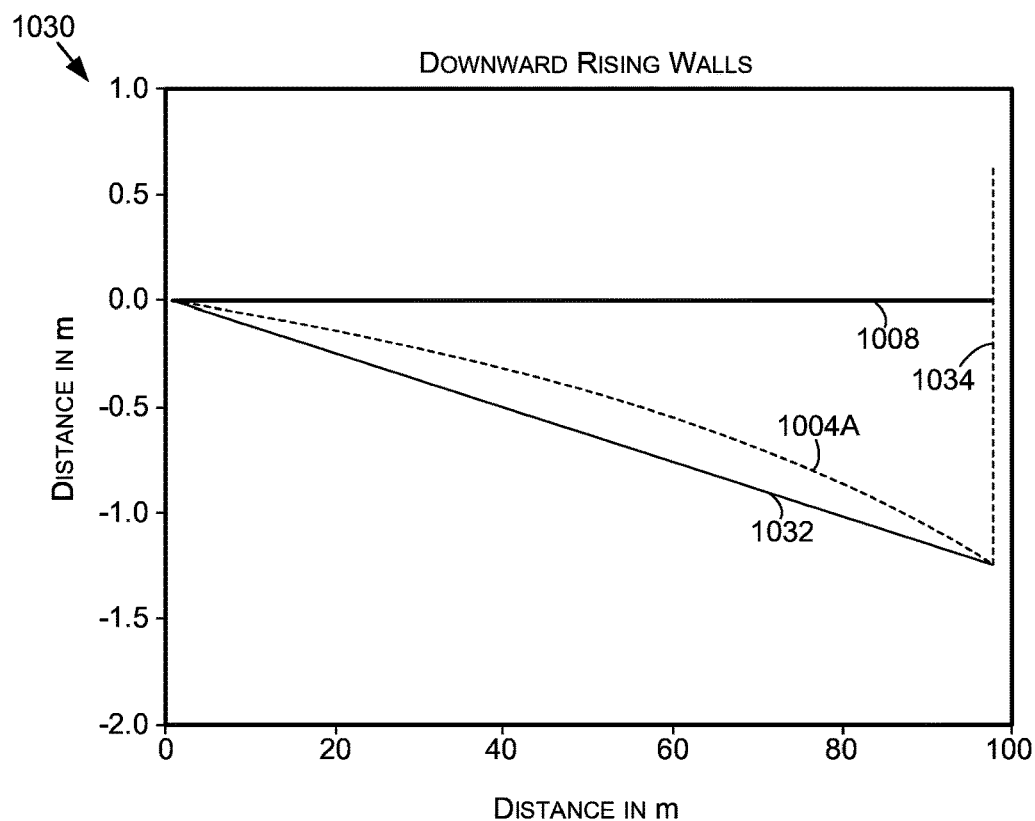
FIG. 10D is a chart illustrating a maximum downward contour for safety bounds computations, in accordance with some embodiments of the present disclosure.

Now referring to FIG. 10D, FIG. 10D is a chart 1030 illustrating a maximum downward contour for safety bounds computations, in accordance with some embodiments of the present disclosure. The downward curve 1004 is used to define the maximum value 1012. Similarly to the upward curve 1002, for every smooth downwards rising wall, or downward curve 1004, a simple linear curve 1032 may be generated that exhibits some flexibility on the maximum value 1012. In some examples, for every smoothly rising downward curve 1004, a linear curve 1032 may be constructed by joining ends of the smooth downward curve 1004. In some non-limiting embodiments, this simple linear curve 1032 may be used as the downward curve 1004 for the safety boundary that defines the maximum value 1010. In FIG. 10D, several potential selections for the downward curve 1004 are illustrated. Downward curve 1004A represents one example of the downward curve 1004, however additional downward curves 1004 with more or less slope may be contemplated without departing from the scope of the present disclosure. Vertical wall 1034 may represent the extreme downward curve for parameter setting.

Figure 10E:
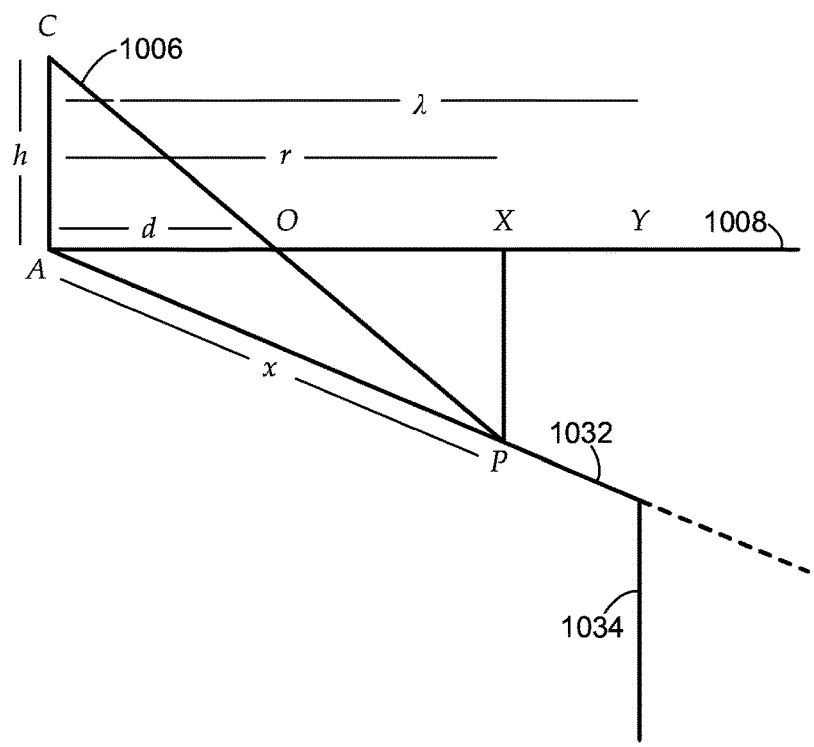
FIG. 10E is an illustration of calculating a lower safety bounds, in accordance with some embodiments of the present disclosure.

Now with reference to FIG. 10E, FIG. 10E is an illustration of calculating a lower safety bounds, in accordance with some embodiments of the present disclosure. In at least one embodiment, as described herein, the linear curve 1032 may be determined by connecting ends of the downward curve 1004 (e.g., 1004A), and may be used as the downward curve 1004 for the purposes of computing the maximum value 1010. For example, in such embodiments, there may be two parameters that govern the structure of the linear curve 1032—an angle of inclination, $\vartheta$, and a radial distance cap, $\lambda$. The angle of inclination, $\vartheta$, may be written as a function of boundary parameters, D, to simplify the equations. Let, h, be the height of the camera (e.g., from a center point, or other reference location on the camera) to the ground plane

1008. The wall may be assumed to rise linearly with an angle of ϑ, where the angle of inclination, ϑ, is given by equation (4), described herein. As such, the inclination of the linear curve 1032 may be changed by varying D. The ray 1006 from the camera may intersect the ground plane 1008 at a point, O, which may be at the radial distance, d, from the radial axis. The same ray may intersect the wall at a point, P, and to find the radial distance to the point, P, equation (5), described herein, and equations (10)-(13), below, may be used. The value for d may be obtained by using a flat ground assumption to compute the radial distance. Here, the triangle formed by PAO=ϑ, and the triangle formed by COA=ϑ1. The following equations (10)-(11) may be observed by applying the sine rule to the triangle PAO:

$$x = d \frac{\sin(\theta_1)}{\sin(\theta_1 - \theta)} \quad (10)$$

$$r = x\cos(\theta) = \frac{d}{1 - \frac{\tan(\theta)}{\tan(\theta_1)}} \quad (11)$$

Since λ is the maximum radial distance cap, $$r = \frac{d}{1 - \frac{d}{D}}, \text{ if } d < \frac{\lambda}{1 - \frac{\lambda}{D}} \quad (12)$$

$$r = \lambda, \text{ otherwise} \quad (13)$$

Figure 10F:
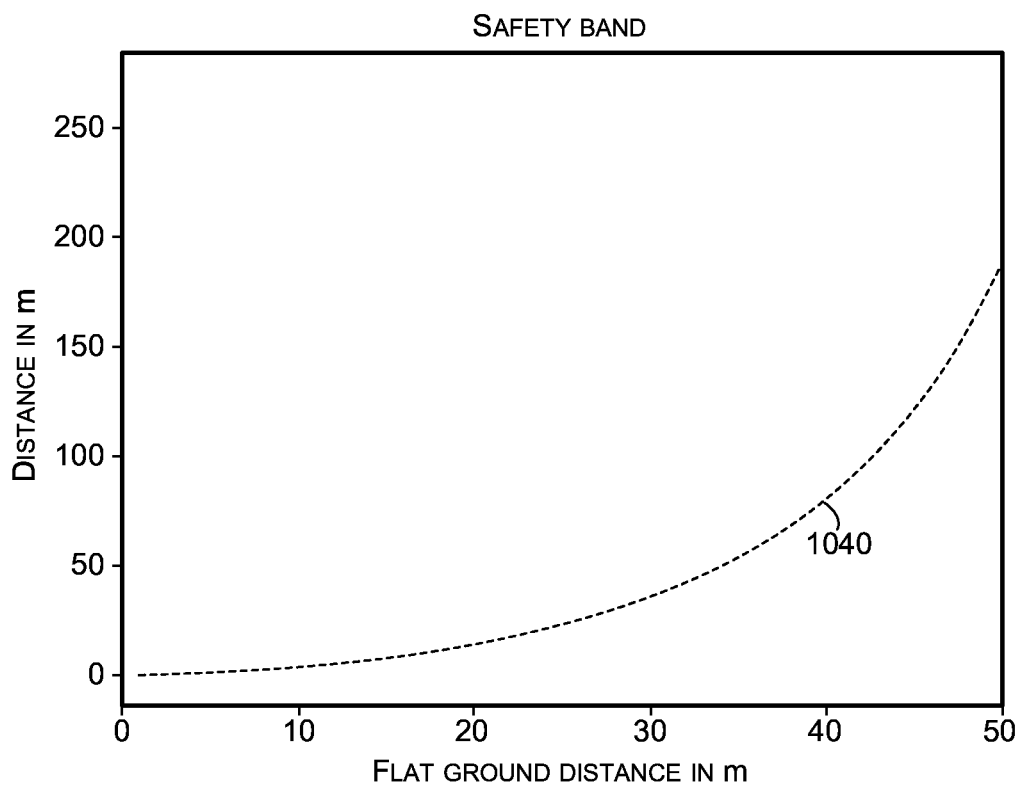
FIG. 10F is an illustration of a safety band profile, in accordance with some embodiments of the present disclosure.

Now referring to FIG. 10F, FIG. 20F is an illustration of a safety band profile, in accordance with some embodiments of the present disclosure. For example, it may also be important to look at a safety band 1040, which may essentially be the difference between the maximum value 1010 and the minimum value 1012 as the ray moves along flat ground. At near distances, the safety band 1040 should be tight and should increase as the obstacle or object moves further away.

Figure 11:
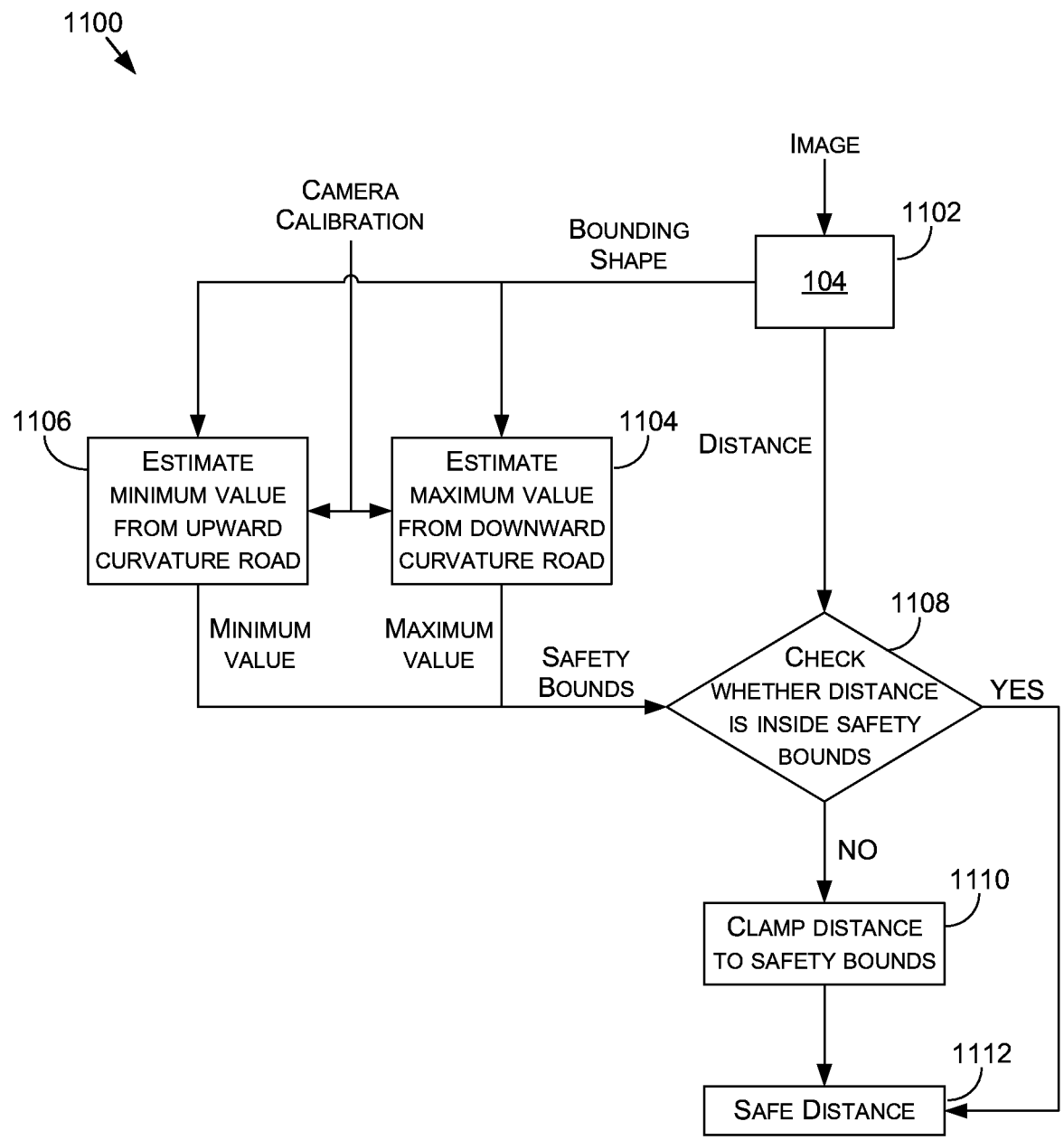
FIG. 11 is a flow diagram showing a method for safety bounds determinations using road shape, in accordance with some embodiments of the present disclosure.

Now referring to FIG. 11, each block of method 1100, described herein, comprises a computing process that may be performed using any combination of hardware, firmware, and/or software. For instance, various functions may be carried out by a processor executing instructions stored in memory. The method 1100 may also be embodied as computer-usable instructions stored on computer storage media. The method 1100 may be provided by a standalone application, a service or hosted service (standalone or in combination with another hosted service), or a plug-in to another product, to name a few. In addition, method 1100 is described, by way of example, with respect to FIGS. 10A-10F. The method 1100 may be executed by any one system, or any combination of systems, including, but not limited to, those described herein.

FIG. 11 is a flow diagram showing a method 1100 for safety bounds determinations using road shape, in accordance with some embodiments of the present disclosure. The method 1100, at block B1102, includes receiving an image (or other sensor data 702) at the machine learning model(s) 104. The machine learning model(s) 104 (and/or the object detector 708) may output a bounding shape which may be used at block B1104 to estimate the minimum value 1012 from the upward curve 1102 and used at block B1106 to estimate the maximum value 1010 from the downward curve 1104. The maximum value 1010 and the minimum value 1012 may define the safety bounds (e.g., a range of distance values between the minimum value 1012 and the maximum value 1010 may be safety-permissible distance values) for the particular object at the particular object instance corresponding to the bounding shape. At block B1102, the machine learning model(s) 104 may output a distance(s) 106, as a predicted distance corresponding to the object instance represented by the bounding shape. At block B1108, a comparison may be done between the distance(s) 106 and the safety bounds defined by the value 1012 and the maximum value 1012. If the distance(s) 106 falls within the safety bounds (e.g., is greater than the minimum value 1012 and less than the maximum value 1010), the distance(s) 106 may be determined to be a safe distance at block B1108, and may be passed to block B1112 to indicate to the system that the distance(s) 106 is acceptable. If the distance(s) 106 falls outside of the safety bounds (e.g., is less than the minimum value 1012 or more than the maximum value 1010), the distance(s) 106 may be determined not to be a safe distance at block B1108. When the distance(s) 106 is outside of the safety bounds, the distance(s) 106 may be clamped to the safety bounds at block 31110. For example, where the distance(s) 106 is less than the minimum value 1012, the distance(s) 106 may be updated to be the minimum value 1012. Similarly, where the distance(s) 106 is greater than the maximum value 1010, the distance(s) 106 may be updated to the maximum value 1010. Once updated, the updated distance(s) may be passed to block B1112 to indicate to the system that the updated distances) is acceptable.

Figure 12:
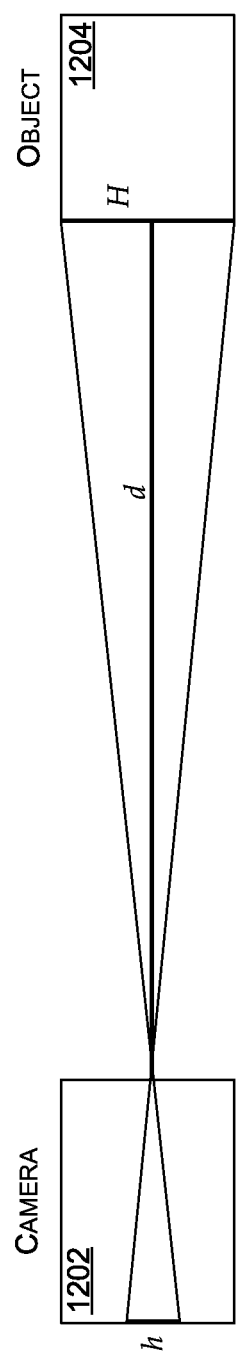
FIG. 12 is an illustration of calculating safety bounds using a bounding shape corresponding to an object, in accordance with some embodiments of the present disclosure.

Now referring to FIG. 12, FIG. 12 is an illustration of calculating safety bounds using a bounding shape corresponding to an object, in accordance with some embodiments of the present disclosure. For example, as described herein, another method of determining safety bounds—that may be used separately from, or in conjunction with, safety bounds from road shape—is using a bounding shape of an object or obstacle. FIG. 12 may represent a pinhole camera model. Using a focal length, f, a real height, H, of an object 1204, a bounding shape height, h, and a projection function, F, then a distance, d, to an object may be calculated using equation (14), below:

$$d = F(f, H, h) \quad (14)$$

In some embodiments, distance, d, to an object may be inversely proportional to the bounding shape height, h, which is typically the pinhole camera model. As such, the distance, d, may be calculated using equation (15), below, which may be referred to as the distance model:

$$d = f * \frac{H}{h} \quad (15)$$

Object detection and distance to object estimation may provide distances ($\{d_0, d_1, d_2, \ldots, d_t\}$) and bounding shape heights ($\{h_0, h_1, h_2, \ldots, h_t\}$). Therefore, a real height, H, of an object may be calculated using, for example, linear regression between d and 1/h. After sufficiently many samples are collected, the value of d in equation (15) may be estimated from h. A safety lower bound, or minimum value, and a safety upper bound, or maximum value, $d_U$, may be determined using, for example, equations (16) and (17), below:

$$d_L = f * \frac{H}{h} - e \qquad (16)$$

$$d_U = f * \frac{H}{h} + e \qquad (17)$$

where e is a predefined safety margin. As such, the real height, H, of the object may be estimated using modeling (e.g., equation (15)) based on d and h data samples over time.

The bounding shape height, h, and the focal length, f, may be replaced by an angle, α, between the optical rays at the middle-top and middle-bottom of the bounding shape, as represented by equation (18), below:

$$d = \frac{H}{2 * \tan(\alpha)} \qquad (18)$$

The inverse camera model may then be applied directly to the bounding shape to obtain the angle, α. Thus, the real object height, H, may be estimated using equation (18) based on samples of d and α over time for any known camera model.

Figure 13:
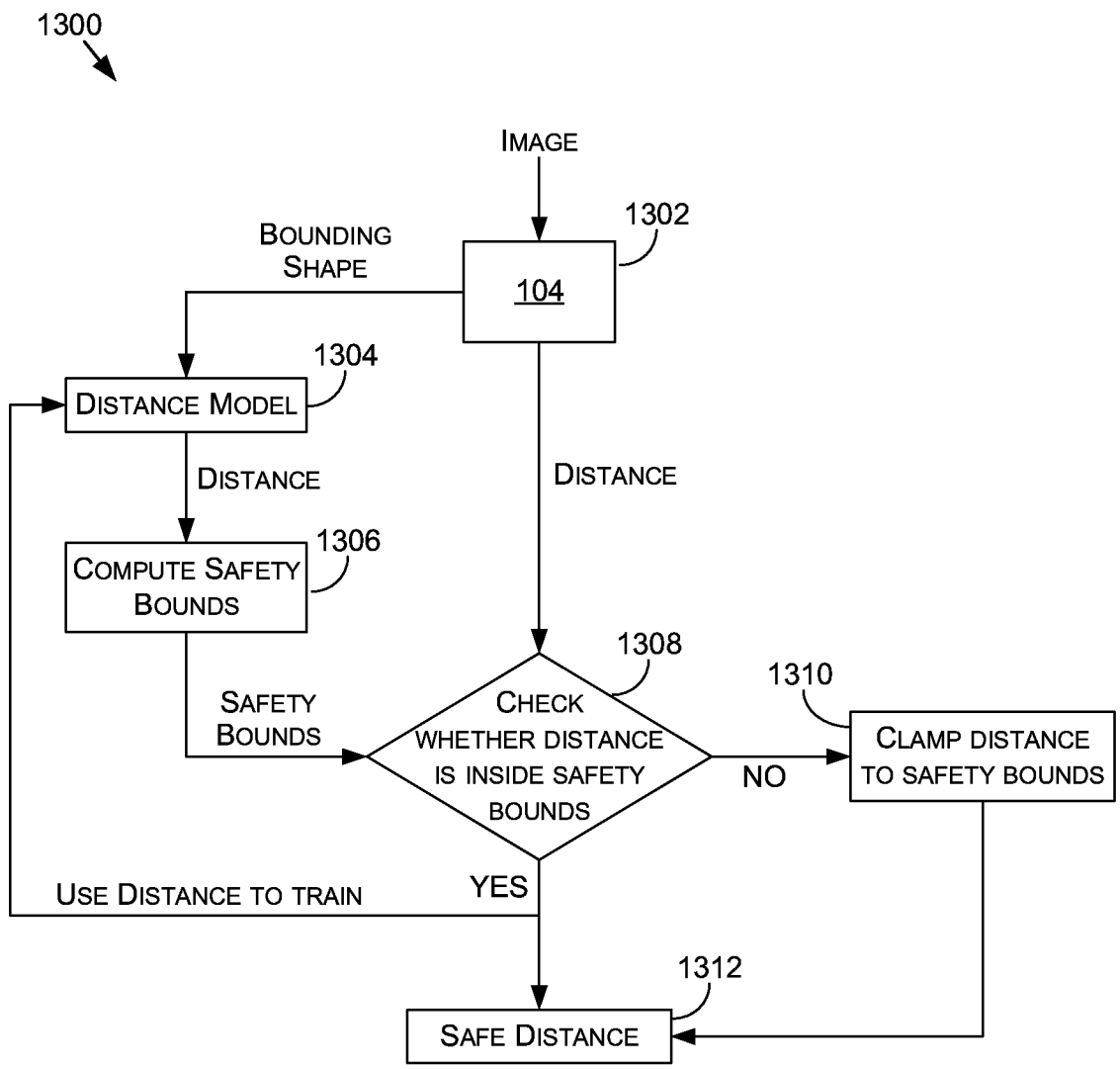
FIG. 13 a flow diagram showing a method for safety bounds determinations using bounding shape properties, in accordance with some embodiments of the present disclosure.

Now referring to FIG. 13, each block of method 1300, described herein, comprises a computing process that may be performed using any combination of hardware, firmware, and/or software. For instance, various functions may be carried out by a processor executing instructions stored in memory. The method 1300 may also be embodied as computer-usable instructions stored on computer storage media. The method 1300 may be provided by a standalone application, a service or hosted service (standalone or in combination with another hosted service), or a plug-in to another product, to name a few. In addition, method 1300 is described, by way of example, with respect to FIG. 12. The method 1300 may be executed by any one system, or any combination of systems, including, but not limited to, those described herein.

FIG. 13 a flow diagram showing a method 1300 for safety bounds determinations using bounding shape properties, in accordance with some embodiments of the present disclosure. The method 1300, at block B1302, includes receiving an image (or other sensor data 702) at the machine learning model(s) 104. The machine learning model(s) 104 (and/or the object detector 708) may output a bounding shape which may be used at block B1304 for computing a distance, d, according to the distance model of equation (15), described herein. The distance, d may then be used at block B1306 to compute safety bounds (e.g., a minimum value, $d_L$, and a maximum value, $d_U$), such as, for example, according to equations (16) and (17), described herein. At block B1302, the machine learning model(s) 104 may output a distance(s) 106, as a predicted distance corresponding to the object instance represented by the bounding shape. At block B1308, a comparison may be done between the distance(s) 106 and the safety bounds defined by the minimum value, $d_L$, and the maximum value, $d_U$. If the distance(s) 106 falls within the safety bounds (e.g., is greater than the minimum value and less than the maximum value), the distance(s) 106 may be determined to be a safe distance at block B1308, and may be passed to block B1312 to indicate to the system that the distance(s) 106 is acceptable. In addition, where the distance(s) 106 is acceptable, the information may be passed back to the distance model to further train or update the distance model, as described herein with respect to FIG. 12. If the distance(s) 106 falls outside of the safety bounds (e.g., is less than the minimum value or more than the maximum value), the distance(s) 106 may be determined not to be a safe distance at block B1308. When the distance(s) 106 is outside of the safety bounds, the distance(s) 106 may be clamped to the safety bounds at block B3110. For example, where the distance(s) 106 is less than the minimum value, the distance(s) 106 may be updated to be the minimum value. Similarly, where the distance(s) 106 is greater than the maximum value, the distance(s) 106 may be updated to the maximum value. Once updated, the updated distance(s) may be passed to block B1312 to indicate to the system that the updated distance(s) is acceptable.

Example Autonomous Vehicle

Figure 14A:
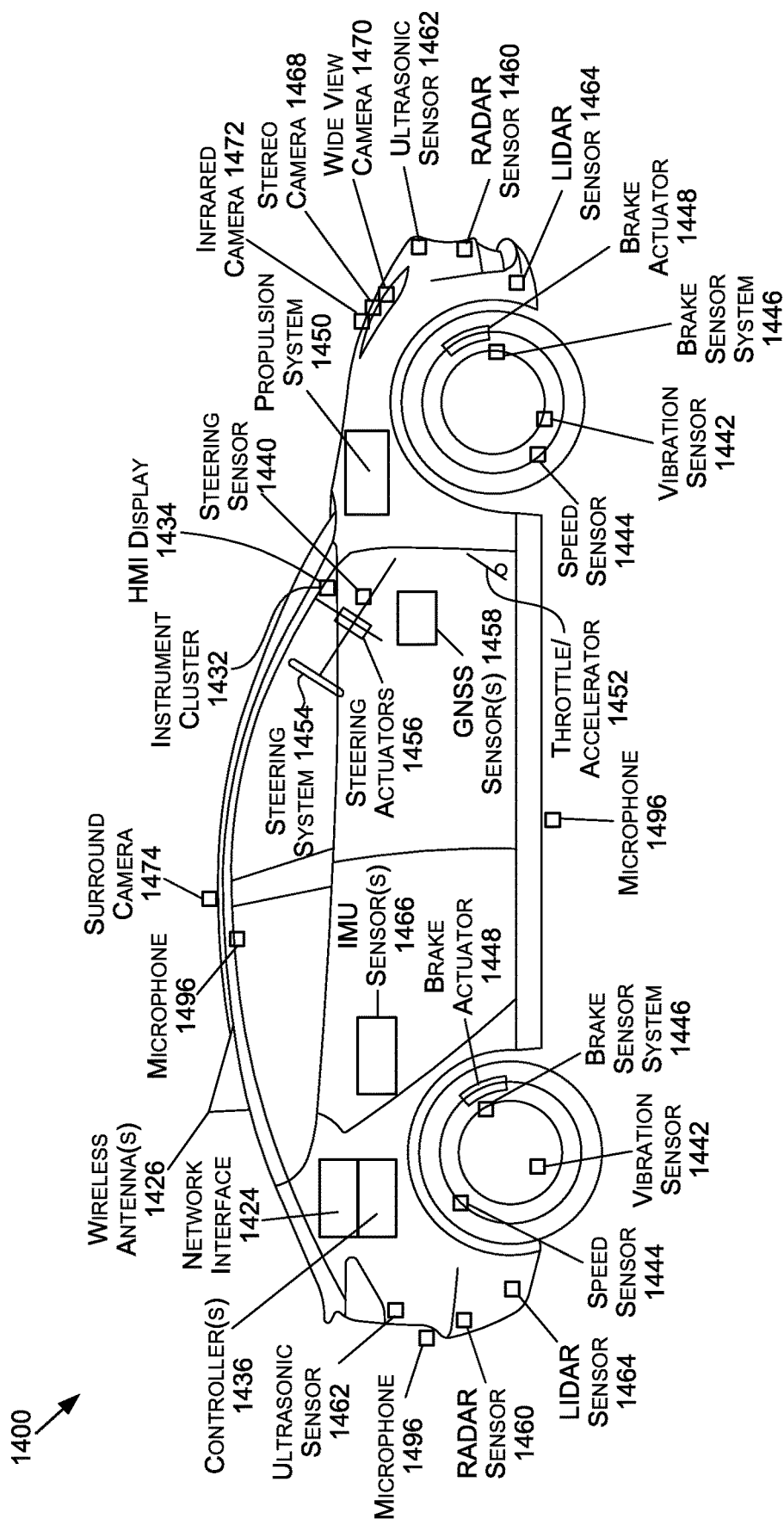
FIG. 14A is an illustration of an example autonomous vehicle, in accordance with some embodiments of the present disclosure.

FIG. 14A is an illustration of an example autonomous vehicle 1400, in accordance with some embodiments of the present disclosure. The autonomous vehicle 1400 (alternatively referred to herein as the "vehicle 1400") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1400 may be capable of functionality in accordance with one or more of Level 3-Level 5 of the autonomous driving levels. For example, the vehicle 1400 may be capable of conditional automation (Level 3), high automation (Level 4), and/or full automation (Level 5), depending on the embodiment.

The vehicle 1400 may include components such as a chassis, a vehicle body, wheels (e.g., 2, 4, 6, 8, 18, etc.), tires, axles, and other components of a vehicle. The vehicle 1400 may include a propulsion system 1450, such as an internal combustion engine, hybrid electric power plant, an all-electric engine, and/or another propulsion system type. The propulsion system 1450 may be connected to a drive train of the vehicle 1400, which may include a transmission, to enable the propulsion of the vehicle 1400. The propulsion system 1450 may be controlled in response to receiving signals from the throttle/accelerator 1452.

A steering system 1454, which may include a steering wheel, may be used to steer the vehicle 1400 (e.g., along a desired path or route) when the propulsion system 1450 is operating (e.g., when the vehicle is in motion). The steering system 1454 may receive signals from a steering actuator 1456. The steering wheel may be optional for full automation (Level 5) functionality.

The brake sensor system 1446 may be used to operate the vehicle brakes in response to receiving signals from the brake actuators 1448 and/or brake sensors.

Controller(s) 1436, which may include one or more system on chips (SoCs) 1404 (FIG. 14C) and/or GPU(s), may provide signals (e.g., representative of commands) to one or more components and/or systems of the vehicle 1400.

For example, the controller(s) may send signals to operate the vehicle brakes via one or more brake actuators 1448, to operate the steering system 1454 via one or more steering actuators 1456, to operate the propulsion system 1450 via one or more throttle/accelerators 1452. The controller(s) 1436 may include one or more onboard (e.g., integrated) computing devices (e.g., supercomputers) that process sensor signals, and output operation commands (e.g., signals representing commands) to enable autonomous driving and/or to assist a human driver in driving the vehicle 1400. The controller(s) 1436 may include a first controller 1436 for autonomous driving functions, a second controller 1436 for functional safety functions, a third controller 1436 for artificial intelligence functionality (e.g., computer vision), a fourth controller 1436 for infotainment functionality, a fifth controller 1436 for redundancy in emergency conditions, and/or other controllers. In some examples, a single controller 1436 may handle two or more of the above functionalities, two or more controllers 1436 may handle a single functionality, and/or any combination thereof.

The controller(s) 1436 may provide the signals for controlling one or more components and/or systems of the vehicle 1400 in response to sensor data received from one or more sensors (e.g., sensor inputs). The sensor data may be received from, for example and without limitation, global navigation satellite systems sensor(s) 1458 (e.g., Global Positioning System sensor(s)), RADAR sensor(s) 1460, ultrasonic sensor(s) 1462, LIDAR sensor(s) 1464, inertial measurement unit (IMU) sensor(s) 1466 (e.g., accelerometer(s), gyroscope(s), magnetic compass(es), magnetometer(s), etc.), microphone(s) 1496, stereo camera(s) 1468, wide-view camera(s) 1470 (e.g., fisheye cameras), infrared camera(s) 1472, surround camera(s) 1474 (e.g., 360 degree cameras), long-range and/or mid-range camera(s) 1498, speed sensor(s) 1444 (e.g., for measuring the speed of the vehicle 1400), vibration sensor(s) 1442, steering sensor(s) 1440, brake sensor(s) (e.g., as part of the brake sensor system 1446), and/or other sensor types.

One or more of the controller(s) 1436 may receive inputs (e.g., represented by input data) from an instrument cluster 1432 of the vehicle 1400 and provide outputs (e.g., represented by output data, display data, etc.) via a human-machine interface (HMI) display 1434, an audible annunciator, a loudspeaker, and/or via other components of the vehicle 1400. The outputs may include information such as vehicle velocity, speed, time, map data (e.g., the HMI map 1422 of FIG. 14C), location data (e.g., the vehicle's 1400 location, such as on a map), direction, location of other vehicles (e.g., an occupancy grid), information about objects and status of objects as perceived by the controller(s) 1436, etc. For example, the HMI display 1434 may display information about the presence of one or more objects (e.g., a street sign, caution sign, traffic light changing, etc), and/or information about driving maneuvers the vehicle has made, is making, or will make (e.g., changing lanes now, taking exit 34B in two miles, etc.).

The vehicle 1400 further includes a network interface 1424 which may use one or more wireless antenna(s) 1426 and/or modem(s) to communicate over one or more networks. For example, the network interface 1424 may be capable of communication over LTE, WCDMA, UNITS, GSM, CDMA2000, etc. The wireless antenna(s) 1426 may also enable communication between objects in the environment (e.g., vehicles, mobile devices, etc.), using local area network(s), such as Bluetooth, Bluetooth LE, Z-Wave, Zig-Bee, etc., and/or low power wide-area network(s) (LP-WANs), such as LoRaWAN SigFox, etc.

Figure 14B:
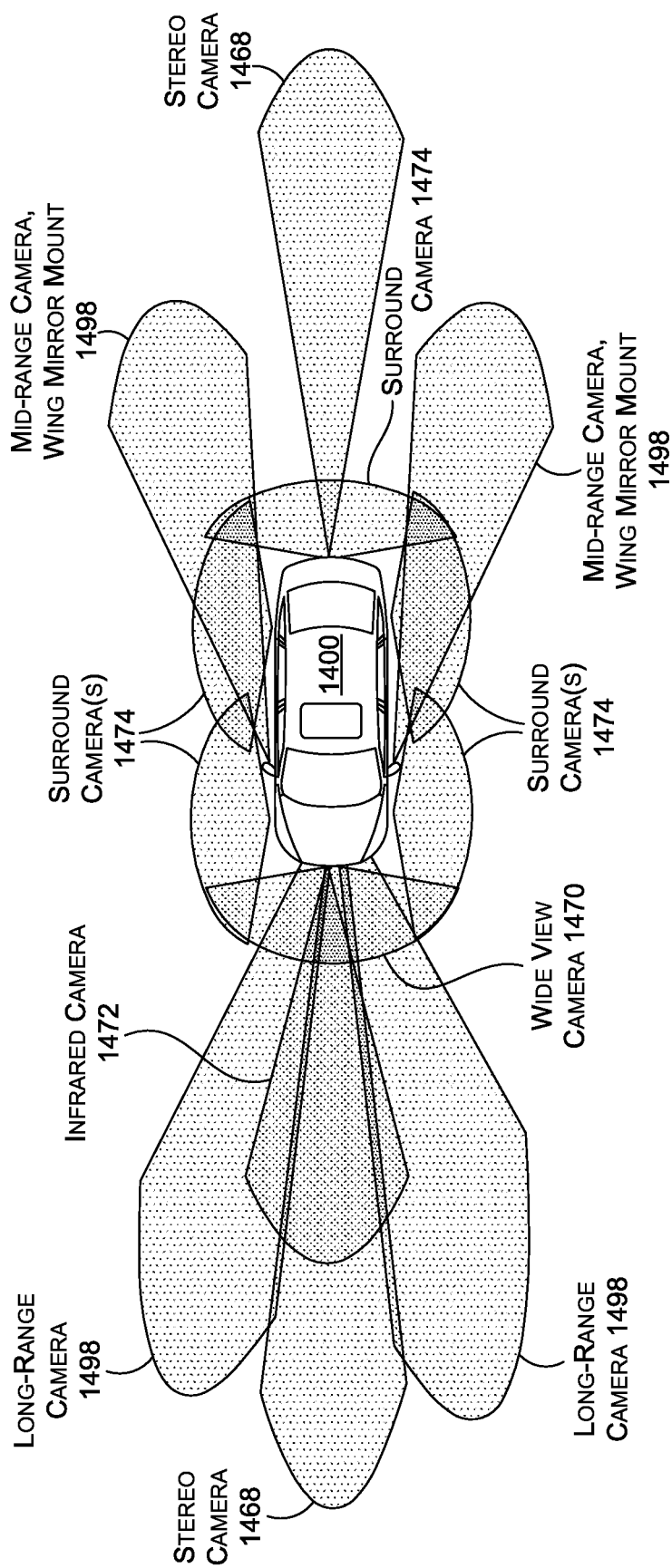
FIG. 14B is an example of camera locations and fields of view for the example autonomous vehicle of FIG. 14A, in accordance with some embodiments of the present disclosure.

FIG. 14B is an example of camera locations and fields of view for the example autonomous vehicle 1400 of FIG. 14A, in accordance with some embodiments of the present disclosure. The cameras and respective fields of view are one example embodiment and are not intended to be limiting. For example, additional and/or alternative cameras may be included and/or the cameras may be located at different locations on the vehicle 1400.

The camera types for the cameras may include, but are not limited to, digital cameras that may be adapted for use with the components and/or systems of the vehicle 1400. The camera(s) may operate at automotive safety integrity level (ASIL) B and/or at another ASIL. The camera types may be capable of any image capture rate, such as 60 frames per second (fps), 1420 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) also be integrated within the four pillars at each corner of the cabin.

Cameras with a field of view that include portions of the environment in front of the vehicle 1400 (e.g., front-facing cameras) may be used for surround view, to help identify forward facing paths and obstacles, as well aid in, with the help of one or more controllers 1436 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 1470 that may be used to perceive objects coming into view from the periphery (e.g., pedestrians, crossing traffic or bicycles). Although only one wide-view camera is illustrated in FIG. 14B, there may any number of wide-view cameras 1470 on the vehicle 1400. In addition, long-range camera(s) 1498 (e.g., a long-view stereo camera pair) may be used for depth-based object detection, especially for objects for which a neural network has not yet been trained. The long-range camera(s) 1498 may also be used for object detection and classification, as well as basic object tracking.

One or more stereo cameras 1468 may also be included in a front-facing configuration. The stereo camera(s) 1468 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 1468 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1468 may be used in addition to, or alternatively from, those described herein.

Cameras with a field of view that include portions of the environment to the side of the vehicle 1400 (e.g., side-view cameras) may be used for surround view, providing information used to create and update the occupancy grid, as well as to generate side impact collision warnings. For example, surround camera(s) 1474 (e.g., four surround cameras 1474 as illustrated in FIG. 14B) may be positioned to on the vehicle 1400. The surround camera(s) 1474 may include wide-view camera(s) 1470, fisheye camera(s), 360 degree camera(s), and/or the like. Four example, four fisheye cameras may be positioned on the vehicle's front, rear, and sides. In an alternative arrangement, the vehicle may use three surround camera(s) 1474 (e.g., left, right, and rear), and may leverage one or more other camera(s) (e.g., a forward-facing camera) as a fourth surround view camera.

Cameras with a field of view that include portions of the environment to the rear of the vehicle 1400 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1498, stereo camera(s) 1468), infrared camera(s) 1472, etc.), as described herein.

Figure 14C:
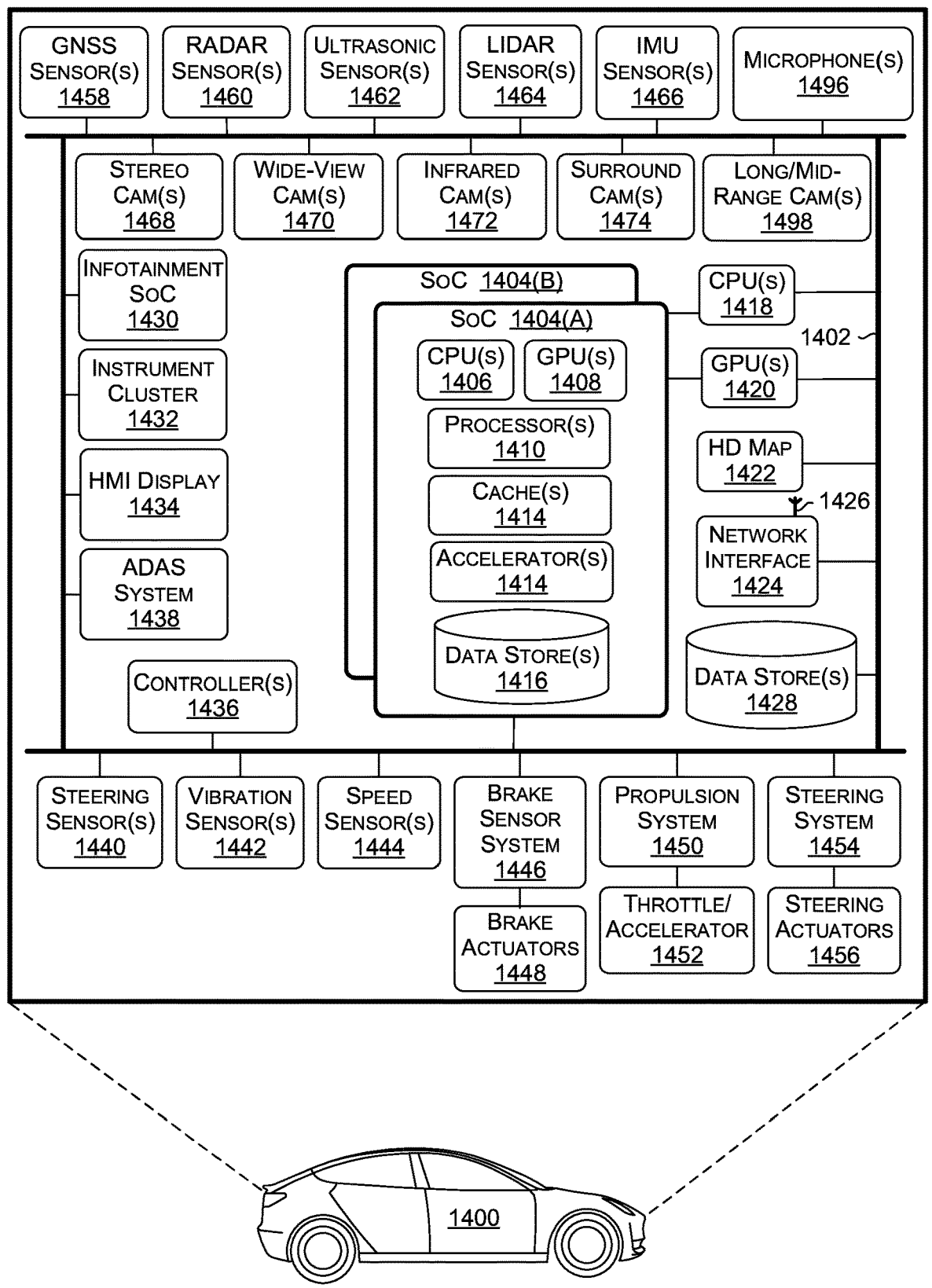
FIG. 14C is a block diagram of an example system architecture for the example autonomous vehicle of FIG. 14A, in accordance with some embodiments of the present disclosure.

FIG. 14C is a block diagram of an example system architecture for the example autonomous vehicle 1400 of FIG. 14A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1400 in FIG. 14C are illustrated as being connected via bus 1402. The bus 1402 may include a Controller Area Network (CAN) data interface (alternatively referred to herein as a "CAN bus"). A CAN may be a network inside the vehicle 1400 used to aid in control of various features and functionality of the vehicle 1400, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1402 is described herein as being a CAN bus, this is not intended to be limiting. For example, in addition to, or alternatively from, the CAN bus, FlexRay and/or Ethernet may be used. Additionally, although a single line is used to represent the bus 1402, this is not intended to be limiting. For example, there may be any number of busses 1402, which may include one or more CAN busses, one or more FlexRay busses, one or more Ethernet busses, and/or one or more other types of busses using a different protocol. In some examples, two or more busses 1402 may be used to perform different functions, and/or may be used for redundancy. For example, a first bus 1402 may be used for collision avoidance functionality and a second bus 1402 may be used for actuation control. In any example, each bus 1402 may communicate with any of the components of the vehicle 1400, and two or more busses 1402 may communicate with the same components. In some examples, each SoC 1404, each controller 1436, and/or each computer within the vehicle may have access to the same input data (e.g., inputs from sensors of the vehicle 1400), and may be connected to a common bus, such the CAN bus.

The vehicle 1400 may include one or more controllers) 1436, such as those described herein with respect to FIG. 14A. The controller(s) 1436 may be used for a variety of functions. The controller(s) 1436 may be coupled to any of the various other components and systems of the vehicle 1400, and may be used for control of the vehicle 1400, artificial intelligence of the vehicle 1400, infotainment for the vehicle 1400, and/or the like.

The vehicle 1400 may include a system(s) on a chip (SoC) 1404. The SoC 1404 may include CPU(s) 1406, GPU(s) 1408, processor(s) 1410, cache(s) 1412, accelerator(s) 1414, data store(s) 1416, and/or other components and features not illustrated. The SoC(s) 1404 may be used to control the vehicle 1400 in a variety of platforms and systems. For example, the SoC(s) 1404 may be combined in a system (e.g., the system of the vehicle 1400) with an HD map 1422 which may obtain map refreshes and/or updates via a network interface 1424 from one or more servers (e.g., server(s) 1478 of FIG. 14D).

The CPU(s) 1406 may include a CPU cluster or CPU complex (alternatively referred to herein as a "CCPLEX"). The CPU(s) 1406 may include multiple cores and/or L2 caches. For example, in some embodiments, the CPU(s) 1406 may include eight cores in a coherent multi-processor configuration. In some embodiments, the CPU(s) 1406 may include four dual-core clusters where each cluster has a dedicated L2 cache (e.g., a 2 MB L2 cache). The CPU(s) 1406 (e.g., the CCPLEX) may be configured to support simultaneous cluster operation enabling any combination of the clusters of the CPU(s) 1406 to be active at any given time.

The CPU(s) 1406 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1406 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1408 may include an integrated GPU (alternatively referred to herein as an "iGPU"). The GPU(s) 1408 may be programmable and may be efficient for parallel workloads. The GPU(s) 1408, in some examples, may use an enhanced tensor instruction set. The GPU(s) 1408 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1408 may include at least eight streaming microprocessors. The GPU(s) 1408 may use compute application programming interface(s) (API(s)). In addition, the GPU(s) 1408 may use one or more parallel computing platforms and/or programming models (e.g., NVIDIA's CUBA).

The GPU(s) 1408 may be power-optimized for best performance in automotive and embedded use cases. For example, the GPU(s) 1408 may be fabricated on a Fin field-effect transistor (FinFET). However, this is not intended to be limiting and the GPU(s) 1408 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1408 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1408 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1408 to access the CPU(s) 1406 page tables directly. In such examples, when the GPU(s) 1408 memory management unit (MMU) experiences a miss, an address translation request may be transmitted to the CPU(s) 1406. In response, the CPU(s) 1406 may look in its page tables for the virtual-to-physical mapping for the address and transmits the translation back to the GPU(s) 1408. As such, unified memory technology may allow a single unified virtual address space for memory of both the CPU(s) 1406 and the GPU(s) 1408, thereby simplifying the GPU(s) 1408 programming and porting of applications to the GPU(s) 1408.

In addition, the GPU(s) 1408 may include an access counter that may keep track of the frequency of access of the GPU(s) 1408 to memory of other processors. The access counter may help ensure that memory pages are moved to the physical memory of the processor that is accessing the pages most frequently.

The SoC(s) 1404 may include any number of cache(s) 1412, including those described herein. For example, the cache(s) 1412 may include an L3 cache that is available to both the CPU(s) 1406 and the GPU(s) 1408 (e.g., that is connected both the CPU(s) 1406 and the GPU(s) 1408). The cache(s) 1412 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1404 may include one or more accelerators 1414 (e.g., hardware accelerators, software accelerators, or a combination thereof). For example, the SoC(s) 1404 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1408 and to off-load some of the tasks of the GPU(s) 1408 (e.g., to free up more cycles of the GPU(s) 1408 for performing other tasks). As an example, the accelerator(s) 1414 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1414 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1408, and by using an inference accelerator, for example, a designer may target either the DLA(s) or the GPU(s) 1408 for any function. For example, the designer may focus processing of CNNs and floating point operations on the DLA(s) and leave other functions to the GPU(s) 1408 and/or other accelerator(s) 1414.

The accelerator(s) 1414 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1406. The DIA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1414 (e.g., the hardware acceleration cluster) may include a computer vision network on-chip and SRAM, for providing a high-bandwidth, low latency SRAM for the accelerator(s) 1414. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1404 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate realtime visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

The accelerator(s) 1414 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1466 output that correlates with the vehicle 1400 orientation, distance, 3D location estimates of the object obtained from the neural network and/or other sensors (e.g., LIDAR sensor(s) 1464 or RADAR sensor(s) 1460), among others.

The SoC(s) 1404 may include data store(s) 1416 (e.g., memory). The data store(s) 1416 may be on-chip memory of the SoC(s) 1404, which may store neural networks to be executed on the GPU and/or the DLA. In some examples, the data store(s) 1416 may be large enough in capacity to store multiple instances of neural networks for redundancy and safety. The data store(s) 1412 may comprise L2 or L3 cache(s) 1412. Reference to the data store(s) 1416 may include reference to the memory associated with the PVA, DLA, and/or other accelerator(s) 1414, as described herein.

The SoC(s) 1404 may include one or more processor(s) 1410 (e.g., embedded processors). The processor(s) 1410 may include a boot and power management processor that may be a dedicated processor and subsystem to handle boot power and management functions and related security enforcement. The boot and power management processor may be a part of the SoC(s) 1404 boot sequence and may provide runtime power management services. The boot power and management processor may provide clock and voltage programming, assistance in system low power state transitions, management of SoC(s) 1404 thermals and temperature sensors, and/or management of the SoC(s) 1404 power states. Each temperature sensor may be implemented as a ring-oscillator whose output frequency is proportional to temperature, and the SoC(s) 1404 may use the ring-oscillators to detect temperatures of the CPU(s) 1406, GPU(s) 1408, and/or accelerator(s) 1414. If temperatures are determined to exceed a threshold, the boot and power management processor may enter a temperature fault routine and put the SoC(s) 1404 into a lower power state and/or put the vehicle 1400 into a chauffeur to safe stop mode (e.g., bring the vehicle 1400 to a safe stop).

The processor(s) 1410 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1410 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1410 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1410 may further include a real-time camera engine that may include a dedicated processor subsystem for handling real-time camera management.

The processor(s) 1410 may further include a high-dynamic range signal processor that may include an image signal processor that is a hardware engine that is part of the camera processing pipeline.

The processor(s) 1410 may include a video image compositor that may be a processing block (e.g., implemented on a microprocessor) that implements video post-processing functions needed by a video playback application to produce the final image for the player window. The video image compositor may perform lens distortion correction on wide-view camera(s) 1470, surround camera(s) 1474, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1408 is not required to continuously render new surfaces. Even when the GPU(s) 1408 is powered on and active doing 3D rendering, the video image compositor may be used to offload the GPU(s) 1408 to improve performance and responsiveness.

The SoC(s) 1404 may further include a mobile industry processor interface (MIPI) camera serial interface for receiving video and input from cameras, a high-speed interface, and/or a video input block that may be used for camera and related pixel input functions. The SoC(s) 1404 may further include an input/output controller(s) that may be controlled by software and may be used for receiving I/O signals that are uncommitted to a specific role.

The SoC(s) 1404 may further include a broad range of peripheral interfaces to enable communication with peripherals, audio codecs, power management, and/or other devices. The SoC(s) 1404 may be used to process data from cameras (e.g., connected over Gigabit Multimedia Serial Link and Ethernet), sensors (e.g., LIDAR sensor(s) 1464, RADAR sensor(s) 1460, etc. that may be connected over Ethernet), data from bus 1402 (e.g., speed of vehicle 1400, steering wheel position, etc.), data from GNSS sensor(s) 1458 (e.g., connected over Ethernet or CAN bus). The SoC(s) 1404 may further include dedicated high-performance mass storage controllers that may include their own DMA engines, and that may be used to free the CPU(s) 1406 from routine data management tasks.

The SoC(s) 1404 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1404 may be faster, more reliable, and even more energy-efficient and space-efficient than conventional systems. For example, the accelerator(s) 1414, when combined with the CPU(s) 1406, the GPU(s) 1408, and the data store(s) 1416, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1420) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1408.

In some examples, a CNN for facial recognition and vehicle owner identification may use data from camera sensors to identify the presence of an authorized driver and/or owner of the vehicle 1400. The always on sensor processing engine may be used to unlock the vehicle when the owner approaches the driver door and turn on the lights, and, in security mode, to disable the vehicle when the owner leaves the vehicle. In this way, the SoC(s) 1404 provide for security against theft and/or carjacking.

In another example, a CNN for emergency vehicle detection and identification may use data from microphones 1496 to detect and identify emergency vehicle sirens. In contrast to conventional systems, that use general classifiers to detect sirens and manually extract features, the SoC(s) 1404 use the CNN for classifying environmental and urban sounds, as well as classifying visual data. In a preferred embodiment, the CNN running on the DLA is trained to identify the relative closing speed of the emergency vehicle (e.g., by using the Doppler Effect) The CNN may also be trained to identify emergency vehicles specific to the local area in which the vehicle is operating, as identified by GNSS sensor(s) 1458. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over the side of the road, parking the vehicle, and/or idling the vehicle, with the assistance of ultrasonic sensors 1462, until the emergency vehicle(s) passes.

The vehicle may include a CPU(s) 1418 (e.g., discrete CPU(s), or dCPU(s)), that may be coupled to the SoC(s) 1404 via a high-speed interconnect (e.g., PCIe). The CPU(s) 1418 may include an X86 processor, for example. The CPU(s) 1418 may be used to perform any of a variety of functions, including arbitrating potentially inconsistent results between ADAS sensors and the SoC(s) 1404, and/or monitoring the status and health of the controller(s) 1436 and/or infotainment SoC 1430, for example.

The vehicle 1400 may include a GPU(s) 1420 (e.g., discrete GPU(s), or dGPU(s)), that may be coupled to the SoC(s) 1404 via a high-speed interconnect (e.g., NVIDIA's NVLINK). The GPU(s) 1420 may provide additional artificial intelligence functionality, such as by executing redundant and/or different neural networks, and may be used to train and/or update neural networks based on input (e.g., sensor data) from sensors of the vehicle 1400.

The vehicle 1400 may further include the network interface 1424 which may include one or more wireless antennas 1426 (e.g., one or more wireless antennas for different communication protocols, such as a cellular antenna, a Bluetooth antenna, etc.). The network interface 1424 may be used to enable wireless connectivity over the Internet with the cloud (e.g., with the server(s) 1478 and/or other network devices), with other vehicles, and/or with computing devices client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1400 information about vehicles in proximity to the vehicle 1400 (e.g., vehicles in front of, on the side of, and/or behind the vehicle 1400). This functionality may be part of a cooperative adaptive cruise control functionality of the vehicle 1400.

The network interface 1424 may include a SoC that provides modulation and demodulation functionality and enables the controller(s) 1436 to communicate over wireless networks. The network interface 1424 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Z-Wave, ZigBee, LoRaWAN, and/or other wireless protocols.

The vehicle 1400 may further include data store(s) 1428 which may include off-chip (e.g., off the SoC(s) 1404) storage. The data store(s) 1428 may include one or more storage elements including RAM, SRAM, DRAM, VRAM, Flash, hard disks, and/or other components and/or devices that may store at least one bit of data.

The vehicle 1400 may further include GNSS sensor(s) 1458. The GNSS sensor(s) 1458 (e.g., GPS and/or assisted GPS sensors), to assist in mapping, perception, occupancy grid generation, and/or path planning functions. Any number of GNSS sensor(s) 1458 may be used, including, for example and without limitation, a GPS using a USB connector with an Ethernet to Serial (RS-232) bridge.

The vehicle 1400 may further include RADAR sensor(s) 1460. The RADAR sensor(s) 1460 may be used by the vehicle 1400 for long-range vehicle detection, even in darkness and/or severe weather conditions. RADAR functional safety levels may be ASIL B. The RADAR sensor(s) 1460 may use the CAN and/or the bus 1402 (e.g., to transmit data generated by the RADAR sensor(s) 1460) for control and to access object tracking data, with access to Ethernet to access raw data in some examples. A wide variety of RADAR sensor types may be used. For example, and without limitation, the RADAR sensor(s) 1460 may be suitable for front, rear, and side RADAR use. In some example, Pulse Doppler RADAR sensor(s) are used.

The RADAR sensor(s) 1460 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1460 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed. CAN and FlexRay interface. In an example with six antennae, the central four antennae may create a focused beam pattern, designed to record the vehicle's 1400 surroundings at higher speeds with minimal interference from traffic in adjacent lanes. The other two antennae may expand the field of view, making it possible to quickly detect vehicles entering or leaving the vehicle's 1400 lane.

Mid-range RADAR systems may include, as an example, a range of up to 1460 m (front) or 80 m (rear), and a field of view of up to 42 degrees (front) or 1450 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1400 may further include ultrasonic sensor(s) 1462. The ultrasonic sensor(s) 1462, which may be positioned at the front, back, and/or the sides of the vehicle 1400, may be used for park assist and/or to create and update an occupancy grid. A wide variety of ultrasonic sensor(s) 1462 may be used, and different ultrasonic sensor(s) 1462 may be used for different ranges of detection (e.g., 2.5 m, 4 m). The ultrasonic sensor(s) 1462 may operate at functional safety levels of ASIL B.

The vehicle 1400 may include LIDAR sensor(s) 1464. The LIDAR sensor(s) 1464 may be used for object and pedestrian detection, emergency braking, collision avoidance, and/or other functions. The LIDAR sensor(s) 1464 may be functional safety level ASIL B. In some examples, the vehicle 1400 may include multiple LIDAR sensors 1464 (two, four, six, etc.) that may use Ethernet (e.g., to provide data to a Gigabit Ethernet switch).

In some examples, the LIDAR sensor(s) 1464 may be capable of providing a list of objects and their distances for a 360-degree field of view. Commercially available LIDAR sensor(s) 1464 may have an advertised range of approximately 1400 m, with an accuracy of 2 cm-3 cm, and with support for a 1400 Mbps Ethernet connection, for example. In some examples, one or more non-protruding LIDAR sensors 1464 may be used. In such examples, the LIDAR sensor(s) 1464 may be implemented as a small device that may be embedded into the front, rear, sides, and/or corners of the vehicle 1400. The LIDAR sensor(s) 1464, in such examples, may provide up to a 1420-degree horizontal and 35-degree vertical field-of-view, with a 200 m range even for low-reflectivity objects. Front-mounted LIDAR sensor(s) 1464 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1400. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1464 may be less susceptible to motion blur, vibration, and/or shock.

The vehicle may further include IMU sensor(s) 1466. The IMU sensor(s) 1466 may be located at a center of the rear axle of the vehicle 1400, in some examples. The IMU sensor(s) 1466 may include, for example and without limitation, an accelerometer(s), a magnetometer(s), a gyroscope(s), a magnetic compass(es), and/or other sensor types. In some examples, such as in six-axis applications, the mu sensor(s) 1466 may include accelerometers and gyroscopes, while in nine-axis applications, the IMU sensor(s) 1466 may include accelerometers, gyroscopes, and magnetometers.

In some embodiments, the IMU sensor(s) 1466 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1466 may enable the vehicle 1400 to estimate heading without requiring input from a magnetic sensor by directly observing and correlating the changes in velocity from GPS to the IMU sensor(s) 1466. In some examples, the IMU sensor(s) 1466 and the GNSS sensor(s) 1458 may be combined in a single integrated unit.

The vehicle may include microphone(s) 1496 placed in and/or around the vehicle 1400. The microphone(s) 1496 may be used for emergency vehicle detection and identification, among other things.

The vehicle may further include any number of camera types, including stereo camera 1468, wide-view camera(s) 1470, infrared camera(s) 1472, surround camera(s) 1474, long-range and/or mid-range camera(s) 1498, and/or other camera types. The cameras may be used to capture image data around an entire periphery of the vehicle 1400. The types of cameras used depends on the embodiments and requirements for the vehicle 1400, and any combination of camera types may be used to provide the necessary coverage around the vehicle 1400. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 14A and FIG. 14B.

The vehicle 1400 may further include vibration sensor(s) 1442. The vibration sensor(s) 1442 may measure vibrations of components of the vehicle, such as the axle(s). For example, changes in vibrations may indicate a change in road surfaces. In another example, when two or more vibration sensors 1442 are used, the differences between the vibrations may be used to determine friction or slippage of the road surface (e.g., when the difference in vibration is between a power-driven axle and a freely rotating axle).

The vehicle 1400 may include an ADAS system 1438. The ADAS system 1438 may include a SoC, in some examples. The ADAS system 1438 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1460, LIDAR sensor(s) 1464, and/or a camera(s). The ACC systems may include longitudinal ACC and/or lateral ACC. Longitudinal ACC monitors and controls the distance to the vehicle immediately ahead of the vehicle 1400 and automatically adjust the vehicle speed to maintain a safe distance from vehicles ahead. Lateral ACC performs distance keeping, and advises the vehicle 1400 to change lanes when necessary Lateral ACC is related to other ADA applications such as LCA and CWS.

CACC uses information from other vehicles that may be received via the network interface 1424 and/or the wireless antennas) 1426 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1400), while the I2V communication concept provides information about traffic further ahead. CACC systems may include either or both I2V and V2V information sources. Given the information of the vehicles ahead of the vehicle 1400, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1460, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1460, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1400 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1400 if the vehicle 1400 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1460, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1400 is backing up. Some RCTW systems include AEB to ensure that the vehicle brakes are applied to avoid a crash. RCTW systems may use one or more rear-facing RADAR sensor(s) 1460, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1400, the vehicle 1400 itself must, in the case of conflicting results, decide whether to heed the result from a primary computer or a secondary computer (e.g., a first controller 1436 or a second controller 1436). For example, in some embodiments, the ADAS system 1438 may be a backup and/or secondary computer for providing perception information to a backup computer rationality module. The backup computer rationality monitor may run a redundant diverse software on hardware components to detect faults in perception and dynamic driving tasks. Outputs from the ADAS system 1438 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1404.

In other examples, ADAS system 1438 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1438 may be fed into the primary computer's perception block and/or the primary computer's dynamic driving task block. For example, if the ADAS system 1438 indicates a forward crash warning due to an object immediately ahead, the perception block may use this information when identifying objects. In other examples, the secondary computer may have its own neural network which is trained and thus reduces the risk of false positives, as described herein.

The vehicle 1400 may further include the infotainment SoC 1430 (e.g., an in-vehicle infotainment system (IVI)). Although illustrated and described as a SoC, the infotainment system may not be a SoC, and may include two or more discrete components. The infotainment SoC 1430 may include a combination of hardware and software that may be used to provide audio (e.g., music, a personal digital assistant, navigational instructions, news, radio, etc. video (e.g., TV, movies, streaming, etc.), phone (e.g., hands-free calling), network connectivity (e.g., LTE, etc.), and/or information services (e.g., navigation systems, rear-parking assistance, a radio data system, vehicle related information such as fuel level, total distance covered, brake fuel level, oil level, door open/close, air filter information, etc.) to the vehicle 1400. For example, the infotainment SoC 1430 may radios, disk players, navigation systems, video players, USB and Bluetooth connectivity, carputers, in-car entertainment, Wi-Fi, steering wheel audio controls, hands free voice control, a heads-up display (HUD), an HMI display 1434, a telematics device, a control panel (e.g., for controlling and/or interacting with various components, features, and/or systems), and/or other components. The infotainment SoC 1430 may further be used to provide information (e.g., visual and/or audible) to a user(s) of the vehicle, such as information from the ADAS system 1438, autonomous driving information such as planned vehicle maneuvers, trajectories, surrounding environment information (e.g., intersection information, vehicle information, road information, etc.), and/or other information.

The infotainment SoC 1430 may include GPU functionality. The infotainment SoC 1430 may communicate over the bus 1402 (e.g., CAN bus, Ethernet, etc.) with other devices, systems, and/or components of the vehicle 1400. In some examples, the infotainment SoC 1430 may be coupled to a supervisory MCU such that the GPU of the infotainment system may perform some self-driving functions in the event that the primary controller(s) 1436 (e.g., the primary and/or backup computers of the vehicle 1400) fail. In such an example, the infotainment SoC 1430 may put the vehicle 1400 into a chauffeur to safe stop mode, as described herein.

The vehicle 1400 may further include an instrument cluster 1432 (e.g., a digital dash, an electronic instrument cluster, a digital instrument panel, etc.). The instrument cluster 1432 may include a controller and/or supercomputer (e.g., a discrete controller or supercomputer). The instrument cluster 1432 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1430 and the instrument cluster 1432. In other words, the instrument cluster 1432 may be included as part of the infotainment SoC 1430, or vice versa.

Figure 14D:
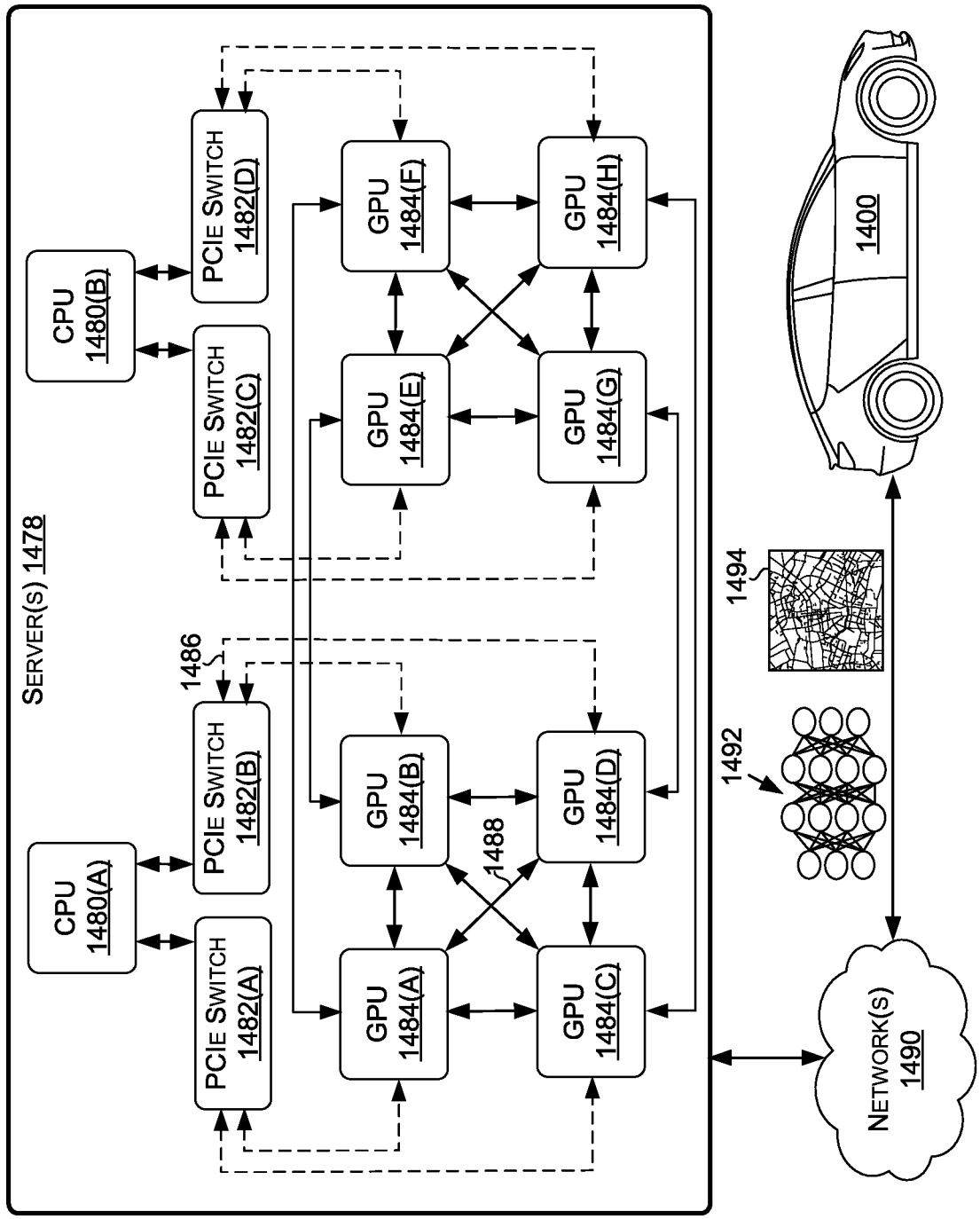
FIG. 14D is a system diagram for communication between cloud-based servers(s) and the example autonomous vehicle of FIG. 14A, in accordance with some embodiments of the present disclosure.

FIG. 14D is a system diagram for communication between cloud-based server(s) and the example autonomous vehicle 1400 of FIG. 14A, in accordance with some embodiments of the present disclosure. The system 1476 may include server(s) 1478, network(s) 1490, and vehicles, including the vehicle 1400. The server(s) 1478 may include a plurality of GPUs 1484(A)-1484(H) (collectively referred to herein as GPUs 1484), PCIe switches 1482(A)-1482(H) (collectively referred to herein as PCIe switches 1482), and/or CPUs 1480(A)-1480(B) (collectively referred to herein as CPUs 1480). The GPUs 1484, the CPUs 1480, and the PCIe switches may be interconnected with high-speed interconnects such as, for example and without limitation, NVLink interfaces 1488 developed by NVIDIA and/or PCIe connections 1486. In some examples, the GPUs 1484 are connected via NVLink and/or NVSwitch SoC and the GPUs 1484 and the PCIe switches 1482 are connected via PCIe interconnects. Although eight GPUs 1484, two CPUs 1480, and two PCIe switches are illustrated, this is not intended to be limiting. Depending on the embodiment, each of the server(s) 1478 may include any number of GPUs 1484, CPUs 1480, and/or PCIe switches. For example, the server(s) 1478 may each include eight, sixteen, thirty-two, and/or more GPUs 1484.

The server(s) 1478 may receive, over the network(s) 1490 and from the vehicles, image data representative of images showing unexpected or changed road conditions, such as recently commenced road-work. The server(s) 1478 may transmit, over the network(s) 1490 and to the vehicles, neural networks 1492, updated neural networks 1492, and/or map information 1494, including information regarding traffic and road conditions. The updates to the map information 1494 may include updates for the HD map 1422, such as information regarding construction sites, potholes, detours, flooding, and/or other obstructions. In some examples, the neural networks 1492, the updated neural networks 1492, and/or the map information 1494 may have resulted from new training and/or experiences represented in data received from any number of vehicles in the environment, and/or based on training performed at a datacenter (e.g., using the server(s) 1478 and/or other servers).

The server(s) 1478 may be used to train machine learning models (e.g., neural networks) based on training data. The training data may be generated by the vehicles, and/or may be generated in a simulation (e.g., using a game engine). In some examples, the training data is tagged (where the neural network benefits from supervised learning) and/or undergoes other pre-processing, while in other examples the training data is not tagged and/or pre-processed (e.g., where the neural network does not require supervised learning). Once the machine learning models are trained, the machine learning models may be used by the vehicles (e.g., transmitted to the vehicles over the network(s) 1490, and/or the machine learning models may be used by the server(s) 1478 to remotely monitor the vehicles.

In some examples, the server(s) 1478 may receive data from the vehicles and apply the data to up-to-date real-time neural networks for real-time intelligent inferencing. The server(s) 1478 may include deep-learning supercomputers and/or dedicated AI computers powered by GPU(s) 1484, such as a DGX and DGX Station machines developed by NVIDIA. However, in some examples, the server(s) 1478 may include deep learning infrastructure that use only CPU-powered datacenters.

The deep-learning infrastructure of the server(s) 1478 may be capable of fast, real-time inferencing, and may use that capability to evaluate and verify the health of the processors, software, and/or associated hardware in the vehicle 1400. For example, the deep-learning infrastructure may receive periodic updates from the vehicle 1400, such as a sequence of images and/or objects that the vehicle 1400 has located in that sequence of images (e.g., via computer vision and/or other machine learning object classification techniques). The deep-learning infrastructure may run its own neural network to identify the objects and compare them with the objects identified by the vehicle 1400 and, if the results do not match and the infrastructure concludes that the AI in the vehicle 1400 is malfunctioning, the server(s) 1478 may transmit a signal to the vehicle 1400 instructing a fail-safe computer of the vehicle 1400 to assume control, notify the passengers, and complete a safe parking maneuver.

For inferencing, the server(s) 1478 may include the GPU(s) 1484 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 15:
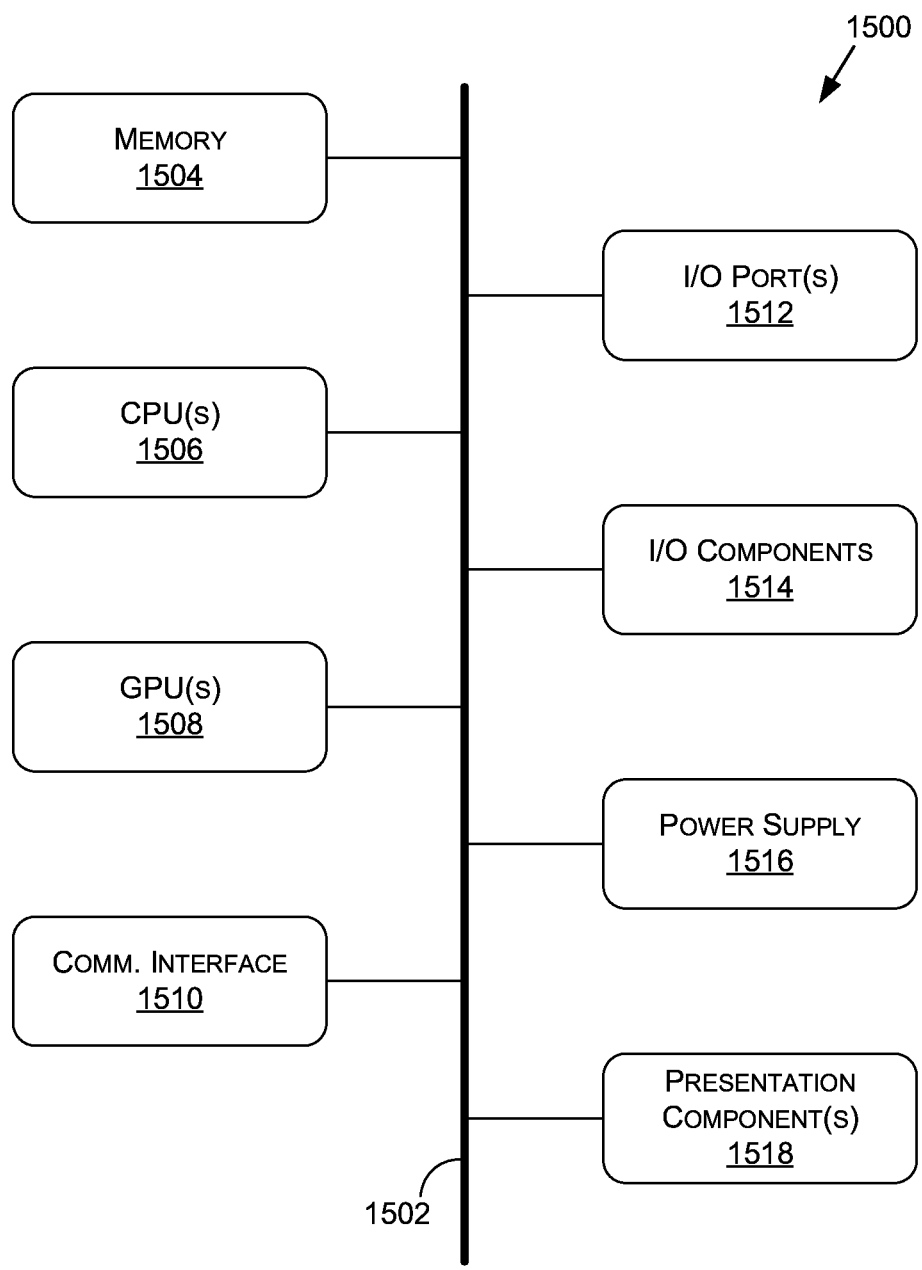
FIG. 15 is a block diagram of an example computing device suitable for use in implementing some embodiments of the present disclosure.

FIG. 15 is a block diagram of an example computing device 1500 suitable for use in implementing some embodiments of the present disclosure. Computing device 1500 may include a bus 1502 that directly or indirectly couples the following devices: memory 1504, one or more central processing units (CPUs) 1506, one or more graphics processing units (GPUs) 1508, a communication interface 1510, input/output (I/O) ports 1512, input/output components 1514, a power supply 1516, and one or more presentation components 1518 (e.g., display(s)).

Although the various blocks of FIG. 15 are shown as connected via the bus 1502 with lines, this is not intended to be limiting and is for clarity only. For example, in some embodiments, a presentation component 1518, such as a display device, may be considered an I/O component 1514 (e.g., if the display is a touch screen). As another example, the CPUs 1506 and/or GPUs 1508 may include memory (e.g., the memory 1504 may be representative of a storage device in addition to the memory of the GPUs 1508, the CPUs 1506, and/or other components). In other words, the computing device of FIG. 15 is merely illustrative. Distinction is not made between such categories as "workstation," "server," "laptop," "desktop," "tablet," "client device," "mobile device," "hand-held device," "game console," "electronic control unit (ECU)," "virtual reality system," "automobile computing device," and/or other device or system types, as all are contemplated within the scope of the computing device of FIG. 15. In some embodiments, one or more components described herein with respect to FIG. 15 may be used by the vehicle 1400, described herein. For example, the CPUs 1506, the GPUs 1508, and/or other components may be similar to or may perform functions of one or more components of the vehicle 1400, described herein.

The bus 1502 may represent one or more busses, such as an address bus, a data bus, a control bus, or a combination thereof. The bus 1502 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 1504 may include any of a variety of computer-readable media. The computer-readable media may be any available media that may be accessed by the computing device 1500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1500. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 1506 may be configured to execute the computer-readable instructions to control one or more components of the computing device 1500 to perform one or more of the methods and/or processes described herein. The CPU(s) 1506 may each include one or more cores (e.g., one, two, four, eight, twenty-eight, seventy-two, etc.) that are capable of handling a multitude of software threads simultaneously. The CPU(s) 1506 may include any type of processor, and may include different types of processors depending on the type of computing device 1500 implemented (e.g., processors with fewer cores for mobile devices and processors with more cores for servers). For example, depending on the type of computing device 1500, the processor may be an ARM processor implemented using Reduced Instruction Set Computing (RISC) or an x86 processor implemented using Complex Instruction Set Computing (CISC). The computing device 1500 may include one or more CPUs 1506 in addition to one or more microprocessors or supplementary co-processors, such as math co-processors.

The GPU(s) 1508 may be used by the computing device 1500 to render graphics (e.g., 3D graphics). The GPU(s) 1508 may include hundreds or thousands of cores that are capable of handling hundreds or thousands of software threads simultaneously. The GPU(s) 1508 may generate pixel data for output images in response to rendering commands (e.g., rendering commands from the CPU(s) 1506 received via a host interface). The GPU(s) 1508 may include graphics memory, such as display memory, for storing pixel data. The display memory may be included as part of the memory 1504. The GPU(s) 708 may include two or more GPUs operating in parallel (e.g., via a link). When combined together, each GPU 1508 may generate pixel data for different portions of an output image or for different output images (e.g., a first GPU for a first image and a second GPU for a second image). Each GPU may include its own memory, or may share memory with other CPUs.

In examples where the computing device 1500 does not include the GPU(s) 1508, the CPU(s) 1506 may be used to render graphics.

The communication interface 1510 may include one or more receivers, transmitters, and/or transceivers that enable the computing device 700 to communicate with other computing devices via an electronic communication network, included wired and/or wireless communications. The communication interface 1510 may include components and functionality to enable communication over any of a number of different networks, such as wireless networks (e.g., Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 1512 may enable the computing device 1500 to be logically coupled to other devices including the I/O components 1514, the presentation component(s) 1518, and/or other components, some of which may be built in to (e.g., integrated in) the computing device 1500. Illustrative I/O components 1514 include a microphone, mouse, keyboard, joystick, game pad, game controller, satellite dish, scanner, printer, wireless device, etc. The I/O components 1514 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1500. The computing device 1500 may be include depth cameras, such as stereoscopic camera systems, infrared camera systems, RGB camera systems, touchscreen technology, and combinations of these, for gesture detection and recognition. Additionally, the computing device 1500 may include accelerometers or gyroscopes (e.g., as part of an inertia measurement unit (IMU)) that enable detection of motion. In some examples, the output of the accelerometers or gyroscopes may be used by the computing device 1500 to render immersive augmented reality or virtual reality.

The power supply 1516 may include a hard-wired power supply, a battery power supply, or a combination thereof. The power supply 1516 may provide power to the computing device 1500 to enable the components of the computing device 1500 to operate.

The presentation component(s) 1518 may include a display (e.g., a monitor, a touch screen, a television screen, a heads-up-display (HUD), other display types, or a combination thereof), speakers, and/or other presentation components. The presentation components) 1518 may receive data from other components (e.g., the GPU(s) 1508, the CPU(s) 1506, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter aright also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A processor comprising:
 processing circuitry to:
  compute, using one or more machine learning models and based at least in part on image data representative of an image generated using one or more image sensors of an ego-machine, data indicative of one or more depth values corresponding to one or more pixels of an image;
  determine at least one pixel of the one or more pixels that corresponds to a location of one or more bounding shapes associated with an object depicted in the image;
  determine an associated depth value for the object based at least in part on a depth value of the one or more depth values that corresponds to the at least one pixel; and
  perform one or more operations for controlling the ego-machine through an environment based at least in part on the associated depth value for the object.

2. The processor of claim 1, wherein at least one machine learning model of the one or more machine learning models is trained using ground truth data generated using at least one of a LIDAR sensor or a RADAR sensor.

3. The processor of claim 1, wherein the one or more depth values corresponding to each pixel within a bounding shape of the one or more bounding shapes are used in the determination of the associated depth value for the object.

4. The processor of claim 1, wherein the data computed using the one or more machine learning models is representative of a depth map.

5. The processor of claim 1, wherein:
 at least one machine learning model of the one or more machine learning models is trained according to a reference parameter of a reference image sensor;
 a scaling factor is applied to the one or more depth values to generate one or more final depth values based on a parameter of at least one image sensor of the one or more image sensors being different from the reference parameter; and
 the associated depth value of the one or more depth values includes a final depth value of the one or more final depth values.

6. The processor of claim 1, wherein the computation of the data is further based at least in part on at least one of a scaling map or a distortion map corresponding to at least one image sensor of the one or more image sensors.

7. The processor of claim 1, wherein the processing circuitry is further to compute the location of the one or more bounding shapes using the one or more machine learning models, one or more other machine learning models, or one or more object detection algorithms.

8. The processor of claim 1, wherein the processor is comprised in at least one of:
 a control system for an autonomous or semi-autonomous machine;
 a perception system for an autonomous or semi-autonomous machine;
 a system for performing simulation operations;
 a system for performing light transport simulation;
 a system for performing deep learning operations;
 a system implemented using an edge device;
 a system implemented using a robot;
 a system for generating synthetic data;

a system implemented at least partially in a data center; or
a system implemented at least partially using cloud computing resources.

9. A system comprising:
one or more processors comprising processing circuitry to:
compute at least a first location of a first bounding shape and a second location of a second bounding shape;
determine, using a clustering algorithm and based at least in part on the first location and the second location, that the first bounding shape and the second bounding shape correspond to a same object;
generate, based at least in part on the determination, a final bounding shape based at least in part on the first bounding shape and the second bounding shape;
compute, using one or more machine learning models and based at least in part on an image generated using one or more image sensors of an ego-machine, one or more depth values corresponding to one or more pixels of the image;
associate at least one depth value of the one or more depth values with the final bounding shape based at least in part on the at least one depth value corresponding to a pixel of the one or more pixels that corresponds to the final bounding shape; and
perform one or more operations for controlling the ego-machine based at least in part on the final bounding shape and the at least one depth value.

10. The system of claim 9, wherein the computation of the first bounding shape and the second bounding shape is executed using the one or more machine learning models, one or more other machine learning models, or one or more object detection algorithms.

11. The system of claim 9, wherein the computation of the one or more depth values is further based at least in part on at least one of a scaling map or a distortion map corresponding to at least one image sensor of the one or more image sensors.

12. The system of claim 9, wherein the one or more depth value are represented using a depth map generated based at least in part on an output of the one or more machine learning models.

13. The system of claim 9, wherein at least one machine learning model of the one or more machine learning models is trained using ground truth data generated using at least one of a LIDAR sensor or a RADAR sensor.

14. The system of claim 9, wherein the system is comprised in at least one of:
a control system for an autonomous or semi-autonomous machine;
a perception system for an autonomous or semi-autonomous machine;
a system for performing simulation operations;
a system for performing light transport simulation;
a system for performing deep learning operations;
a system implemented using an edge device;
a system implemented using a robot;
a system for generating synthetic data;
a system implemented at least partially in a data center; or
a system implemented at least partially using cloud computing resources.

15. A processor comprising:
processing circuitry to control, at least in part, an ego-machine based at least in part on one or more depth values associated with one or more object bounding shapes, the one or more depth values computed using one or more machine learning models and based at least in part on image data generated using an image sensor of the ego-machine and a distortion map corresponding to a difference between at least one parameter of the image sensor and a reference image sensor used to generate training data for training the one or more machine learning models.

16. The processor of claim 15, wherein the one or more object bounding shapes are generated using the one or more machine learning models, one or more other machine learning models, or one or more object detection algorithms.

17. The processor of claim 15, wherein the one or more depth value are represented using a depth map.

18. The processor of claim 15, wherein at least one machine learning model of the one or more machine learning models is trained using ground truth data generated using at least one of a LIDAR sensor or a RADAR sensor.

19. The processor of claim 15, wherein the one or more depth values are used to update a world model to include the one or more depth values as being associated with one or more objects corresponding to the one or more object bounding shapes.

20. The processor of claim 15, wherein the processor is comprised in at least one of:
a control system for an autonomous or semi-autonomous machine;
a perception system for an autonomous or semi-autonomous machine;
a system for performing simulation operations;
a system for performing light transport simulation;
a system for performing deep learning operations;
a system implemented using an edge device;
a system implemented using a robot;
a system for generating synthetic data;
a system implemented at least partially in a data center; or
a system implemented at least partially using cloud computing resources.

* * * * *